United States Patent
Pez et al.

(10) Patent No.: US 7,438,889 B2
(45) Date of Patent: *Oct. 21, 2008

(54) USE OF COMPLEX METAL OXIDES IN THE AUTOTHERMAL GENERATION OF HYDROGEN

(75) Inventors: Guido Peter Pez, Allentown, PA (US); Baolong Zhang, Los Alamos, NM (US); Hans-Conrad zur Loye, Columbia, SC (US)

(73) Assignee: University of South Carolina, Columbia, SC (US)

( * ) Notice: Subject to any disclaimer, the term of this patent is extended or adjusted under 35 U.S.C. 154(b) by 488 days.

This patent is subject to a terminal disclaimer.

(21) Appl. No.: 11/165,720

(22) Filed: Jun. 24, 2005

(65) Prior Publication Data
US 2006/0292066 A1 Dec. 28, 2006

(51) Int. Cl.
*C01B 3/26* (2006.01)

(52) U.S. Cl. ............... 423/652; 423/653; 423/654

(58) Field of Classification Search ............ 423/652, 423/653, 654
See application file for complete search history.

(56) References Cited

U.S. PATENT DOCUMENTS

| | | | |
|---|---|---|---|
| 4,578,089 A | 3/1986 | Richter et al. | |
| 5,055,441 A | 10/1991 | McCarron, III et al. | |
| 5,827,496 A | 10/1998 | Lyon | |
| 6,007,699 A | 12/1999 | Cole | |
| 6,238,816 B1 * | 5/2001 | Cable et al. | 429/17 |
| 6,322,766 B1 | 11/2001 | Schicketanz et al. | |
| 6,506,510 B1 | 1/2003 | Sioui et al. | |
| 6,682,838 B2 | 1/2004 | Stevens | |
| 6,761,838 B2 | 7/2004 | Zeng et al. | |
| 6,767,530 B2 | 7/2004 | Kobayashi et al. | |
| 6,974,566 B2 | 12/2005 | Sabacky et al. | |
| 7,070,752 B2 * | 7/2006 | Zeng et al. | 423/418.2 |

(Continued)

FOREIGN PATENT DOCUMENTS

EP 0411506 A2 2/1991

(Continued)

OTHER PUBLICATIONS

Nakahara et al., "Synthesis and crystal structure of (Sr1-xCax)2FeMnOy ( x=0.10)", Materials Letters 30 (1997), pp. 163-167.

(Continued)

*Primary Examiner*—Wayne Langel
(74) *Attorney, Agent, or Firm*—Caesar, Rivise, Bernstein, Cohen & Pokotilow, Ltd.

(57) ABSTRACT

A process for producing hydrogen comprising reacting at least one hydrocarbon and steam in the presence of a complex metal oxide and a steam-hydrocarbon reforming catalyst in a production step under reaction conditions sufficient to form hydrogen and a spent complex metal oxide, wherein the complex metal oxide is represented by the formula $$(A'_{x'}Ca_xMg_{x''})_x(B'_{y'}Mn_yFe_{y''})_yO_n$$

where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;

$0 \leq x \leq 1$, $0 \leq x' \leq 1$, $0 \leq x'' \leq 1$ wherein $x+x'+x''=x$;
$0 \leq y \leq 1$, $0 \leq y' \leq 1$, $0 \leq y'' \leq 1$ wherein $y+y'+y''=y$;
$1 \leq x \leq 10$;
$1 \leq y \leq 10$;

and n represents a value such that the complex metal oxide is rendered electrically neutral.

30 Claims, 29 Drawing Sheets

U.S. PATENT DOCUMENTS

| | | | |
|---|---|---|---|
| 2002/0010220 | A1 | 1/2002 | Zeng et al. |
| 2002/0071806 | A1 | 6/2002 | Sabacky et al. |
| 2003/0035770 | A1 | 2/2003 | Cole |
| 2003/0150163 | A1 | 8/2003 | Murata et al. |
| 2003/0229151 | A1 | 12/2003 | Hurlburt et al. |
| 2004/0191166 | A1 | 9/2004 | Hershkowitz et al. |
| 2005/0112056 | A1 | 5/2005 | Hampden-Smith et al. |
| 2006/0292066 | A1 | 12/2006 | Pez et al. |
| 2006/0292069 | A1 | 12/2006 | Pez et al. |
| 2007/0172418 | A1 | 7/2007 | Slager et al. |

FOREIGN PATENT DOCUMENTS

| | | | |
|---|---|---|---|
| EP | 0737648 | A2 | 10/1996 |
| EP | 1134187 | A2 | 9/2001 |
| EP | 1736438 | A2 | 12/2006 |
| WO | 9902471 | A1 | 1/1999 |

OTHER PUBLICATIONS

Z. C. Zang, et al., "Hydrogen Production from Methane and Water by Lattice Oxygen Transfer with $Ce0.70Zr0.25Tb0.05O2-x$", J. Alloys and Compounds, 323-324 (2001). pp. 97-101.

K. Vidyasagar, et al., "A Convenient Route for the Synthesis of Complex Metal Oxides Employing Solid-Solution Precursors", Inorg. Chem., 1984 (23), 1206-1210.

A. R. Brun-Tsekhovoi, et al., "The Process of Catalytic Steam-Reforming of Hydrocarbons in the Presence of Carbon Dioxide Acceptor", Hydrogen Energy Progres VII, Proceedings of the 7$^{th}$ World Hydrogen Eenrgy Conference, Moscow (vol. 2, 1988), pp. 885-900.

B. Balasubramanian, "Hydrogen from Methane in a Single-Step Process", Chem. Eng. Sci. 54 (1999), 33543-3552.

Y. Ding, "Adsorption-Enchanced Steam Methane Reforming", Chem. Eng. Sci. 55 (2000), pp. 3929-3940.

European Search Report for EP06012612.

Aihara et al. "Development of porous solid reactant for thermal-energy storage and temperature upgrade using carbonation/decarbonation reaction", Applied Energy 69 (2001), pp. 225-238.

Hufton et al., "Sorption Enhanced Reaction Process (SERP) for the production of Hydrogen", Proceedings of the 2000 Hydrogen Program Review (2000), pp. 1-14.

Shin, "Separation of a Binary Gas Mixture by Pressure Swing Adsorption: Comparison of Different PSA Cycles", Adsorption 1 (1995), pp. 321-333.

Waldron et al., "Parametric Study of a Pressure Swing Adsorption Process", Adsorption 6, (2000), pp. 179-188.

* cited by examiner $Ca_2Co_2O_5$(5.9492 g)/1%Pt/$ZrO_2$(1.0228 g), First feed cycle. Vol = 6cc, 40 sccm $CH_4$/120 sccm steam/80 scmm Ar/@650 °C, 34 psia (1:1 CaO:NiO) (6.4233 g)/KTI(0.9704 g), First feed cycle. Vol =6cc, 40 sccm CH$_4$/120 sccm Steam/80sccm Ar/@650°C, 36 psia $CaMnO_{2.5}$(6.1256 g)/1% $Pt/ZrO_2$(1.0861 g), First Feed cycle, V = 6cc, 40 sccm $CH_4$/80 sccm Ar/120 sccm Steam, 30 psia $Ca_2MnFeO_5$(6.0017 g)/KTI(1.0602 g), First feed cycle. Vol =6cc, 40 scmm $CH_4$/120 sccm Steam/80sccm Ar/@650°C, 37 psia $Ca_2FeMnO_5(NiO)_{0.4}$(6.4537 g)/1% Pt on $Al_2O_3$(0.9424 g). First feed cycle.
Vol = 6 cc, 40 sccm $CH_4$/120 sccm Steam/80 scmm Ar/@650°C, 33 psia $Ca_2FeMnO_5(NiO)_{0.4}$ (6.4537 g)/1% $Pt-Al_2O_3$(0.9424 g), Seventh Feed Cycle.
Vol = 6 cc, 40 sccm $CH_4$/120 sccm Steam/80 sccm Ar/@650 °C, 32 psia Ca$_2$FeMnO$_5$(NiO)$_{0.4}$(6.4604 g)/1% Pt-Al$_2$O$_3$(0.9424 g).Third Feed Cycle.
Vol = 6 cc, 40 sccm CH$_4$/120 sccm Steam/80 sccm Ar/@650°C, 104 psia $Ca_2FeMnO_5(Pt)_{0.01}$ (6.0905 g)/4% Rh/Li Aluminate(0.8020 g). First Feed Cycle.
Vol = 6 cc, 40 sccm $CH_4$/120 sccm Steam/80 sccm Ar/@650°C, 39 psia $Ca_2FeMnO_5(Pt)_{0.01}$ (6.0905 g)/4% Rh/Li Aluminate(0.8020 g). Fourth Feed Cycle.
Vol = 6 cc, 20 sccm $CH_4$/60 sccm Steam/40 sccm Ar/@650°C, 40 psia $Ca_2FeMnO_5$(6.9345 g)/4% Rh/Li Aluminate(1.0037 g). Second Feed Cycle.
Vol = 6 cc, 40 sccm $CH_4$/80 sccm Steam/80 sccm Ar/@650 °C, 41 psia $Ca_2FeMnO_5$(6.9345 g)/4% Rh/Li Aluminate(1.0037 g), Second Regeneration Cycle.
Ar(80 sccm, 30 min)/20%$O_2$/Ar(40sccm). Vol = 6 cc, @750 °C CaMgFeMnO$_5$(NiO)$_{0.4}$(7 g)/20% NiO/Al2O3(1.3817 g). First Feed cycle.
Vol = 6 cc, 40 sccm CH$_4$/1.2 sccm H$_2$/80 sccm Steam/120 sccm Ar@650°C 40 psia

USE OF COMPLEX METAL OXIDES IN THE AUTOTHERMAL GENERATION OF HYDROGEN

BACKGROUND OF THE INVENTION

The production of industrial-scale volumes of hydrogen is typically accomplished by application of the steam-methane reforming process, which entails the catalytic reforming of natural gas with steam at elevated temperatures (800-900° C.). This process yields a crude synthesis gas, which is a mixture of hydrogen, carbon monoxide, and carbon dioxide, and the crude synthesis gas is further reacted in a catalytic water-gas shift conversion step to convert carbon monoxide and water to additional hydrogen and carbon dioxide. The shifted synthesis gas is purified to yield a final hydrogen product containing greater than 99 vol % hydrogen.

The natural gas reforming reaction is highly endothermic, requiring about 45 kcal/mole of methane, and the productivity of the steam-methane reforming process is limited by the rate of heat transfer from the external heat source to the catalyst. The catalyst typically is contained in long metal alloy tubes, and the alloy is selected to withstand the elevated temperatures and pressures required by the process. A significant part of the capital cost of the steam-methane reforming process equipment is related to the need for significant heat transfer at the high operating temperatures and pressures.

An alternative process for the production of hydrogen is the partial oxidation of methane to form synthesis gas, which is subsequently shifted if necessary and purified by pressure swing adsorption (PSA). Partial oxidation is known to be highly exothermic. Another alternative process to generate synthesis gas for hydrogen production is autothermal reforming, which is essentially a thermally balanced combination of the steam-methane reforming process and partial oxidation. One considerable drawback associated with these alternative processes is that partial oxidation requires a supply of high purity oxygen gas to the reaction system. Therefore, the use of these processes requires the additional step of separating air to produce the oxygen gas, and the air separation process increases the capital and operating costs of hydrogen production.

Numerous methods for the production of hydrogen are known in the art. One method entails the reaction of metal oxides with steam and methane. United States Patent Application Publication No. 2002/0010220 describes the production of hydrogen and carbon monoxide by the partial oxidation and/or steam reforming of hydrocarbons in an autothermal process. The publication further discloses the use of an oxygen ion conducting, particulate ceramic in a cyclic process which involves the reaction of oxygen in the air feed with the ceramic in one step, and the reaction of hydrocarbon feed and, optionally, steam, with the oxygen-enriched ceramic produced in the first step, to produce hydrogen and carbon monoxide. Preferred ceramic materials are stated to include perovskite substances. Similarly, the reaction of steam-methane using fluorite oxides is disclosed in "Hydrogen Production from Methane and Water by Lattice Oxygen Transfer with $Ce_{0.70}Zr_{0.25}Tb_{0.05}O_{2-x}$", Z. C. Kang et al., *J. Alloys and Compounds*, 323-324 (2001), 97-101. Neither reference discloses the retention of carbon dioxide by the oxides to facilitate its separation from the hydrogen and carbon monoxide products.

The preparation of complex metal oxides is also known in the art. For example, a synthesis of complex metal oxides by thermal decomposition techniques is disclosed in "A Convenient Route for the Synthesis of Complex Metal Oxides Employing Solid-Solution Precursors." K. Vidyasagar et al., *Inorg. Chem.*, 1984 (23), 1206-1210.

Investigations on the catalytic steam-methane reforming reaction have been carried out using systems which contain carbon dioxide acceptors to yield a more hydrogen rich product. For example, the use of calcium oxide, a carbon dioxide acceptor which is converted to calcium carbonate, is disclosed in "The Process of Catalytic Steam-Reforming of Hydrocarbons in the Presence of Carbon Dioxide Acceptor," A. R. Brun-Tsekhovoi et al., *Hydrogen Energy Progress VII, Proceedings of the 7th World Hydrogen Energy Conference, Moscow* (Vol. 2, 1988), pp. 885-900. The use of calcium oxide as a carbon dioxide acceptor in the steam-methane reforming reaction is also disclosed in "Hydrogen from Methane in a Single-Step Process," B. Balasubramanian et al., *Chem. Eng. Sci.* 54 (1999), 33543-3552; while hydrotalcite-based carbon dioxide adsorbents are disclosed in "Adsorption-enhanced Steam-Methane Reforming," Y. Ding et al., *Chem. Eng. Sci.* 55 (2000), 3929-3940.

U.S. Pat. No. 5,827,496 discloses a process for carrying out an endothermic reaction, such as reforming petroleum hydrocarbons, within a packed bed in a reactor. The process is effected using an unmixed combustion catalytic material and a heat receiver. The catalytic materials are referred to as "mass-transfer catalysts," and include metal/metal oxide combinations such as nickel/nickel oxide, silver/silver oxide, copper/copper oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof. The heat receiver may also include a carbon dioxide sorbent material, which is essentially limited to calcium oxide or a source thereof. This patent, in the context of its disclosed general process for heat transfer by "unmixed combustion," describes a process for reforming petroleum hydrocarbons with steam.

U.S. Pat. No. 6,007,699, like U.S. Pat. No. 5,827,496, discloses an "unmixed combustion" method. The method utilizes a combination of physical mixtures of metal oxides, a heat receiver, and a catalyst, which comprises one or more metal/metal oxide combinations. Calcium oxide is used to remove carbon dioxide and thus drive the equilibrium reaction towards the production of hydrogen.

U.S. Pat. No. 6,682,838 discloses a method for converting hydrocarbon fuel to hydrogen-rich gas by reacting the hydrocarbon fuel with steam in the presence of a reforming catalyst and a carbon dioxide fixing material, removing carbon monoxide from the hydrogen product by methanation or selective oxidation, and regenerating the carbon dioxide fixing material by heating it to at least 600° C. Suitable carbon dioxide fixing materials are listed as including calcium oxide, calcium hydroxide, strontium oxide, strontium hydroxide and other Group II element containing mineral compounds.

Known processes for the generation of hydrogen from hydrocarbons thus have associated drawbacks and limitations due to the highly endothermic nature of the hydrocarbon steam reforming reactions and the requirement of an oxygen supply for the partial oxidation of hydrocarbons used in autothermal reforming. There is a need in the field of hydrogen generation for improved process technology for the generation of hydrogen by the reaction of methane or other hydrocarbons with steam without certain of the limitations associated with known processes. This need is addressed by the embodiments of the present invention described below and defined by the claims that follow.

BRIEF SUMMARY OF THE INVENTION

The first embodiment of the present invention relates to a process for producing hydrogen comprising reacting at least one hydrocarbon and steam in the presence of a complex metal oxide and a steam-hydrocarbon reforming catalyst in a production step under reaction conditions sufficient to form hydrogen and a spent complex metal oxide, wherein the complex metal oxide is represented by the formula $$(A'_{x_1}Ca_{x_2}Mg_{x_3})_x(B'_{y_1}Mn_{y_2}Fe_{y_3})_yO_n$$

where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;

$0 \leq x_1 \leq 1$, $0 \leq x_2 \leq 1$, $0 \leq x_3 \leq 1$ wherein $x_1+x_2+x_3=x$;
$0 \leq y_1 \leq 1$, $0 \leq y_2 \leq 1$, $0 \leq y_3 \leq 1$ wherein $y_1+y_2+y_3=y$;
$1 \leq x \leq 10$;
$1 \leq y \leq 10$;

and n represents a value such that the complex metal oxide is rendered electrically neutral. In another embodiment, the complex metal oxide is defined wherein $x_1=0$, $y_1=0$, $1 \leq x \leq 5$, and $1 \leq y \leq 5$.

The process of the first embodiment is characterized by a production temperature ranging from 400° C. to 900° C. and a production pressure ranging from 1 to 100 atmospheres. The molar ratio of steam to the at least one hydrocarbon may range from 1:1 to 20:1. The molar ratio of steam to the at least one hydrocarbon is preferably less than 150% of the theoretical amount.

The oxygen source gas utilized in the first embodiment of the invention is selected from the group consisting of air, oxygen, oxygen-depleted air, and mixtures thereof.

The process of the first embodiment may further comprise reacting the spent mixed metal oxide and an oxygen source gas in a regeneration step under reaction conditions sufficient to regenerate the complex mixed metal oxide. In another embodiment, the regeneration step is characterized by a regeneration temperature ranging from 450° C. to 900° C. The resulting spent mixed metal oxide and the oxygen source gas is undertaken under reaction conditions of a temperature ranging from less than or equal to 100° C. higher than the production temperature.

According to the first embodiment, the stream-hydrocarbon reforming catalyst comprises one or more components selected from the group consisting of nickel, cobalt, ruthenium, osmium, rhodium, palladium, platinum, iridium, and oxides of these metals.

In the first embodiment, the at least one hydrocarbon is selected from aliphatic hydrocarbons having from 1 to 20 carbon atoms. The at least one hydrocarbon is preferably methane obtained as a component of natural gas.

A complex metal oxide for use in the first embodiment comprises $Ca_2Mn_{y_2}Fe_{y_3}O_n$ wherein $y_2+y_3=1$. More preferably, the complex metal oxide comprises $Ca_2MnFeO_5$ ($CaMn_{0.5}Fe_{0.5}O_{2.5}$). Alternately; the complex metal oxide comprises $Ca_2MnFeO_4$ ($CaMn_{0.5}Fe_{0.5}O_2$). Or the complex metal oxide comprises $Ca_2Co_2O_5$ ($CaCoO_{2.5}$). Alternately, the complex metal oxide comprises $Ca_2Mn_2O_5$ ($CaMnO_{2.5}$).

Alternately, the complex metal oxide of the first embodiment comprises $Ca_{1-x_3}Mg_{x_3}Mn_{y_2}Fe_{y_3}O_n$ where $0.1<x_3<0.9$; and wherein $y_2+y_3=1$. In a preferred embodiment, the complex metal oxide comprises $MgCaFeMnO_5$ ($Mg_{0.5}Ca_{0.5}Mn_{0.5}Fe_{0.5}O_{2.5}$).

Alternately, the complex metal oxide comprises $Ca_2MnFeO5$ ($CaMn_{0.5}Fe_{0.5}O_{2.5}$) and the steam-hydrocarbon reforming catalyst comprises nickel on alumina.

The complex metal oxides of the first embodiment may be impregnated with at least one steam-methane reforming catalyst.

The at least one steam-methane reforming catalyst according to the first embodiment of the invention comprises a metal selected from the group consisting of platinum and nickel. More preferably, the at least one steam-methane reforming catalyst comprises a compound selected from the group consisting of nickel oxide and cobalt oxide.

According to the first embodiment of the invention, the complex metal oxide is mixed with at least one steam-methane reforming catalyst prior to use in the process.

The molar ratio of steam to methane typically ranges from 1.3:3 to 4:1, inclusive.

The at least one hydrocarbon may be provided as a component in pre-reformed natural gas.

The second embodiment of the invention relates to a process for producing hydrogen comprising
  (a) providing a reactor containing a complex metal oxide and a steam-hydrocarbon reforming catalyst, wherein the complex metal oxide is represented by the formula $$(A'_{x_1}Ca_{x_2}Mg_{x_3})_x(B'_{y_1}Mn_{y_2}Fe_{y_3})_yO_n$$

where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;

$0 \leq x_1 \leq 1$, $0 \leq x_2 \leq 1$, $0 \leq x_3 \leq 1$, wherein $x_1+x_2+x_3=x$;
$0 \leq y_1 \leq 1$, $0 \leq y_2 \leq 1$, $0 \leq y_3 \leq 1$, wherein $y_1+y_2+y_2=y$;
$1 \leq x \leq 10$;
$1 \leq y \leq 10$;

and n represents a value such that the complex metal oxide is rendered electrically neutral;
  (b) introducing a feed gas containing least one hydrocarbon and steam into the reactor in a production step, reacting the at least one hydrocarbon and the steam in the presence of the complex metal oxide and the steam-hydrocarbon reforming catalyst under reaction conditions sufficient to form hydrogen and a spent complex metal oxide, and withdrawing from the reactor a product gas comprising hydrogen;
  (c) terminating the introduction of the at least one hydrocarbon and purging the reactor with a purge gas to displace combustible components from the reactor and withdrawing a purge gas effluent therefrom;
  (d) regenerating the reactor in a regeneration step by reacting the spent mixed metal oxide and an oxygen source gas under reaction conditions sufficient to regenerate the complex mixed metal oxide;
  (e) optionally purging the reactor with a purge gas;
  (f) pressurizing the reactor by introducing the feed gas containing least one hydrocarbon and steam; and
  (g) repeating (b) through (f) in a cyclic manner.

Alternately, the process of the second embodiment further comprises, prior to purging the reactor, depressurizing the reactor by withdrawing a depressurization gas therefrom.

The process of the second embodiment may be preferably practiced wherein the feed gas contains up to 20 vol % hydrogen. Most preferably, the feed gas is pre-reformed natural gas.

DETAILED DESCRIPTION OF THE INVENTION

Figure 1:
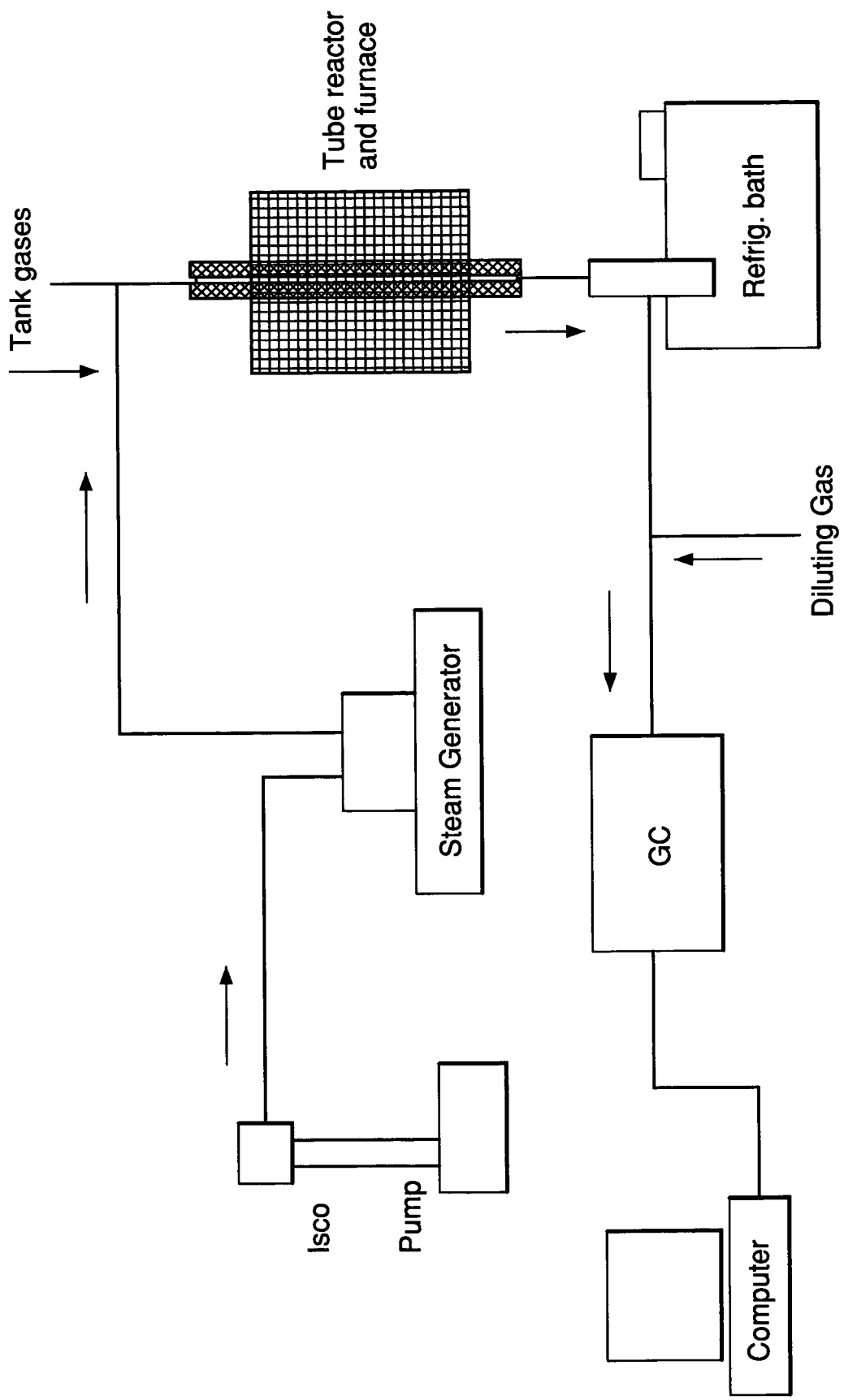
FIG. 1 is a schematic diagram of an experimental apparatus used to evaluate the performance of complex metal oxide and steam-methane reforming catalyst combinations for hydrogen generation from steam-methane mixtures.

Embodiments of the present invention relate to a process for generating hydrogen by the reaction of one or more gaseous hydrocarbons with gaseous water, i.e., steam. In an embodiment of the invention, a process for generating hydrogen comprises the steps of (a) reacting one or more hydrocarbons with steam in the presence of a complex metal oxide and a steam-hydrocarbon reforming catalyst to form hydrogen; and (b) regenerating the complex metal oxide by reacting the complex metal oxide with air. The hydrocarbon may be methane and the steam-hydrocarbon reforming catalyst may be a steam-methane reforming catalyst.

The term "complex metal oxide" is defined herein as a chemical compound comprising oxygen and two or more elements that are regarded as metals in their pure unoxidized state at normal ambient conditions. Complex metal oxides may include, for example, ternary or quarternary metal oxides comprising two and three metallic elements, respectively, in combination with oxygen. In contrast to a complex metal oxide, a simple metal oxide is a combination of only one element and oxygen and is usually referred to as a binary oxide. This distinction between complex oxides and simple oxides is further explained with specific illustrations in "Comprehensive Inorganic Chemistry", Vol. 2, pp. 729-735, Pergamon Press (1975).

In one embodiment of the present invention, an autothermal process is used for producing hydrogen directly in a single reaction zone or reactor bed by the reaction of one or more hydrocarbons with steam. The one or more hydrocarbons may comprise methane. Byproducts of the process, such as nitrogen and carbon dioxide, may be separated from the complex oxide regeneration effluent stream as described below. In one embodiment, the carbon dioxide may be recovered as an additional product.

The term "autothermal process" is used herein to describe a process comprising a plurality of chemical reactions, at least one of which is exothermic and at least one of which is endothermic, wherein some or all of the energy requirements of the endothermic reaction or reactions are supplied by the exothermic reaction or reactions. Thus, once the chemical reactions of the process have been initiated, minimal additional energy input is required to sustain the reactions, and the process is essentially thermally self-sustaining. In a first or production step of the process, the endothermic heat required for the catalytic reaction of one or more hydrocarbons with water is provided by the exothermic heat of partial oxidation of the one or more hydrocarbons and by the usually exothermic reaction of carbon dioxide with the complex metal oxide. In a second or regeneration step of the process, the regeneration of the metal complex oxide is effected by reaction of oxygen with the spent complex metal oxide and the desorption of carbon dioxide taken up by the complex metal oxide in the first step, and this regeneration step also is an autothermal process.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "thermoneutral process" is defined as a process for which the thermal energy required is completely supplied by the process itself and there is no net change in enthalpy during the process. Thus in the embodiments of the present invention the overall enthalpy change, $\Delta H$, for the synthesis step in which hydrogen is produced (Equation 7 below) and for the spent complex metal oxide regeneration step (Equation 9 below) are both zero. An autothermal process that operates under adiabatic conditions (no heat loss or gain from the system) in which the necessary thermal energy is supplied by the operative chemistry would be a thermoneutral process.

In practice, it may be desirable to carry out the synthesis and regeneration steps under conditions that are slightly net exothermic to compensate for any losses of heat during the process. Such heat losses may result in small temperature changes as determined by the respective enthalpies of the reaction steps and the heat capacities of the reactor beds. However, the closer the overall process approaches a thermoneutral process, the greater the yield of hydrogen and the more energy efficient the production of the hydrogen product.

Thus in the first or production step process described herein the endothermic reaction of one or more hydrocarbons with steam is balanced by the exothermic partial oxidation of the one or more hydrocarbons and the usually exothermic reaction of carbon dioxide with the mixed metal oxide. At steady-state conditions, the desirable autothermal process does not require that heat energy be supplied to the reactors to sustain the reaction after startup. However, during startup, an initial quantity of imported heat energy may be required for the generation of steam for the reaction. This heat energy may be supplied by any suitable method such as, for example, the use of a reaction exotherm or combustion of a fuel material. The autothermal, and possibly slightly exothermic, process provides for a highly efficient generation of hydrogen from hydrocarbons and steam. In addition, the process described herein may reduce the high heat transfer surface area and specials alloys that are required in conventional steam-hydrocarbon reforming reactor systems, and thus may lead to simpler and less costly reformer reactors.

The process of the embodiments of the present invention utilizes a cyclic two-step reaction. In the first step of the process, which may be described equivalently as a reaction, synthesis, or production step, water and one or more hydrocarbons are introduced into a reactor. Suitable reactors may be packed bed catalytic reactors, fluidized bed reactors, or any other reactor configuration. Any hydrocarbons may be used which are capable of catalyzed reaction with steam to form hydrogen. The hydrocarbons may be selected from aliphatic hydrocarbons having from 1 to about 20 carbon atoms, and advantageously may be selected from aliphatic hydrocarbons having from 1 to about 6 carbon atoms. Desirably, the hydrocarbon feed may be selected from methane, natural gas, propane, or a mixture of predominantly $C_1$ to $C_4$ aliphatic hydrocarbons. The process is effected by passing a gaseous feed mixture containing steam and one or more hydrocarbons through a reaction bed which comprises a complex metal oxide material and a conventional steam-hydrocarbon reforming process catalyst, the reaction bed being maintained at an elevated temperature.

A desirable gaseous feed mixture comprises steam and methane. The methane in the steam/methane gaseous mixture may be obtained from any suitable source, and is preferably obtained as natural gas from which sulfur compounds have been removed. It is advantageous to include a low level of hydrogen, e.g. ~3 mole %, as a product recycle to the feed stream in order to assist in the reduction/activation of the catalyst and possibly to reduce the likelihood of carbon deposition, particularly where unreformed natural gas or $C_2$ and higher hydrocarbons are present in the feed.

The molar ratio of steam to hydrocarbon typically ranges from about 1:1 to about 20:1. The minimum or theoretical steam to hydrocarbon ratio depends on the composition of the hydrocarbon and can be estimated by the method described in the following section. In one embodiment, the hydrocarbon is propane, and the molar ratio of steam to propane may be from about 4:1 to about 10:1. In another embodiment, the hydrocarbon is methane; the molar ratio of steam to methane may be between about 1.3:1 and about 4:1, and more specifically this ratio may be between about 1.3:1 and about 2:1.

In another embodiment, the gaseous feed mixture may be a mixture of adiabatically pre-reformed natural gas and steam. The adiabatic pre-reforming process is effected by heating natural gas to a temperature of about 500° C. and passing the heated gas through an adiabatic nickel catalyst bed. Natural gas typically contains about 5% of heavy hydrocarbon fractions, wherein the term "heavy" is understood to mean fractions containing two or more carbon atoms. The heavy fractions are typically more reactive than methane, and catalytically reform to yield carbon dioxide and hydrogen. The resulting gas mixture therefore contains a mixture of methane, carbon dioxide, steam, and hydrogen. The pre-reforming reactions typically are endothermic, and because the reaction usually proceeds adiabatically, the temperature of the resulting gas mixture decreases. Typically, the temperature of the gas mixture is reduced to about 450° C. after pre-reforming.

The use of pre-reformed natural gas instead of untreated natural gas has associated advantages. First, the pre-reforming process generates some hydrogen, which is useful for chemically reducing to an active state the catalyst of the subsequent steam-methane reforming reaction. Second, the removal of the heavy hydrocarbon fractions reduces the potential for carbon deposition on the steam-methane reforming catalyst. The use of pre-reforming extends the life of the catalyst, since carbon deposition ultimately leads to the deactivation of the catalyst.

The complex metal oxide material and a conventional steam-hydrocarbon reforming process catalyst may be combined prior to loading in the reaction bed. Combining the complex metal oxide and the steam-hydrocarbon reforming catalyst may be effected in any suitable manner, for example, by mixing the steam-hydrocarbon reforming catalyst with the complex metal oxide material or impregnating the complex metal oxide material with the steam-hydrocarbon reforming catalyst either during or following the synthesis of the complex metal oxide. Alternatively or additionally, the complex metal oxide itself may promote steam-hydrocarbon reforming when component B (see below) of the oxide is reduced to its metallic or zero oxidation state during the hydrogen synthesis reaction. Examples of component B include cobalt and nickel that exist in a positive oxidation state as part of the structure of the complex metal oxide and may be reduced at reaction conditions to metallic cobalt and metallic nickel, in which form they may be active as steam-hydrocarbon reforming catalysts. In this case, the complex metal oxide functions as a precursor to the steam-hydrocarbon reforming catalyst, as an oxygen source, and as a carbon dioxide acceptor. The steam-hydrocarbon reforming catalyst may be physically mixed with the complex metal oxide material as described above. Typically, the reaction bed is maintained at an elevated temperature, and the reforming reactions may be effected in the range of about 350° C. to about 900° C. and more specifically in the range of about 600° C. to about 750° C. The process may be conducted at a total pressure of from 1 to 100 atmospheres and more specifically may be conducted at pressures from 20 to 50 atmospheres.

Suitable complex metal oxide materials include oxides comprising two or more metals, and have the general formula:

where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, V, and Cr;

$0 \leq x_1 \leq 1$, $0 \leq x_2 \leq 1$, $0 \leq x_3 \leq 1$, wherein $x_1+x_2+x_3=x$;
$0 \leq y_1 \leq 1$, $0 \leq y_2 \leq 1$, $0 \leq y_3 \leq 1$, wherein $y_1+y_2+y_3=y$;
$1 \leq x \leq 10$;
$1 \leq y \leq 10$;

and n represents a value such that the complex metal oxide is rendered electrically neutral.

In an embodiment of the invention, component A' is an element selected from magnesium, calcium, strontium, barium and lanthanum, and component B' is an element selected from vanadium, chromium, manganese, iron, cobalt, nickel, and copper. The complex metal oxide materials of the present invention may be bimetallic, trimetallic, or higher order metal complex oxides. Bimetallic oxides are also known as ternary oxides, while trimetallic oxides are also known as quaternary oxides. Complex metal oxides of the present invention may include but are not limited to $CaMn_{y_2}Fe_{y_3}O_n$ wherein $y_2+y_3=1$ $Ca_{1-x_3}Mg_{x_3}Mn_{y_2}Fe_{y_3}O_n$ where $0.1 < x_3 < 0.9$; and wherein $y_2+y_3=1$; $Ca_2MnFeO_5$ ($CaMn_{0.5}Fe_{0.5}O_{2.5}$); $Ca_2Co_2O_5$ ($CaCoO_{2.5}$); $Ca_2Mn_2O_5$ ($CaMnO_{2.5}$); $MgCaFeMnO_5$ ($Mg_{0.5}Ca_{0.5}Mn_{0.5}Fe_{0.5}O_{2.5}$); and $Ln_{x_1}Ca_{x-1_1}(Mn_{y_2}Fe_{y_3}O_n)_b$ where $0 \leq y_2 \leq 1$ and $0 \leq y_3 \leq 1$, wherein $y_2+y_3=1$ and b is a value chosen so as to render the complex metal oxide electrically neutral.

In another embodiment, a suitable complex metal oxide material is $$(Ca_{x_2}Mg_{x_3})_x(Mn_{y_2}Fe_{y_3})_yO_n$$

where
$0 \leq x_2 \leq 1$, $0 \leq x_3 \leq 1$ wherein $x_1+x_2+x_3=x$;
$0 \leq y_2 \leq 1$, $0 \leq y_3 \leq 1$ wherein $y_1+y_2+y_3=y$;
$1 \leq x \leq 5$; and
$1 \leq y \leq 5$.

Typically, the conversion of hydrocarbon to hydrogen in the process is from about 20% to about 99%. Increased conversion may be achieved by selection of complex metal oxide and steam-methane reforming catalyst combinations.

Increased conversion also may be achieved by impregnation of the complex metal oxide with one or more steam-methane reforming catalysts, such as platinum and nickel, or one or more steam-methane reforming catalyst precursors, such as nickel or cobalt oxides. The increase in conversion may be from about 150% of the conversion of the corresponding non-impregnated complex metal oxide to about 400% of the conversion of the corresponding non-impregnated complex metal oxide. The impregnated complex metal oxide advantageously is mixed with a steam-methane reforming catalyst before use.

Suitable conventional steam-hydrocarbon reforming process catalysts include any materials effective for the reforming of methane or higher hydrocarbons with steam to produce hydrogen. For example, such materials may comprise one or more components selected from nickel, cobalt, iron, copper, any of the platinum group metals (i.e., ruthenium, osmium, rhodium, palladium, platinum, and iridium), and oxides of the foregoing, supported on zirconia, alumina and other suitable supports. Exemplary steam-hydrocarbon reforming process catalysts include, but are not limited to, 1% platinum on a zirconium oxide support, 1% platinum on an alumina support, and 4% rhodium on a lithium aluminate support. If the steam-hydrocarbon reforming catalyst is a supported nickel oxide or cobalt oxide material, for example, it may be necessary to at least partially reduce the oxide to the metal or to activate the oxide with a feed of methane containing about 3% hydrogen. The nickel/nickel oxide catalyst when functioning as a redox system can have a significant influence on the overall thermochemistry of the process of the present invention, as demonstrated below.

In a first step, nickel oxide is reduced to nickel metal as described by $$H_2 + NiO \rightarrow Ni + H_2O \quad \Delta H = -3.01 \text{ kcal/mole at } 700° C.$$

while in a second step, the oxide is reformed as described by $$Ni + \tfrac{1}{2}O_2 \rightarrow NiO \quad \Delta H = -56.2 \text{ kcal/mole.}$$

Thus, a measured addition of nickel, preferably as nickel oxide mixed with the complex oxide wherein the nickel is not actually incorporated into the complex oxide structure, can be used to bring about a desired thermochemistry for the reaction. For example, such an addition of nickel can be used to alter the thermochemistry of a reaction from endothermic to exothermic, particularly for the complex metal oxide regeneration step wherein, as described above, the oxidation of nickel is accompanied by a very large exotherm.

Without being bound by theory, it is generally believed that when the platinum group metals are used as catalysts, the bulk metallic states are usually retained through both steps in the process, depending on the temperature of the process, and may be accompanied by the formation of intermediate surface oxide species in amounts that do not significantly affect the thermodynamics of the process.

During the first or production step of the process according to an embodiment of the present invention, steam and one or more hydrocarbons are fed at an elevated temperature as gaseous reactants through a reactor vessel having a reaction bed which comprises a complex metal oxide material and a conventional steam-hydrocarbon reforming process catalyst. A product of relatively pure hydrogen, i.e., greater than about 95% pure, is obtained until the complex metal oxide material becomes depleted in oxygen, i.e., becomes spent.

It is believed that steam and the one or more hydrocarbons react in the presence of a catalyst to yield hydrogen and by-product carbon dioxide. The reaction is highly endothermic. For example, in the steam-methane reforming reaction, as described in Equation 1 below, steam reacts with methane in the presence of a catalyst to yield carbon dioxide and hydrogen, and the calculated enthalpy change ($\Delta H$) for the reaction is +45.6 kcal/mole at 700° C.:

$$CH_4 + 2H_2O \xrightarrow{\text{catalyst}} CO_2 + 4H_2 \quad (1)$$

The use of the complex metal oxide in this steam-methane reforming reaction provides a source of oxygen, as described in Equation 2 below, and also provides the means for capturing the carbon dioxide produced as a by-product of the steam-methane reforming reaction, as described in Equation 3 below. In the following equations, complex metal oxide materials of the general formula $(A'_{x_1}Ca_{x_2}Mg_{x_3})_x(B'_{y_1}Mn_{y_2}Fe_{y_3})_yO_n$ are exemplified by the formula $A_xB_yO_n$, wherein both x and y are each 1, and A and B each represent a single element. Thus, the incorporation of the complex metal oxide provides an oxidant species which delivers oxygen to the process, and additionally provides the benefit of removing carbon dioxide from the hydrogen product stream.

$$ABO_n = ABO_{n-x} + x/2 O_2 \quad (2)$$

$$ABO_{n-x} + CO_2 = ACO_3 + BO_{n-x-1} \quad (3)$$

Alternatively, the reaction of the reduced complex metal oxide $ABO_{n-x}$ with $CO_2$ to give a metal carbonate (Equation 3) may be viewed as its dissociation to the two binary oxides as described in Equation 4a below, followed by reaction of the AO oxide with $CO_2$ (Equation 4b):

$$ABO_{n-x} \rightarrow AO + BO_{n-x-1} \tag{4a}$$

$$AO + CO_2 \rightarrow ACO_3 \tag{4b}$$

Equations 2 and 3 (where Equation 3=Equation 4a+Equation 4b) can be combined to yield $$ABO_n + CO_2 \rightarrow ACO_3 + BO_{n-x-1} + x/2 O_2 \tag{4}$$

It is believed that the reaction of Equation 2 proceeds generally as an endothermic process. However, it is also believed that any oxygen or equivalent oxidant produced will react with methane in an exothermic reaction. For example, in the reaction of methane with oxygen, as described in Equation 5 below, methane and oxygen react to yield carbon dioxide and water, and the calculated enthalpy change ($\Delta H$) for the reaction is $-191.4$ kcal/mole at 700° C.:

$$CH_4 + 2O_2 \rightarrow CO_2 + 2H_2O \tag{5}$$

An ideal thermoneutral equation for the preparation of hydrogen from the reaction of methane with steam and oxygen at 700° C. can be generated by combining Equations 1 and 5 wherein each equation is scaled by its respective enthalpy change. The resulting equation having a calculated enthalpy change ($\Delta H$) of 0 kcal/mole at 700° C. is $$CH_4 + 0.384 O_2 + 1.23 H_2O \rightarrow CO_2 + 3.23 H_2 \tag{6}$$

In the embodiments of the present invention, the oxygen used in the reaction is generated by the dissociation of the complex metal oxide as described in Equation 2, while the capture of carbon dioxide by-product is described in Equation 3. A complete theoretical description of the process of the present invention, whereby hydrogen is produced from the reaction of methane, steam, and oxygen by use of a complex metal oxide at 700° C., is obtained by combining Equations 2 and 3 (where now at these specific conditions x/2=0.384) and 6 to form Equation 7 as follows:

$$CH_4 + ABO_n + 1.23 H_2O \rightarrow ACO_3 + BO_{n-0.77-1} + 3.23 H_2 \tag{7}$$

As discussed above, component B of the complex metal oxide may comprise one or more metallic elements, each of which can form oxides having at least two possible oxidation states. In one embodiment of the present invention, at least one of the metallic species of component B may be reduced to the metallic or zero oxidation state during the hydrogen production step. In this embodiment, the subscript (n-0.77-1) is equal to zero, and therefore n is equal to 1.77.

In one embodiment of the present invention, each of the two steps of the process is autothermal. To achieve maximum energy efficiency, each of the two steps of the process also should be approximately thermoneutral. In order to effect autothermal operation of thermoneutrality, the composition of the complex metal can be tailored for this purpose as discussed below.

The metallic element or elements from the group $(A'_{x_1}Ca_{x_2}Mg_{x_3})_x$ of the general formula for the complex metal oxide $(A'_{x_1}Ca_{x_2}Mg_{x_3})_x(B'_{y_1}Mn_{y_2}Fe_{y_3})_yO_n$ must be capable of forming a metal carbonate at the conditions of and in the course of the hydrogen generating process via reaction of the complex metal oxide with carbon dioxide (Equations 3 and 4). Some initial guidance for the choice of this element can come from available reaction enthalpy and free energy data for the formation of carbonate from the element's reaction with carbon dioxide (Equation 4b). A second consideration however, is that the formed metal carbonate must be capable of forming the complex metal oxide with a concomitant liberation of $CO_2$ (Equation 8).

The maximum theoretical yield of hydrogen is realized when the complex metal oxide is chosen to make Equation 7 an autothermal and thermoneutral reaction, i.e., where $\Delta H=0$. However, to compensate for heat losses in practice, the process may be conducted at autothermal but somewhat exothermic reaction conditions which may result in slightly less than the above theoretical maximum yield of hydrogen. The total enthalpy change, $\Delta H$, of the hydrogen production process chemistry (Equation 7) can be calculated from the enthalpy changes of its component processes (Equations 1 to 6). While the enthalpy changes for Equations 1 and 5 are available from literature sources for a range of temperatures, those for Equations 2 and 3 will be a function of the chosen complex metal oxide.

Thus an ideal complex metal oxide will permit an overall thermoneutral process yielding the maximum 3.23 moles of hydrogen per mole of methane. If the process is endothermic for a particular complex metal oxide, i.e., $\Delta H$ is positive, the yield of hydrogen will be less than 3.23 moles of hydrogen per mole of methane. If the process is endothermic, a yield greater than 3.23 moles of hydrogen per mole of methane may be realized, but in this situation, external input of heat to the reactor will be required. Both the hydrogen production and complex metal oxide regeneration steps of the process may be conducted in adiabatic reactors wherein the necessary heat (including heat required to compensate for heat losses) is supplied by the operative process chemistry. This reduces or eliminates the need for providing external heat at these reaction conditions, which involves the use expensive alloys for the required heat transfer step.

In one embodiment of the invention, the particular complex metal oxide used in the production of hydrogen may be selected to provide an autothermal, and approximately thermoneutral, and slightly exothermic process. The process of the present invention thus provides thermodynamic flexibility in the use of a selected complex metal oxide by enabling control of the balance of the enthalpy of reaction and the reaction temperature. The dissociation of the complex metal oxide in Equation (4a), which describes the dissociation of the complex metal oxide to the two binary oxides AO and $BO_{n-x-1}$, generally will be an endothermic reaction; the capture of carbon dioxide to form a metal carbonate at about 700° C., as described in Equation 4b, generally will be exothermic. The possibility therefore exists for greater flexibility in designing an autothermal or approximately thermoneutral hydrogen synthesis reaction step than would be possible with a binary oxide or a mixture of binary oxides.

Equation 7 further describes that the theoretical amount of steam required is 1.23 moles per mole of methane used. Embodiments of the present invention provide a process wherein less steam is required than in conventional steam methane reforming, and therefore significant energy savings can be realized. In conventional steam methane reforming, methane and steam are first converted to $CO$, $H_2$ and $CO_2$, which are subsequently converted in a separate shift conversion reactor to a mixture of $H_2$ and $CO_2$. Excess steam is needed to maintain the catalyst activity in this shift conversion reactor. In the present process, the methane-steam mixture is converted directly into $H_2$ and $CO_2$ without the need for a subsequent shift conversion step, and excess steam may not be required. In one embodiment of the present invention, the amount of steam used in the reaction is less than about 150 percent of the theoretical amount required. In another embodiment, the amount of steam used in the reaction is less than about 110 percent of the theoretical amount required.

A physical mixture of the complex metal oxide and steam-hydrocarbon reforming catalyst may be prepared and loaded into a packed bed catalytic reactor. In a first or reaction step, a mixture of steam and methane in the desired proportion is fed into the reactor and the product gases are removed at an outlet valve. The composition of the outlet gases from this synthesis step may be monitored by standard techniques, such as in-line gas chromatography.

In a second or regeneration step, the complex metal oxide is regenerated with air; the synthesis step is then repeated. These two process steps can be integrated into a continuous cyclic process for generating hydrogen utilizing at least two parallel reactors, wherein at least one reactor operates in the production step and at least one reactor operates in the regeneration step.

The first or synthesis step of the process is terminated when the concentration of carbon dioxide in the reactor effluent increases above a predetermined level, indicating that the carbon dioxide capture capacity of the complex metal oxide has been exhausted. The second or regeneration step of the process may be initiated terminating the hydrocarbon feed to the reactor while continuing the flow of steam for a period of time sufficient to purge residual hydrocarbons from the reactor vessel. The reactor may be depressurized to about atmospheric pressure prior to purging.

Air or another oxygen-containing gas is introduced into the reactor to effect the regeneration of the complex metal oxide. The air may be externally preheated to the regeneration temperature in a heat exchanger or by combustion with a fuel in a direct-fired heater. The regeneration of the complex metal oxide may take place spontaneously with minimal input or loss of heat, and may be effected at temperatures similar to those in the synthesis step, i.e., at temperatures in the range of about 450° C. to about 900° C. and more specifically in the range of about 600° C. to about 800° C. For example, the regeneration of the complex metal oxide may be effected at temperatures up to about 150° C. above the temperature of the production step. In one embodiment, the regeneration step is effected at a temperature up to about 100° C. above the temperature of the production step and advantageously at temperatures up to about 50° C. greater than the temperature of the production step.

The close correlation between the temperatures of the regeneration step and the synthesis step that is possible in the present process leads to improved catalyst stability and also reduces or eliminates the need for providing external heating during the reaction and regeneration steps. The reaction of methane and steam in the presence of a mixture of two binary oxides, nickel oxide and calcium oxide, yields hydrogen, calcium carbonate, and nickel metal. In the regeneration step, the reaction of calcium carbonate to form calcium oxide and carbon dioxide is a highly endothermic process. This highly endothermic process is rendered more favorable, at least in part, by the exothermic oxidation of nickel to nickel oxide. In addition, the nickel oxidation reaction is likely to proceed more rapidly than the decomposition of calcium carbonate, resulting in a rise in the temperature of the reaction bed and thus facilitating a greater degree of decomposition of calcium carbonate as the decomposition reaction is equilibrium controlled. The temperature rise and accompanying elevated carbon dioxide production rate will necessarily be temporary, and will be followed by a decline in the rate of evolution of carbon dioxide. Sustained higher temperatures are therefore necessary for a complete conversion of calcium carbonate to calcium oxide. These results are described in U.S. Pat. No. 6,007,699. These sustained higher temperatures in the reactor can create problems such as, for example, the deactivation of the conventional steam-hydrocarbon reforming catalyst by sintering.

In the embodiments of the present invention, the decomposition of the carbonate produced in the synthesis step as described in Equation 7, i.e., $ACO_3$, is additionally driven by the formation of the ternary or higher complex metal oxide, a step which is usually exothermic and thermodynamically spontaneous. The exothermic reaction in part overcomes the thermally unfavorable endothermic decomposition of the metal carbonate $ACO_3$. It is believed that when the complex metal oxide is regenerated, the metal carbonate $ACO_3$, (which may be, for example, calcium carbonate) decomposes to yield carbon dioxide along with the formation of the complex metal oxide $ABO_n$, not the binary oxide AO (which would be CaO in the above example). This chemistry is described by the following equation:

$$ACO_3 + BO_{n-x-1} + x/2\, O_2 \rightarrow CO_2 + ABO_n \qquad (8)$$

If the production step (Equation 7) comprises a reduction to the metallic state of at least one of the species of component B, then a first step in the regeneration of the generalized complex metal oxide $ABO_n$ is the formation of the oxide $BO_{n-x-1}$ described above. The regeneration step then proceeds as described in Equation 8.

Without being bound by theory, it is believed that the reaction leading to the regeneration of the complex metal oxide, as described in Equation 8, will be thermally less endothermic, and therefore closer to thermoneutral, and also thermodynamically more spontaneous, than the reaction leading to the production of a physical mixture of binary oxides according to the following reaction:

$$ACO_3 + BO_{n-x-1} + x/2O_2 \rightarrow CO_2 + AO + BO_{n-1} \qquad (9)$$

Equation 9 leads to the production of a mixture of individual binary metal oxides, which differs from the single-component complex metal oxide in the embodiments of the present invention. The additional driving force for the evolution of carbon dioxide from the spent complex metal oxide mixture consisting of $ACO_3$ and $BO_{n-x-1}$, arises from the usually thermodynamically favorable formation of the complex metal oxide from its binary oxide components, as described below:

$$BO_{n-1} + AO \rightarrow ABO_n \qquad (10)$$

It is believed that the greater overall stability (i.e., lower, more negative enthalpy of formation) of the complex metal oxide may arise from the usually larger coordination number of oxide ions around the A and B metal sites of the complex metal oxide as compared to that of the precursor binary oxides $BO_{n-1}$ and AO. It also is believed that, since the formation of the complex metal oxide is usually a spontaneous process, the process may be accompanied by a small and usually negative free energy change. Therefore, the regeneration of the generalized complex metal oxide $ABO_n$ from the spent oxide mixture, $ACO_3$ and $BO_{n-x-1}$, as described in Equation 8, will be more exothermic, i.e., more favorable, than the production of binary oxides described in Equation 9. In addition, due to the lower free energy ($\Delta G$) of the reaction of Equation 8, the reaction should liberate carbon dioxide at a lower temperature, and/or at a higher carbon dioxide equilibrium dissociation pressure, than for the process of Equation 9. Thus, the regeneration of the complex metal oxide can be effected at conditions which more closely approach thermoneutrality than conventional systems and at lower temperatures than conventional systems. This is illustrated in Example 15 (part b) and Example 8 for the regeneration of the $Ca_2MnFeO_5$ complex metal oxide of this invention.

The regenerated complex metal oxide typically has very similar activity to the original complex metal oxide. With repeated cycling, however, the regenerated complex metal oxide may present slightly different physical characteristics from the original complex metal oxide. For example, the regenerated complex metal oxide may have a slightly lower particle size distribution. Nevertheless, the regenerated complex metal oxide is sufficient for use in the process and can be repeatedly recycled.

In one embodiment of the present invention, each of the two steps of the process is autothermal. To achieve maximum energy efficiency, each of the two steps of the process also should be approximately thermoneutral. In order to effect autothermal operation of thermoneutrality, the composition of the complex metal can be tailored for this purpose as discussed below.

The metallic element or elements from the group $(A'_xCa_{x'}Mg_{x''})_x$ of the general formula for the complex metal oxide $(A'_xCa_{x'}Mg_{x''})_x(B'_yMn_{y'}Fe_{y''})_yO_n$ must be capable of forming a metal carbonate at the conditions of and in the course of the hydrogen generating process via reaction of the complex metal oxide with carbon dioxide (Equations 3 and 4). Some initial guidance for the choice of this element can come from available reaction enthalpy and free energy data for the formation of carbonate from the element's reaction with carbon dioxide (Equation 4b). A second consideration however, is that the formed metal carbonate must be capable of forming the complex metal oxide with a concomitant liberation of $CO_2$ (Equation 8).

Elements of the "B" component of the general formula of the complex metal oxide are selected from the group of V, Mn, Fe, Co, Ni, Cu, and mixtures thereof. These elements are capable of existing as oxides in at least two oxidation states and at the conditions of the hydrogen producing process they also may be present in the metallic or zero valent oxidation state. This "B" component also may comprise the same element in two or more different oxidation states, thus providing a further degree of flexibility and control on the overall thermochemistry of the process (Equations 7 and 8).

This overall thermochemistry additionally depends on the enthalpy, $\Delta H$, and the Gibbs free energy, $\Delta G$, changes for the formation of the complex metal oxide from its binary oxide precursors (Equation 10). L. A. Reznitskii in *Neorganisheskie Materialy* (*Inorganic Materials*), Vol. 29, No. 3, pp 386-389 "Enthalpic Stabilization of Some Complex Oxides" and also L. A. Reznitskii in *Inorganic Materials*, Vol. 32, No. 4, 1966, pp 444-451, have provided methods for estimating the enthalpy of formation of complex oxides.

The above considerations in the selection and use of the complex metal oxide for the embodiments of this invention will be evident in the experimental Examples 1-11 and in the illustrative thermodynamic calculations and results provided in Example 15 for the $Ca_2MnFeO_5$ complex metal oxide.

While embodiments of the present invention are described above in terms of two cyclic process steps requiring two reactors, the process may utilize more than two reactors. For example, depending on the duration of the production and regeneration steps, three or more reactors containing complex metal oxide and steam-reforming catalyst may be operated in a cyclic manner. If the regeneration step is longer than the hydrogen production step, for example, three reactors may be used wherein one operates in the production step and while other two operate in the regeneration step.

The following Examples illustrate embodiments of the present invention but do not limit the invention to any of the specific details described therein. Test apparatus was designed and constructed to carry out experiments described in these Examples. FIG. 1 shows a schematic diagram of the experimental system which was used for evaluating the performance of complex metal oxide and steam-methane reforming catalyst combinations for the generation of hydrogen from steam/methane. The experimental runs utilized a conventional fixed-bed reactor constructed out of a stainless steel tube with an internal diameter of ½ inch. A quartz frit was placed into the middle of the tube to support the catalyst bed while a K-type thermocouple was inserted from the top with its tip right on the surface of the frit. A second K-type thermocouple was placed outside of the tube and near the center of the tube, but within the tubular furnace to control the reaction temperature. Both ends of the furnace were filled with a high temperature fiber insulation to minimize axial temperature gradients within the furnace. A UHP grade of methane was used in the investigation as a substitute for natural gas. Argon was used as a diluting gas during the reaction and as a purging gas before the regeneration. 20% oxygen/argon was used as artificial air during the regeneration process. All the gases were obtained from National Welders Supply. Liquid water was pumped through an Isco pump (model 314, LC5000, 260D) into a preheating zone of the reactor to form steam before mixing with methane and argon. The gas analysis was carried out with a MTI micro gas chromatograph (model M200), equipped with two columns. Column A was packed with molecular sieve 5A for the separation of hydrogen, methane and carbon monoxide while column B was packed with HayeSep A for the separation of carbon dioxide, ethane, ethylene, propane and propylene. The oven temperatures for columns A and B were 110 and 80° C., respectively. The water vapor from the product stream was removed by a chiller installed before the GC. The GC was routinely calibrated with a 1% mixture of hydrogen, methane, carbon monoxide and carbon dioxide balanced in Argon (purchased from Matheson Gas Products, Inc.).

EXAMPLE 1

Methods for the Preparation of Complex Metal Oxides Including Oxides with In-Situ Catalytic Metals The complex metal oxides were prepared by a variety of procedures as referenced in Table 1. The methods used included the ceramic method wherein the component oxides are heated together, the flux method utilizing molten salts, and the thermal decomposition of co-precipitated carbonates. References regarding these synthetic procedures are provided in conjunction with Table 1.

Complex metal oxides used for the investigation of the steam-methane reforming reaction were prepared via the carbonate precursor method as described by K. Vidyasagar et al "A Convenient Route for the Synthesis of Complex Oxides Employing Solid-Solution Precursors, in *Inorganic Chem.* (23), 1984, 1206-1210.

As initial scoping work to identify potentially useful complex metal oxides, the reversibility of the reaction of each metal oxide with carbon dioxide (in the absence of any hydrocarbon co-feed) was monitored using a simultaneous thermogravimetric analysis-differential thermal analysis (DTA-TGA) instrument wherein the sample was exposed to carbon dioxide and oxygen atmospheres. Typically the oxide was contacted with a flow of carbon dioxide and the temperature was then slowly increased while recording changes in weight and the heat flow rate to or from the sample. Then the carbonated sample was treated with oxygen.

The TGA residue for each run was analyzed by powder X-ray diffraction to identify the reaction products. Table 1 lists complex metal oxides which were in this way found to reversibly react with carbon dioxide by the stated chemistry. Typically, the complex metal oxide, $A_xB_yO_n$, reacts with $CO_2$ to yield the $ACO_3$ metal carbonate and a binary or lower complex oxide with in some cases evolution of $O_2$. The temperature required for a regeneration of the complex metal oxide with oxygen is lower than that for a dissociation of the carbonate to just the binary metal oxide (see temperature data in Table 1). It is important to note that this method to identify suitable candidates has limitations if used by itself, because compounds such as $Ca_2MnFeO_5$ show little reactivity towards carbon dioxide under TGA conditions, but are active in steam-methane reforming as shown by Examples 8 and 10 to 13 below. This may be due to the high kinetic stability of the complex metal oxide under non-reducing conditions.

a. Preparation of $Ca_2Co_2O_5$

Figure 2:
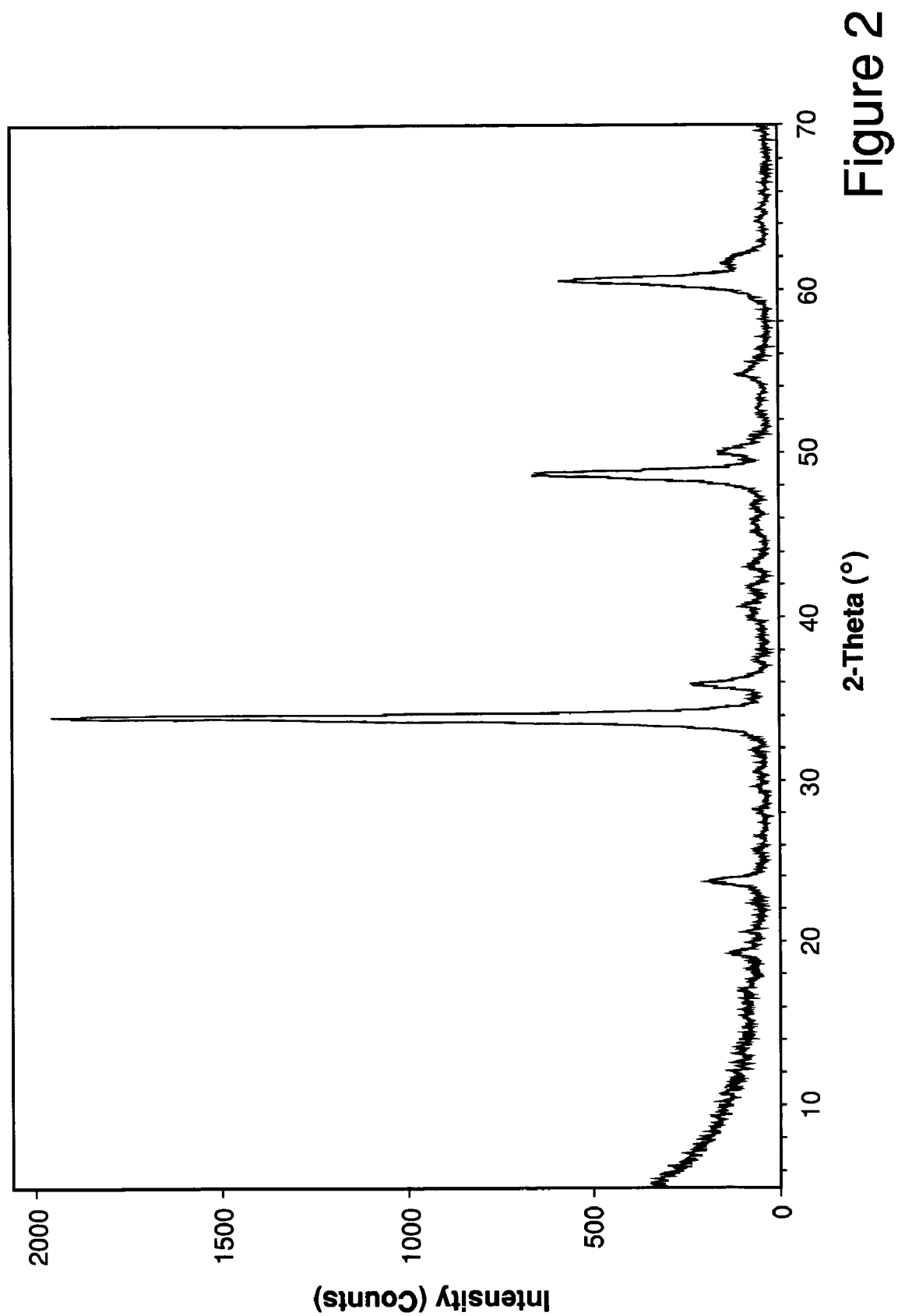
FIG. 2 is a powder X-ray diffraction trace for $Ca_2FeMnO_5$ as prepared in Example 1.

Solutions of 0.50 M $Ca(NO_3)_2$ and 0.50 M $Co(NO_3)_2$ were prepared and co-precipitated with a 1.0 M $NaHCO_3$ solution at temperatures near the boiling point, while passing carbon dioxide gas through the solution. Once the precipitation was complete, the precipitate was isolated and dried, first at room temperature in air for 1 day and then under vacuum for 1-2 days at 90-100° C. The product was identified as $CaCo(CO_3)_2$ by powder X-ray diffraction and had the aragonite ($CaCO_3$) structure. The $CaCo(CO_3)_2$ precursor was heated at 650° C. for 6 hours under oxygen flow and allowed to slowly cool to room temperature to yield $Ca_2Co_2O_5$.

b. Preparation of $Ca_2FeMnO_5$:

Solutions of 0.50 M $Ca(NO_3)_2$, 0.25 M $MnCl_2$ and 0.25 M $Fe(NO_3)_3$ were prepared and co-precipitated with a 1.0 M $NaHCO_3$ solution at a temperature near the boiling point, while passing carbon dioxide gas through the solution. Once the precipitation was complete, the precipitate was isolated and dried, first at room temperature in air for 1 day and then under vacuum for 1-2 days at 90-100° C. The product was identified as $Ca_2FeMn(CO_3)_5$ by powder X-ray diffraction and was calcined at 730° C. for 10 hours under oxygen flow to yield $Ca_2FeMnO_5$. The $Ca_2FeMnO_5$ was characterized by powder x-ray diffraction and a plot of intensity vs. 2-theta is given in FIG. 2.

c. Preparation of the mixed phases of CaO and NiO:

Efforts to prepare single phase $CaNiO_2$ via the carbonate precursor method were not successful and instead a two-phase mixture of CaO and NiO was obtained. A mixture of CaO and NiO with a nominal stoichiometry of $Ca_2NiO_3$, was prepared by the same method.

The preparation of a calcium nickel oxide, having a reported formula of $CaNi_4O_8$, by exchange of calcium ions for potassium ions in potassium nickelate at room temperature in aqueous solutions is reported in *Kristallografiya* Vol. 29, 1984, 450-454, by Bityutskii, P. N. and Khitrova, V. I. The production of calcium nickelate ($CaNiO_2$) by combination of calcium oxide and nickel oxide was not achieved at 700° C. as described in Example 5 below.

d. Preparation of Ni-doped $Ca_2FeMnO_5$, $MgCaFeMnO_5$, and Pt-doped $Ca_2FeMnO_5$:

Solutions of 0.50 M $Ca(NO_3)_2$, 0.20 M $MnCl_2$, 0.20 M $Fe(NO_3)_3$, 0.10 M $Ni(NO_3)_2$ were prepared and co-precipitated with a 1.0 M $NaHCO_3$ solution at temperatures near the boiling point while bubbling carbon dioxide gas through the solution. After the precipitation was complete, the product was separated by filtration and thoroughly rinsing with deionized water. The carbonate precursor was obtained after drying the sample at room temperature for 1 day and then under vacuum at 90-100° C. for 2 days. The final metal oxide was prepared by calcining the carbonate precursor at 730° C. for 10 hr under oxygen flow. The composition of the metal oxide, obtained from thermogravimetric analysis, was $Ca_2FeMn(NiO)_{0.4}O_5$.

$CaMgFeMn(NiO)_{0.4}$ was made in the same way using $Mg(NO_3)_2 6H_2O$ as the magnesium source. By using the same method, the Pt-doped $Ca_2FeMnO_5$ was prepared via co-precipitation of the solution of 0.50 M $Ca(NO_3)_3$, 0.25 M $MnCl_2$, 0.25 M $Fe(NO)_3$, 0.005 M $H_2PtCl_6$ with a 1.0 M $NaHCO_3$ solution. The final composition of the metal oxide, obtained from EDS and TGA analysis, was $Ca_2FeMnO_5 (Pt)_{0.01}$.

TABLE 1

Complex Metal Oxides that react reversibly with $CO_2$

| Metal Oxide | Temp Range, ° C., for $CO_2$ Reaction | Chemical Equation during the Weight Gain | Temp for Regeneration with $O_2$, Oxide Synthesis (References in parentheses) |
|---|---|---|---|
| $Ca_2Co_2O_5$ | 275-802 | $6Ca_2Co_2O_5 + 12CO_2 = 12CaCO_3 + 4Co_3O_4 + O_2$ | 720° C., By dec. of carbonate at 650° C. under $O_2$. (1) |
| $Ca_2Fe_2O_5$ | 266-680 | $2CaFeO_{2.5} + 2CO_2 = 2CaCO_3 + Fe_2O_3$ | 600° C., By dec. of carbonate at 800° C. under $O_2$. (1) |
| $Ca_2CoMnO_5$ | 300-740 | $6Ca_2CoMnO_5 + 6CO_2 = 12CaCO_3 + 3MnCo_2O_4 + Mn_3O_4 + O_2$ | 550° C., By dec. of $Ca_2CoMn(CO_3)_5$ at 700° C., $O_2$. (1) |
| $Ca_2FeCoO_5$ | 350-750 | $6Ca_2FeCoO_5 + 6CO_2 = 12CaCO_3 + 2Fe_3O_4 + 2Co_3O_4 + O_2$ | 615° C., By dec. of $Ca_2FeCo(CO_3)_5$ at 700° C., $O_2$. (1) |
| $Ca_2CuO_3$ | 400-886 | $Ca_2CuO_3 + 2CO_2 = 2CaCO_3 + CuO$ | 700° C., by ceramic method (2) |
| $Sr_2Co_2O_5$ | 433-1100 | $2Sr_2Co_2O_5 + 4CO_2 = 4SrCO_3 + 4CoO + O_2$ | 846° C., by ceramic method (3) |
| $SrCoO_{2.52}$ | 400-1100 | $SrCoO_{2.52} + CO_2 = SrCO_3 + CoO + 0.26CO_2$ | 820° C., by ceramic method quenched. (4) |
| $Sr_2Ni_2O_5$ | 420-1100 | $2Sr_2Ni_2O_5 + 4CO_2 = 4SrCO_3 + 4NiO + O_2$ | 934° C., by flux method at 1000° C. (5) |
| $Sr_4Ni_5O_{11}$ | 404-1100 | $Sr_4Ni_5O_{11} + 5CO_2 = 5SrCO_3 + 4NiO + O_2$ | 939° C., by flux method at 700° C. (6) |
| $Sr_{0.9}Ba_{0.1}NiO_{2.5}$ | 627-1100 | $20Sr_{0.9}Ba_{0.1}NiO_{2.5} + 20CO_2 = 18SrCO_3 + 2BaCO_3 + 20NiO + 5O_2$ | 892° C., At 700° C. under $O_2$(saturated with water) (7) |
| $Sr_{0.8}Ba_{0.2}NiO_{2.5}$ | 660-1100 | $20Sr_{0.8}Ba_{0.2}NiO_{2.5} + 20CO_2 = 16SrCO_3 + 4BaCO_3 + 20NiO + 5O_2$ | 837° C., At 700° C. under $O_2$(saturated with water) (7) |
| $SrCuO_2$ | 538-1100 | $16SrCuO_2 + 12CO_2 = 8SrCO_3 + 4Sr_2CuO_2(CO_3) + 6Cu_2O + 3O_2$ | 820° C., By ceramic method. (8) |

TABLE 1-continued

Complex Metal Oxides that react reversibly with $CO_2$

| Metal Oxide | Temp Range, ° C., for $CO_2$ Reaction | Chemical Equation during the Weight Gain | Temp for Regeneration with $O_2$, Oxide Synthesis (References in parentheses) |
|---|---|---|---|
| $SrCuO_3$ | 618-1100 | $16Sr_2CuO_3 + 28CO_2 = 24SrCO_3 + 4Sr_2CuO_2(CO_3) + 6Cu_2O + 3O_2$ | 800° C., By ceramic method. (8) |
| $BaNiO_{2.5}$ | 480-1100 | $4BaNiO_{2.5} + 4CO_2 = 4BaCO_3 + 4NiO + O_2$ | 835° C., By ceramic method under $O_2$ flow. (9) |
| $BaNiO_3$ | 410-1100 | $2BaNiO_3 + 2CO_2 = 2BaCO_3 + 2NiO + O_2$ | 987° C., At 700° C. under $O_2$ (9) |
| $BaCuO_2$ | 400-934 | $BaCuO_2 + CO_2 = BaCO_3 + CuO$ | 804° C. (10) |

References for Table 1:
(1) Preparation of $Ca_2Co_2O_5$ and $Ca_2Fe_2O_5$, $Ca_2CoMnO_5$, $Ca_2CoFeO_5$: K. Vidyasagar, J. Gopalakrishnan, and C. N. R. Rao, Inorg. Chem. 1984, 23, 1206-1210.
(2) Preparation of $Ca_2CuO_3$: R. S. Roth, C. J. Rawn, J. J. Ritter, and B. P. Burto, J. Am. Ceram. Soc. 1989, 72(8), 1545.
(3) Preparation of $Sr_2Co_2O_5$: J. Rodriguez, and J. M. Gonzalez-Calbet, Mater. Res. Bull, 1986, 21, 429
(4) Preparation of $SrCoO_{2.52}$: Y. Takeda, R. Kanno, T. Takeda, O. Yamamoto, M. Takano, and Y. Bando, Z Anorg. Allg. Chem. 1986, 540, 259.
(5) Preparation of $Sr_2Ni_2O_5$: Y. Takeda, T. Hashino, H. Miyamoto, F. Kanamaru, S. Kume and M. Koizumi, J. Inorg. Nucl. Chem. 1972, 34, 1599. The compound was first synthesized by Takeda, but we were not able to repeat the procedure (The product always contains some unreacted NiO). The method we used is new. $Sr_2Ni_2O_5$ was synthesized by mixing stoichiometric quantities of $Sr(OH)_2$ and NiO.The mixture was ground in an agate mortar and combined with an appropriate amount of KOH. The reaction mixture was heated for 30 minutes at 1000° C. and allowed to cool to room temperature. The crystalline product was isolated from the soluble flux material.
(6) Preparation of $Sr_4Ni_5O_{11}$: J. Lee, G. Holland, J. Solid. State. Chem. 1991, 93, 262.
(7) Preparation of $Sr_{0.9}Ba_{0.1}NiO_{2.5}$, $Sr_{0.8}Ba_{0.2}NiO_{2.5}$, $BaNiO_3$: R. J. Marcisak, L. Katz, J. Solid. State. Chem. 1978, 24, 295.
(8) Preparation of $SrCuO_2$ & $Sr_2CuO_3$: Y. Wang, B. A. Scott, B. -H. Chen, D. Walker, Physica C. 1997, 52, 275.
(9) Preparation of $BaNiO_{2.5}$: M. Arjomand, D. J. Machin, J. Chem. Soc. Dalton, 1975, 1055.
(10) Preparation of $BaCuO_2$: M. Arjomand, D. J. Machin, J. Chem. Soc. Dalton, 1975, 1061.

EXAMPLE 2

Performance of $Ca_2Co_2O_5$ and 1% $Pt/ZrO_2$ Combination in $H_2$ Synthesis Process The complex metal oxide $Ca_2Co_2O_5$, 6.0330 g, and steam-methane reforming catalyst 1% $Pt/ZrO_2$, 1.0548 g, were physically blended and sieved using a 14-20 mesh (1.4 mm to 850 µm) prior to each use. The reagents were then transferred to the reactor chamber, and the system purged thoroughly with argon. The temperature of the reactor and heat traces was set at 650° C. and 170° C. respectively, and the temperature of the steam generator set at 250° C. Following temperature stabilization, a temperature logger was turned on. After 10 minutes the water supply pump was turned on, followed by the methane flow. The flow rates for methane, steam and argon were 40 sccm, 120 sccm and 80 sccm respectively, at a total pressure of about 30 psia. GC analysis of the gases exiting the reactor was started and repeated at 2 minute intervals throughout each runs.

Upon completion of data collection, the methane and steam lines were switched off. The reactor system was purged using argon gas for several hours until the GC analysis showed that hydrogen concentration was minimal. At that time, the temperature of the reactor was raised to 700° C. Following temperature stabilization, the argon gas was switched off and a supply of 20% oxygen/argon turned on to start the regeneration process. (Argon rather than nitrogen was used as the diluting inert gas in these laboratory experiments to facilitate the GC analysis.) The time needed for the regeneration process varies. Typically, the regeneration process took from about 4 to about 5 hours.

Figure 3:
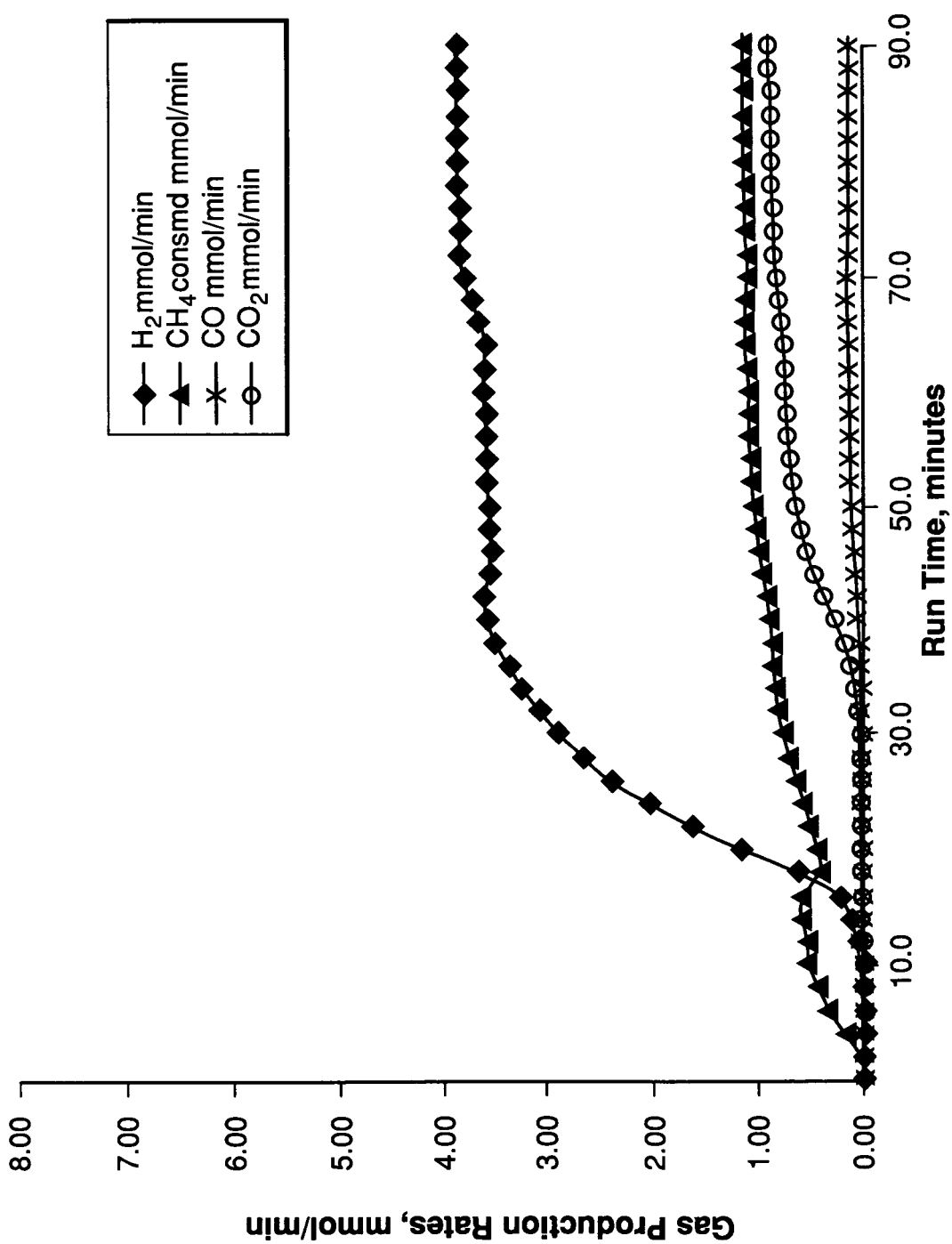
FIG. 3 is a plot of gas production vs. run time and methane consumption rates for the production of synthesis gas from a steam-methane mixture using $Ca_2Co_2O_5$ in combination with 1% Pt on $ZrO_2$ in Example 2.

FIG. 3 shows the plot of rate of gas production for hydrogen, carbon monoxide, carbon dioxide and the rate of methane feed consumption versus time on stream. The reaction process can be generally divided into four regions. The first region, which lasted from the time of initiation of the reaction to about 15 minutes after initiation, is a period which relates generally to the combustion of methane. The reaction at this region is highly exothermic, as demonstrated qualitatively by a temperature rise. The second region of the reaction is from about 15 minutes to about 35 minutes. In this region, an average methane to hydrogen conversion of about 36% was achieved. The ratio of hydrogen produced to methane consumed increased to about 3.75 in this region, while the amount of carbon monoxide and carbon dioxide produced were negligible. Excluding unreacted methane, the product gas was 98% hydrogen. In the second region, the reaction was moderately exothermic.

Figure 4:
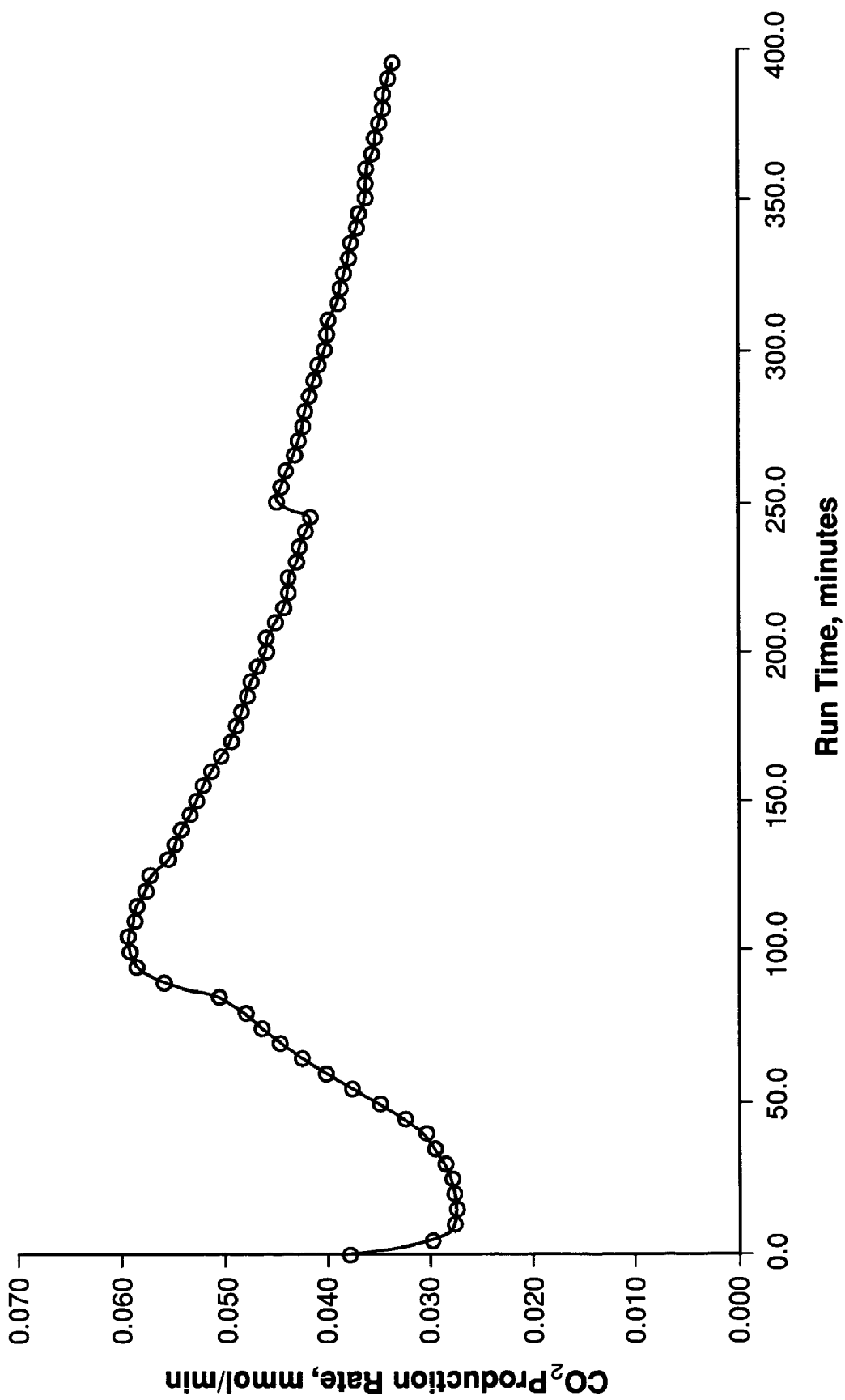
FIG. 4 is a plot of $CO_2$ production rate vs. run time for the regeneration of spent $Ca_2Co_2O_5$/1% Pt on $ZrO_2$ in Example 2.

In the third region, the amount of carbon dioxide produced quickly increased. The ratio of hydrogen produced to methane consumed was about 3.71, but the product gas had a lower purity of hydrogen. Carbon monoxide was not detected by GC at this stage and appeared only in the fourth region. The fourth region started after about 55 minutes from initiation. In this region the reaction gradually changed from exothermic to endothermic in this region as expected for a conventional steam-methane reforming reaction. After the completion of this synthesis reaction, the systems was flushed with argon and the complex metal oxide was regenerated with 20% oxygen/argon. FIG. 4 shows the rate of production of carbon dioxide versus time during this process. The rate of production of carbon dioxide increased gradually initially, but the rate increased quickly after about 70 minutes due to an exothermic reaction at this point, as qualitatively indicated by a temperature rise. After 100 minutes, the rate of carbon dioxide production began to diminish. A total of 16.88 mmol of carbon dioxide was produced in 395 minutes. Carbon dioxide released during the purging stage was not collected.

EXAMPLE 3

Hydrogen Synthesis Process Using a Repeatedly Regenerated Complex Metal Oxide

Figure 5:
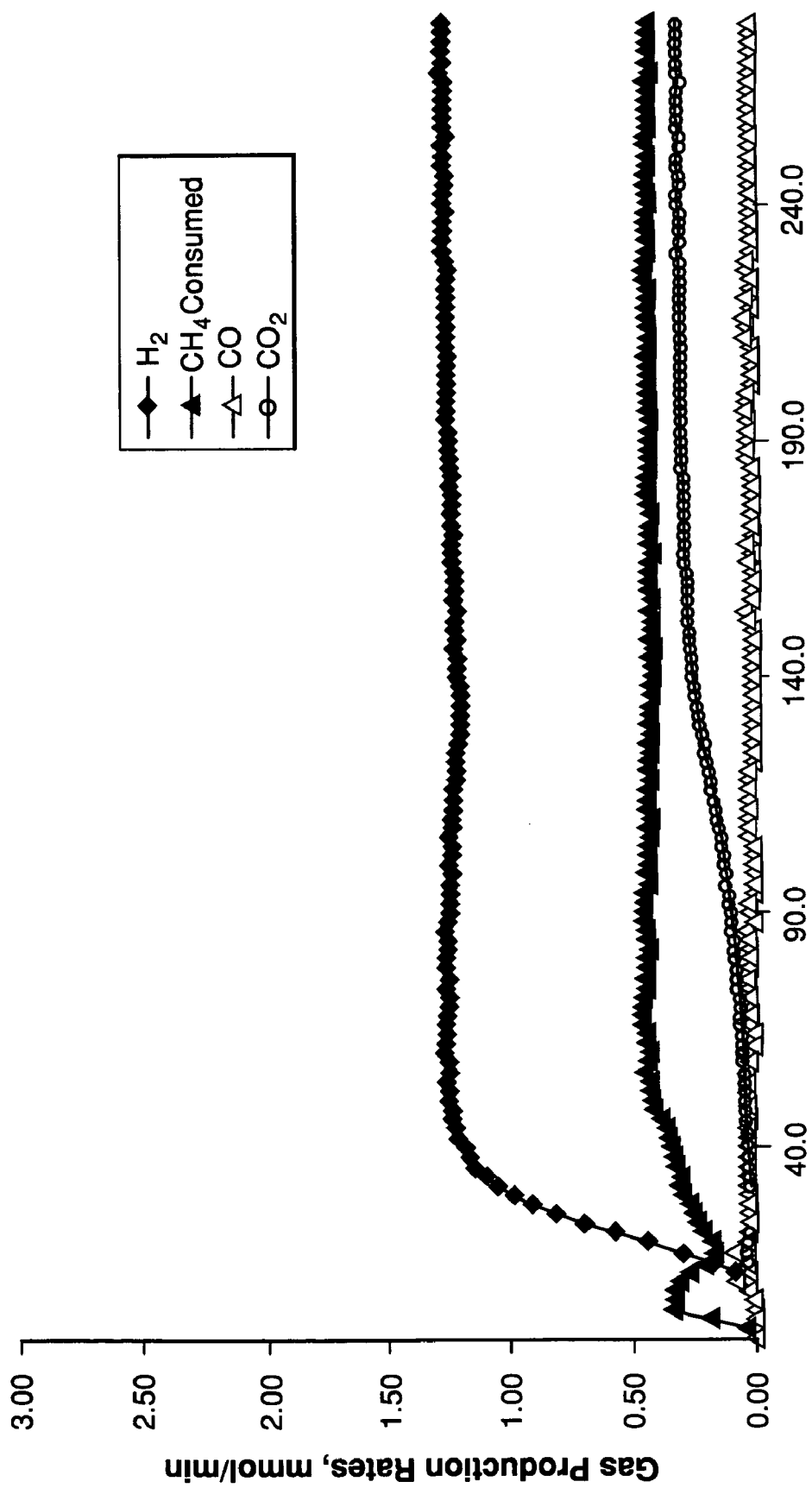
FIG. 5 is a plot of gas production vs. run time and methane consumption rates for the production of synthesis gas from a steam-methane mixture in Example 3 using $Ca_2Co_2O_5$ in combination with 1% Pt on $ZrO_2$, wherein the $Ca_2Co_2O_5$ has been repeatedly regenerated by the method described in Example 2.

The catalyst synthesis and system regeneration described in Example 2 were repeated ten times and the rate of production of gases on stream versus time for the eleventh feed cycle of the reaction was plotted in FIG. 5. The results obtained were very similar to those obtained in Example 2. However, the reaction here is for clarity divided into five regions. The first region was the highly exothermic combustion of methane. Hydrogen production increased rapidly during the second region, at a time of from about 15 minutes to about 40 minutes after initiation of the reaction. In a third region, the reaction became approximately thermoneutral, remaining so until the complex metal oxide was saturated with carbon dioxide at a time of about 100 min. A maximum hydrogen to carbon dioxide ratio of 43.7 was obtained after about 34 minutes of the reaction when the average hydrogen produced to methane consumed ratio was about 3.55. The average methane conversion was 24% and hydrogen purity, excluding methane, was 95%. In a fourth region carbon dioxide production increased until about 140 minutes. At this time the reaction entered a fifth stage, wherein the oxide was mostly spent and conventional catalytic steam-methane reforming was essentially taking place, leading to the production of a mixture of hydrogen, carbon monoxide and carbon dioxide.

EXAMPLE 3A

Regeneration of the Complex Metal Oxide Catalyst

Figure 6:
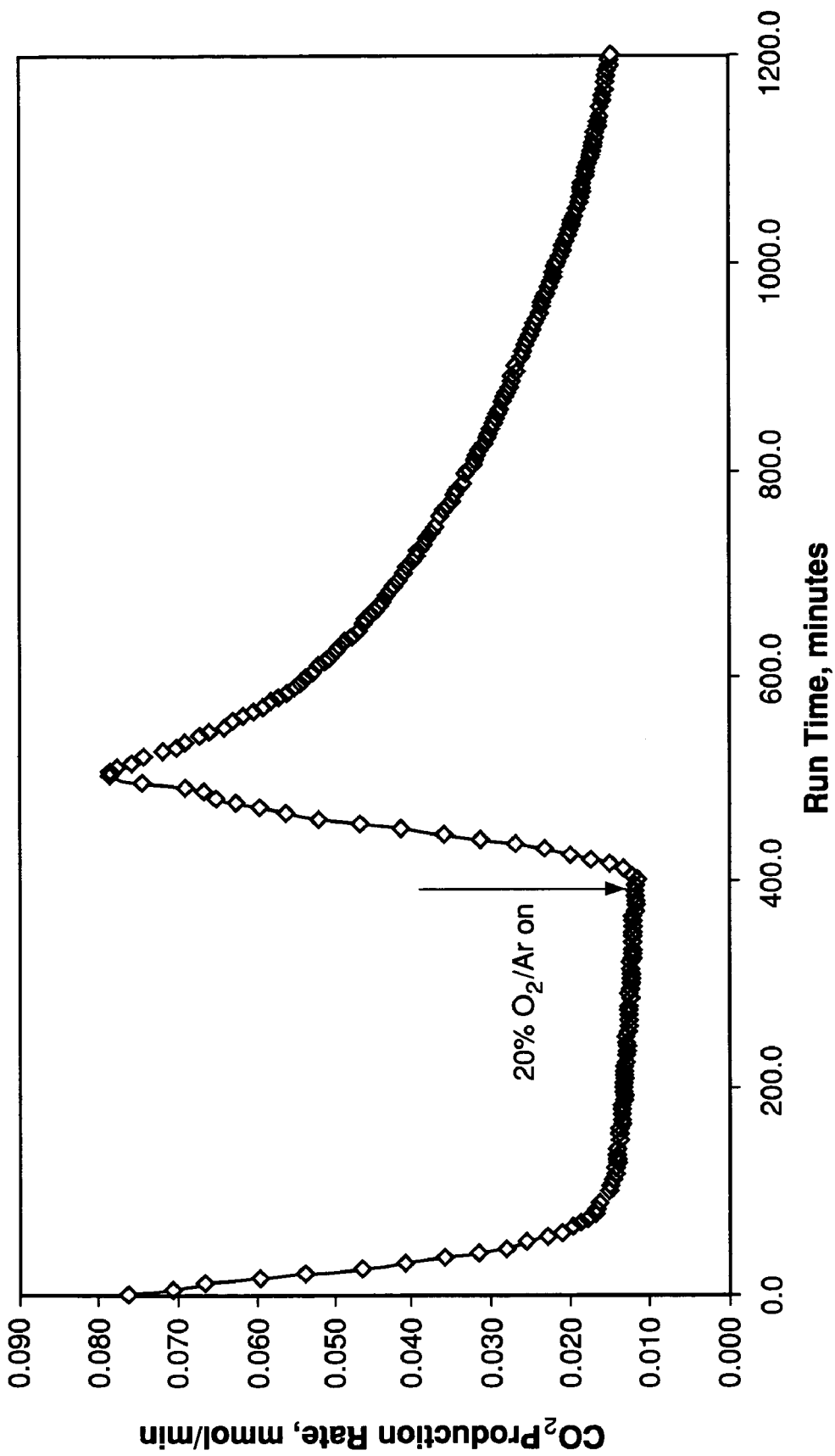
FIG. 6 is a plot of $CO_2$ production rate vs. run time for the regeneration of spent $Ca_2Co_2O_5$/1% Pt on $ZrO_2$ produced in Example 3. Referred to in Example 3A.

FIG. 6 shows the regeneration of the complex metal oxide with oxygen and argon. The regeneration step was monitored by the rate of production of carbon dioxide and the reactor temperature. Regeneration of the complex metal oxide involved four stages. The first stage extended from the time of extinguishing the steam and methane feeds until about 50 minutes later. In a second stage, the system was purged with argon until about 400 minutes after extinguishing the steam and methane feeds, then the argon supply was turned off and a flow of 20% oxygen/argon was introduced. During the third stage, the production of carbon dioxide accelerated, and reached a maximum at 140 minutes after the first input of 20% oxygen/argon. The increase in carbon dioxide production is believed to be partly due to an exothermic reaction occurring during this period, as indicated by a rise in the temperature of the bed from about 710° C. to about 740° C. In the fourth stage, the carbon dioxide production rate gradually decreased, and became much slower during the final stages of regeneration. The rate of carbon dioxide production after about 1295 minutes of heating was very low, about 0.01 mmol/min, and was still diminishing. This, it is believed, indicates that the complex metal oxide can be substantially regenerated. The total amount of carbon dioxide generated by this time was 36.3 mmol as compared to 43.7 mmols of $CO_2$ assuming a quantitative formation of $CaCO_3$ from the $Ca_2Co_2O_5$ complex metal oxide.

EXAMPLE 4

Hydrogen Synthesis and $Ca_2Co_2O_5$ Complex Metal Oxide Regeneration Using an in Situ Reaction Calorimeter (a) Design and Construction of the Reaction Calorimeter In Examples 2 and 3, a single temperature probe of the reactor was used to qualitatively follow the heat changes in the hydrogen synthesis and complex metal oxide regeneration processes. Reaction heats were measured in situ as a function of reaction time. In Example 4 and the following Examples, a reaction calorimeter was used to characterize the reactions and is illustrated schematically in FIG. 7. The reaction calorimeter system comprised multiple thermocouples in a reaction tube or sample reactor to determine the temperatures at different locations in the catalyst bed, for comparison with the temperatures at similar positions in a reference reaction tube without catalyst. A six point profile probe consisting of six thermal sensors was placed inside the probe, the sensors spaced equally ¾ inches apart starting from the tip of the probe. The probe was about ¼ inch in diameter, with an Inconel 600 alloy sheath A hyperlogger built by Omega Engineering Inc. (Omega.com) was used to simultaneously record the data from the 12 (2×6) sensors. In order to measure temperature changes, a reference reactor was employed that was identical in all respects to the design, building material, and physical shape of the sample reactor. Two identical tubes with an inside diameter of ½ inch were built using Incoloy 800HT.

Figure 7:
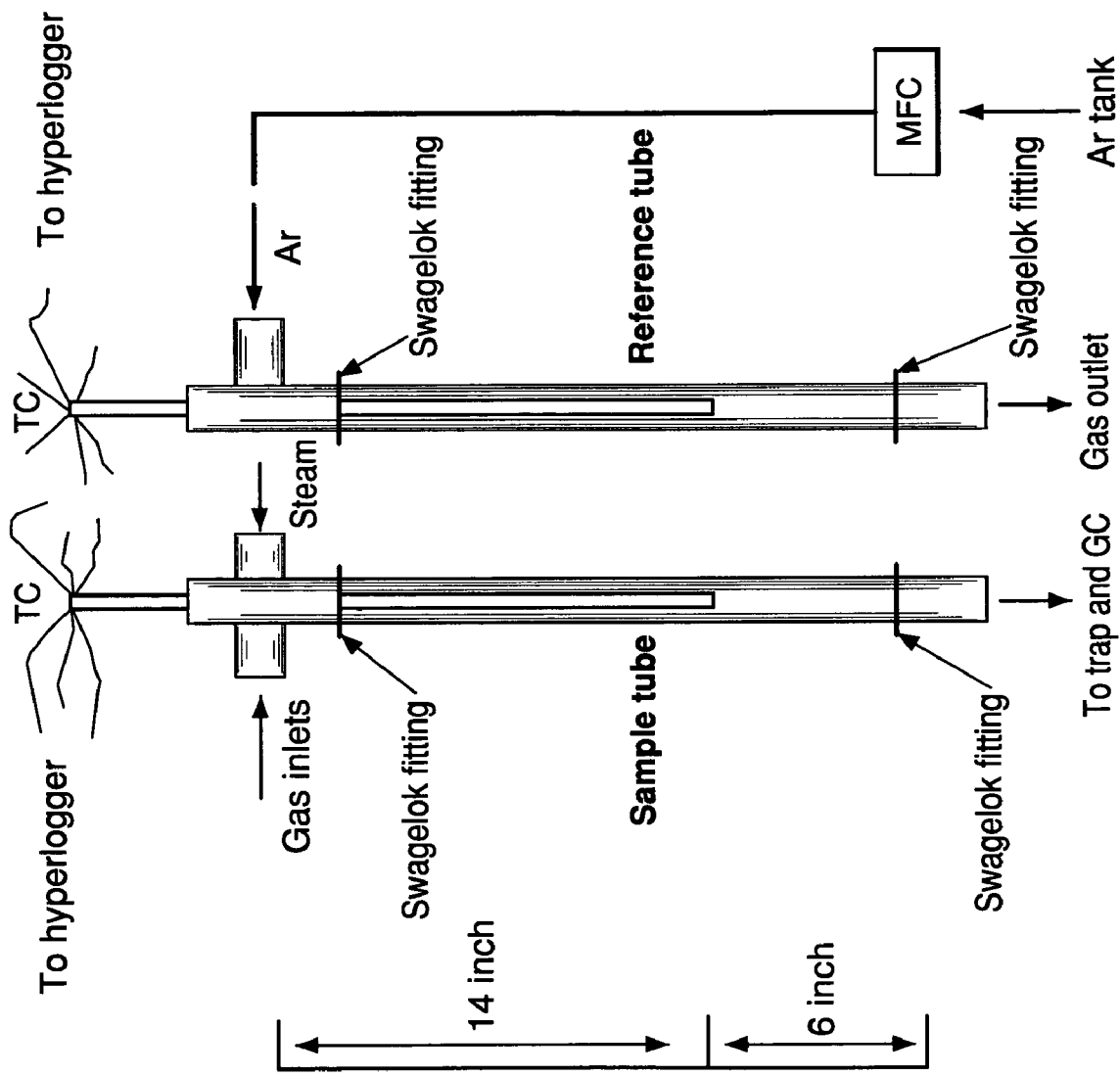
FIG. 7 is a schematic diagram of an experimental reaction calorimeter system used in Examples 4-14.

As shown in FIG. 7, the sample tube was connected to a cross joint through which the steam tube, the gas inlet, and the thermocouples were connected. The bottom of the sample tube is connected to a cold trap through a Swagelok fitting The reference tube was joined to a T-type Swagelok fitting through which the argon inlet and the thermocouples were connected. The steam line was not hooked up to this tube. The bottom of this tube was connected to a gas outlet. In order for the whole catalyst bed to be in the same temperature environment, a split vertical tube furnace was used to house the two reactors. The furnace had an inside diameter of about 2.375 inches and a length of about 12 inches. Both ends were insulated. 15% $NiO/SiO_2$ and 10% $NiO/SiO_2$ oxide standards were used to calibrate the system. These two supported NiO materials were sieved and packed in the same way as was done for the hydrogen synthesis. The catalysts were first reduced and then their oxidation reactions of known thermochemistry at 650° C. were monitored and their temperature changes recorded versus time. A calibration curve was drawn and was used for the subsequent reaction heat calculations.

Figure 8A:
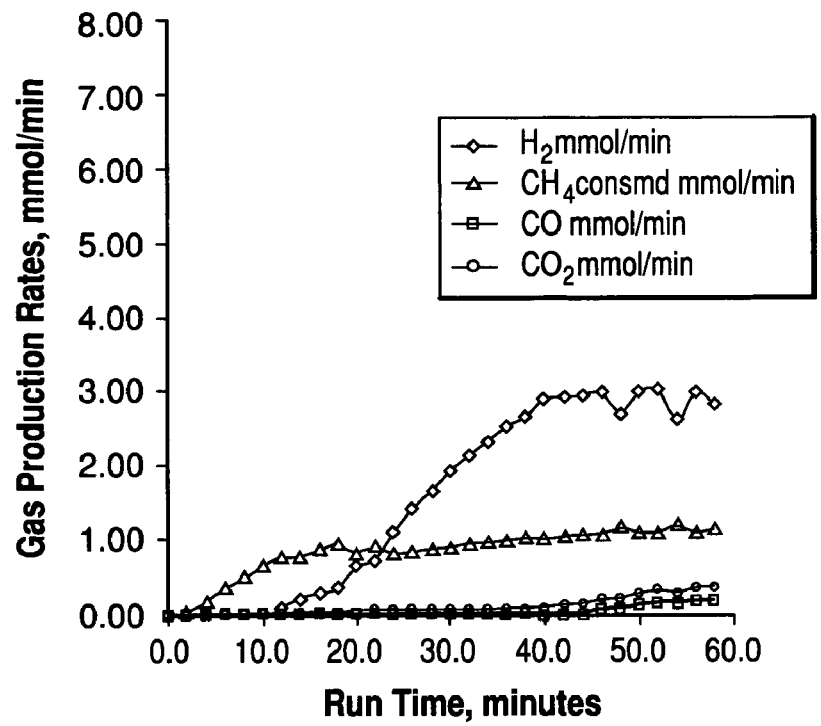
FIG. 8A is a plot of gas production vs. run time and methane consumption rates for the production of synthesis gas from a steam-methane mixture using $Ca_2Co_2O_5$ in combination with 1% Pt on $ZrO_2$ in Example 4.
Figure 8B:
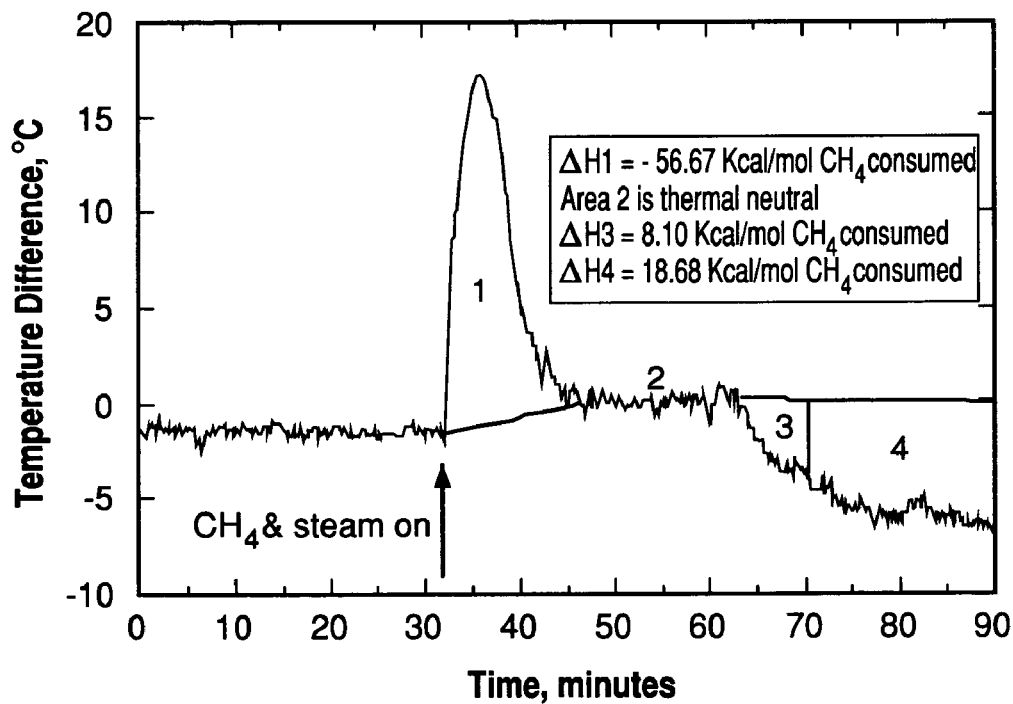
FIG. 8B is a plot of the temperature difference vs. time between equivalent locations in an active catalytic reactor tube and a reference reactor tube during the production of synthesis gas in FIG. 8A in Example 4.

(b) Hydrogen Synthesis and Complex Metal Oxide Regeneration Using the Reaction Calorimeter The hydrogen synthesis reaction using the complex metal oxide $CaCo_2O_5$ and steam-methane reforming catalyst 1% $Pt/ZrO_2$ described in Examples 2 and 3 was run at the same conditions using this differential calorimeter reactor. Results are presented in the combination of FIGS. 8A and 8B. FIG. 8B shows the temperature profile for the steam-methane reforming reaction conducted in the presence of $Ca_2Co_2O_5$ and 1% $Pt/ZrO_2$ with the new reactor, while in the juxtaposed FIG. 8A the production rate of hydrogen, carbon monoxide, and carbon dioxide, and the consumption rate of methane, are plotted versus time. Since there are six sensors for each tube, six differential axial temperature profiles were obtained. The temperature difference between the third in sequence thermocouples of each tube were evaluated as being representative and indicative of the reaction heats in this Example and also in the following Examples.

The analysis of the thermochemistry of the reaction process was initiated by curve-fitting the temperature data in FIG. 8B using the interpolation function of Kaleidagraph software (Synergy Software, Inc.). For clarity purposes, this curve fit is not shown in FIG. 8B and the "B" plots of the following Examples. Four distinct regions were observed. In a first region (1), methane and the catalyst initially contact. The temperature profile of the reaction shows a large upward peak, indicative of a large exothermic process occurring at the beginning of the reaction. Using a calibration curve, the heat generated during this region was calculated to be −56.6 kcal generated per mole of methane consumed, during a period of 18 minutes. The second region (2) was approximately thermoneutral, and was followed by a slightly endothermic region (3) corresponding to 8.1 kcal per mole of methane consumed. Regions 2 and 3 had a total duration of about 25 minutes and correspond to the generation of hydrogen with the carbon dioxide being converted to calcium carbonate. As the oxide became saturated with carbon dioxide, the reaction gradually progressed to a fourth region (4) with an endotherm of about 18.7 kcal of heat per mole of methane consumed.

Figure 9A:
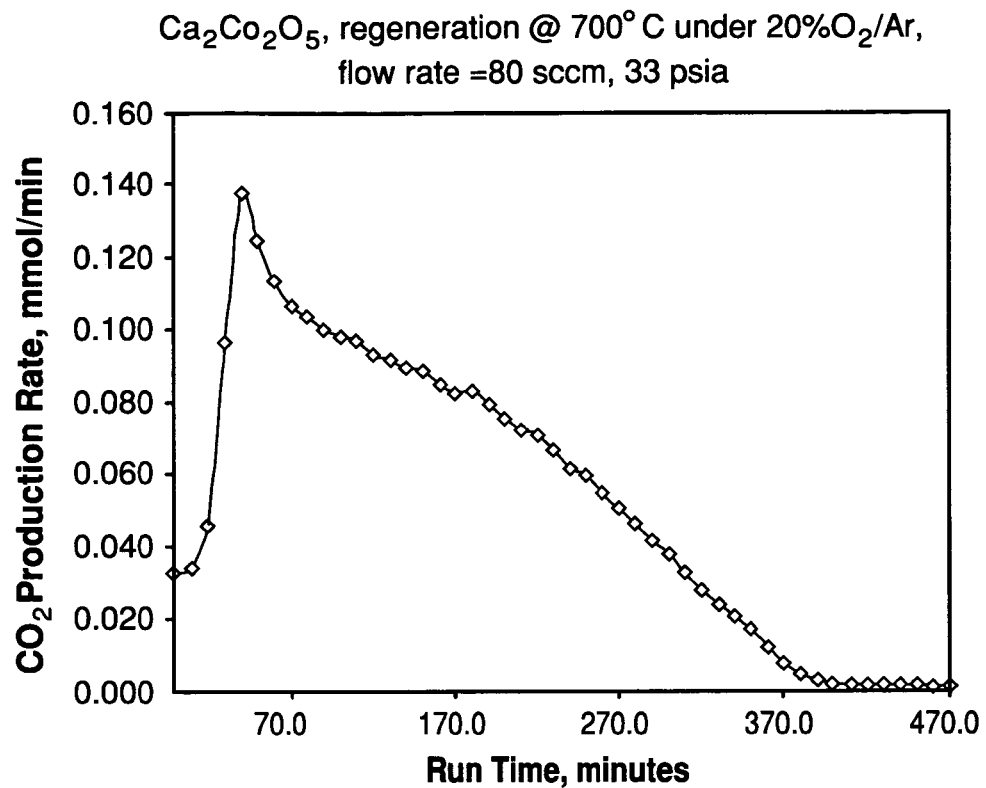
FIG. 9A is a plot of $CO_2$ production rate vs. run time for the regeneration of spent $Ca_2Co_2O_5$/1% Pt on $ZrO_2$ produced in Example 4.
Figure 9B:
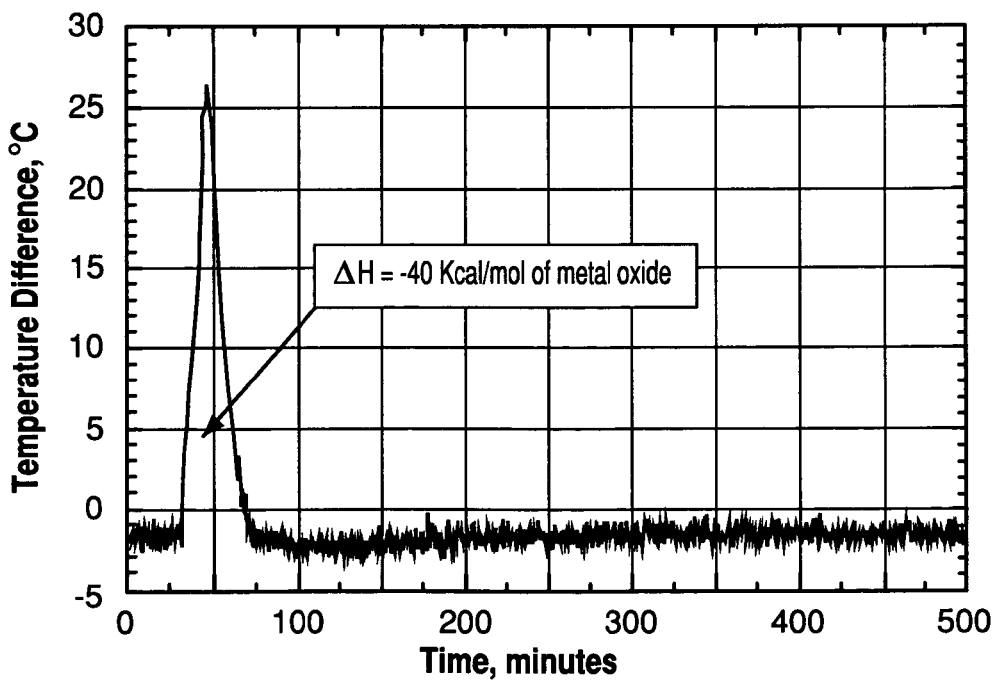
FIG. 9B is a plot of the temperature difference vs. time between equivalent locations in the active catalytic reactor tube and the reference reactor tube during the regeneration step of FIG. 9A in Example 4.

Following a physical separation of the $Ca_2Co_2O_5$ complex metal oxide and the 1% $Pt/ZrO_2$ steam-methane reforming catalyst, the spent $Ca_2Co_2O_5$ was regenerated at 700° C. under 20% oxygen/argon at a flow rate of 80 sccm. FIG. 9A shows the rate of carbon dioxide released from the complex metal oxide versus time on stream. An exothermic process takes place when the feed gas is switched from argon to 20% oxygen/argon. This exothermic process lasted for about 60 minutes, and was calculated, using the calibration curve, to yield −40 kcal of heat per mole of carbon dioxide in the reaction. Because of this exothermic reaction, the carbon dioxide production rate rapidly increased from an initial rate of 0.03 mmol/min to a rate of 0.14 mmol/min, after which point the rate gradually decreased. After the initial 60 minutes of regeneration, where an exothermic process dominates, a near thermoneutral process followed until the end of the regeneration reaction. The regeneration step typically required about 6 hrs for complete regeneration of spent complex metal oxide.

EXAMPLE 5

Figure 10A:
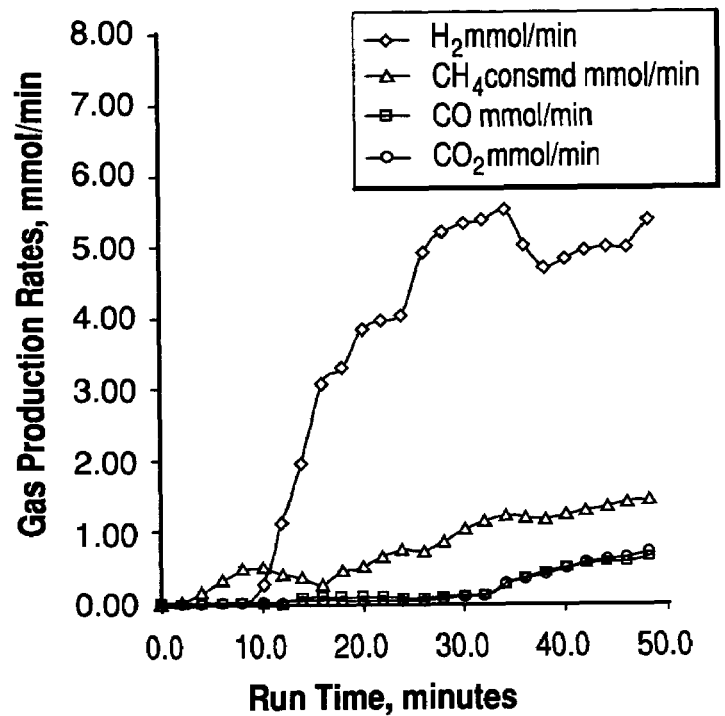
FIG. 10A is a plot of gas production vs. run time and methane consumption rates for the production of synthesis gas from a steam-methane mixture using CaO and NiO in combination with 1% Pt on $ZrO_2$ in comparative Example 5.
Figure 10B:
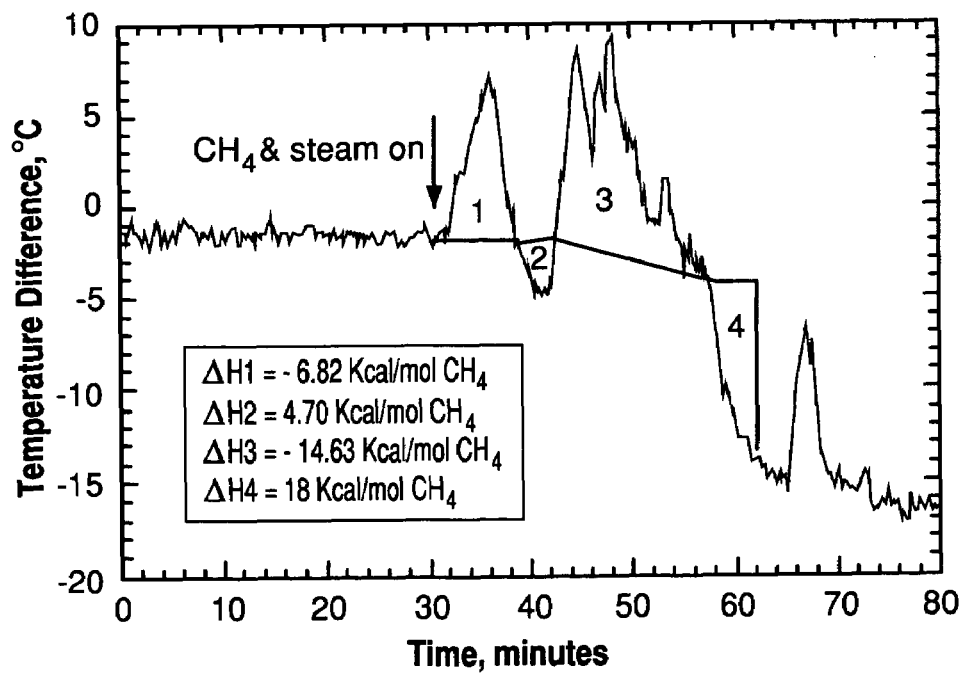
FIG. 10B is a plot of the temperature difference vs. time between equivalent locations in the active catalytic reactor tube and the reference reactor tube during the production of synthesis gas in FIG. 10A in comparative Example 5.
Figure 28:
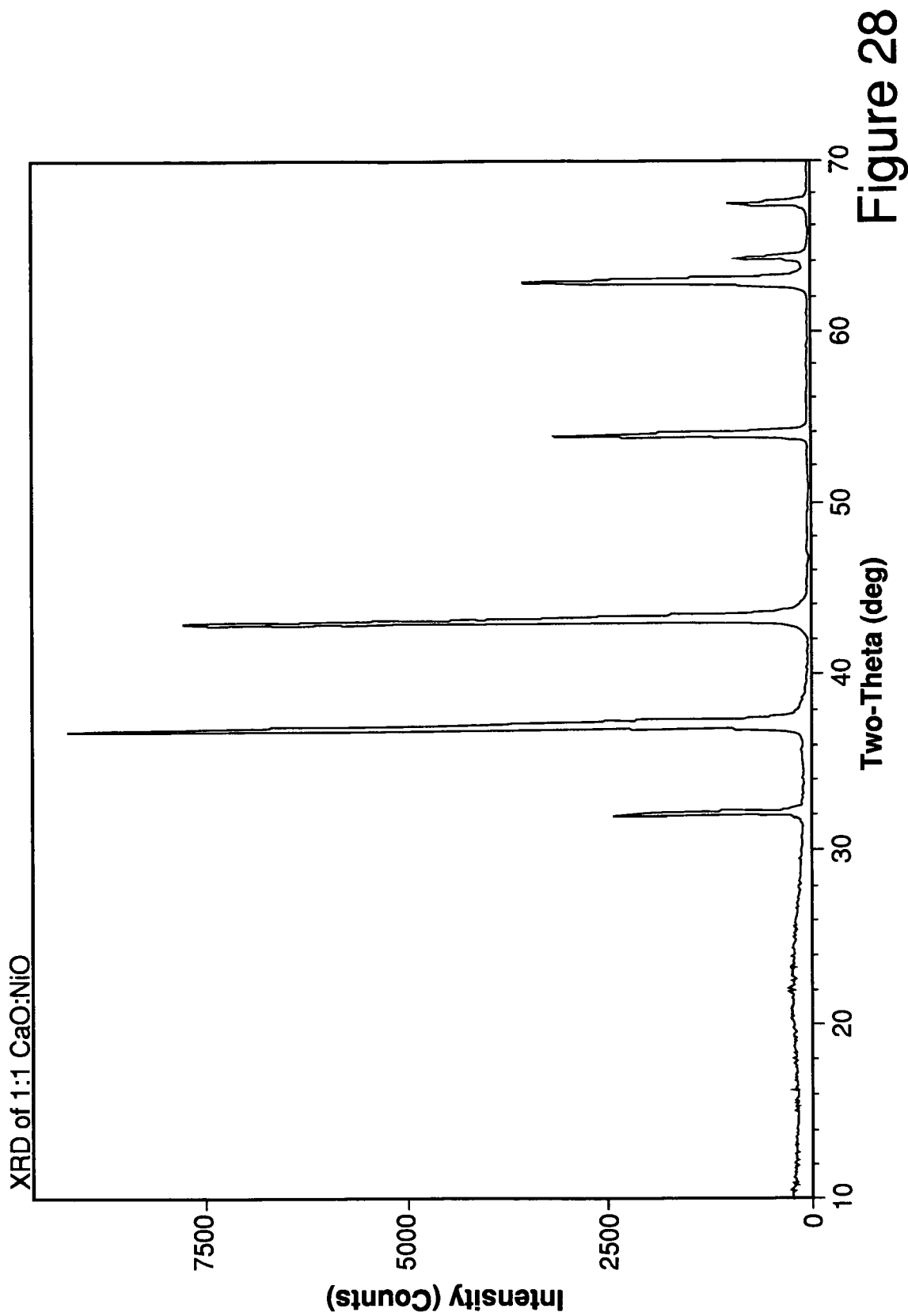
FIG. 28 is an x-ray diffraction pattern (XRD) of a 1:1 molar CaO:NiO mixture after heating at 750° C. for 10 hours under a flow of oxygen.
Figure 29:
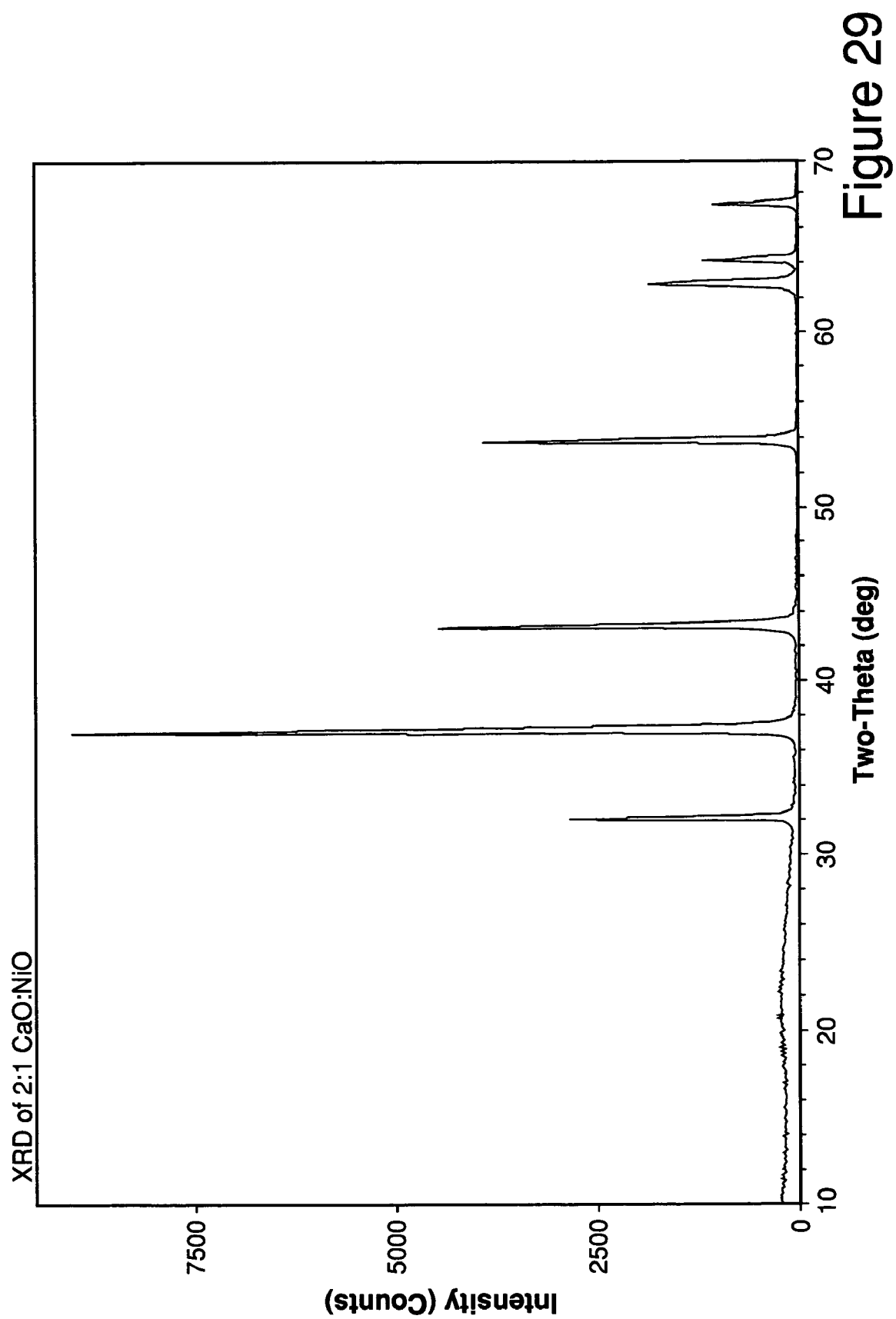
FIG. 29 is an x-ray diffraction pattern (XRD) of a 2:1 molar CaO:NiO mixture after heating at 750° C. for 12 hours under a flow of oxygen.

Comparative Example of the Use of Mixtures of Calcium Oxide, CaO, and Nickel Oxide, Using NiO with $Pt/ZrO_2$ Steam-Methane Reforming Catalyst Two mixtures of CaO/NiO with different metal ratios, 1:1, CaO:NiO (nominally "$CaNiO_2$") and 2:1 CaO:NiO (nominally "$Ca_2NiO_3$") were prepared. Solutions of 0.50 M $Ca(NO_3)_2$ and 0.50 M (0.25 M for $Ca_2NiO_3$) $Ni(NO_3)_2$ were co-precipitated with a 1.0 M $NaHCO_3$ solution according to the same procedure described above for the preparation of $Ca_2Co_2O_5$. The precursors were heated at 750° C. for 10 hours (12 hours for "$Ca_2NiO_3$") under oxygen flow. The mixtures were shown by powder x-ray diffraction (FIGS. 28 and 29) to be physical mixtures of the oxides, not ternary complex metal oxides. A steam-methane reforming reaction was carried out using this 1:1 CaO:NiO mixture and 1% $Pt/ZrO_2$. FIG. 10A shows the rates of production of hydrogen, carbon dioxide, carbon monoxide, and methane versus time on stream. As in the reaction catalyzed by $Ca_2Co_2O_5$ described in the examples above, the reaction process can be subdivided into several regions. The temperature profile of the reaction exhibited multiple exothermic and endothermic peaks, as shown in FIG. 10B. Between 10 and 30 minutes after initiation, a region of substantial production of $H_2$ with little production of carbon monoxide or carbon dioxide by-products was observed.

Figure 11A:
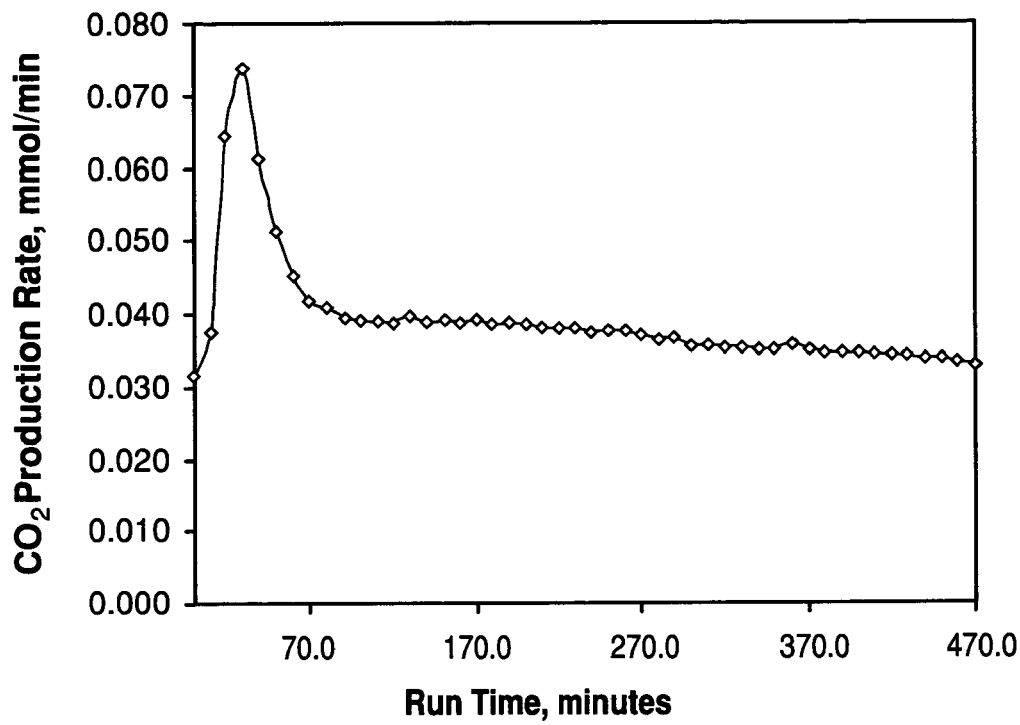
FIG. 11A is a plot of $CO_2$ production rate vs. run time during regeneration of spent CaO and NiO generated during gas production in comparative Example 5.
Figure 11B:
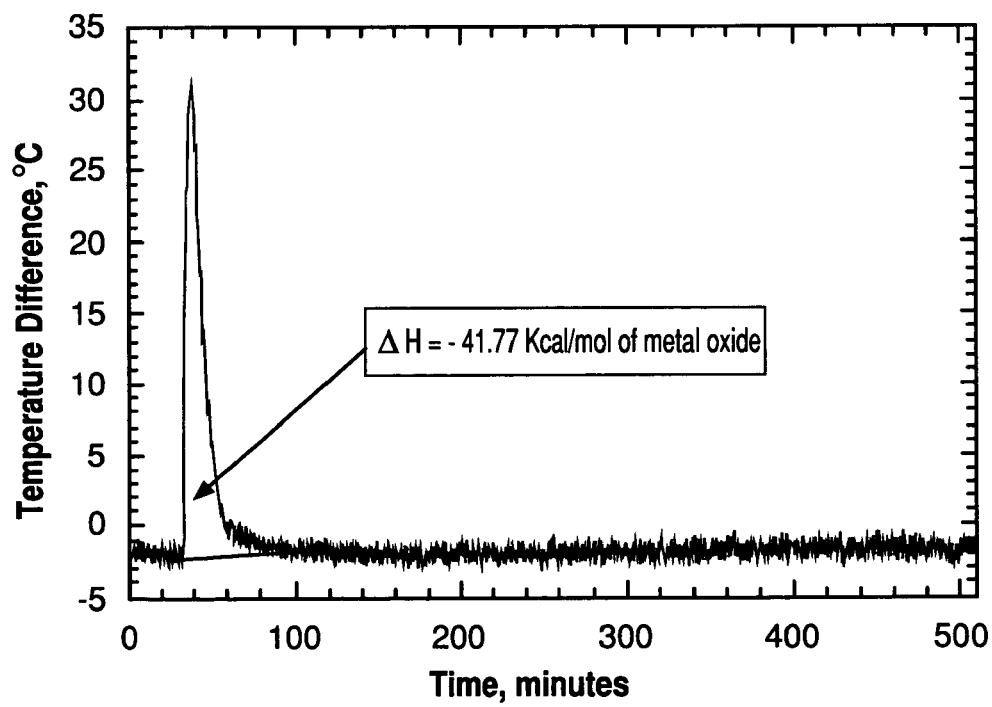
FIG. 11B is a plot of the temperature difference vs. time between equivalent locations in the active catalytic reactor tube and the reference reactor tube during the regeneration step of FIG. 11A in comparative Example 5.

The regeneration reaction of the spent nominally "$CaNiO_2$" was carried out at 700° C. under 20% oxygen/argon. The carbon dioxide production rate and the temperature changes with time on stream were recorded and are shown in FIGS. 11A and 11B, respectively. In accordance with previous results, an initial exothermic reaction was observed, believed to be due to the oxidation of nickel metal to nickel oxide. This reaction yielded 41.8 kcal per mole of nickel. This exothermic event, however, only resulted in a relatively small increase in the rate of carbon dioxide production, which quickly reverted back to the initial rate. Consequently, even after more than 8 hours of heating there was still a substantial rate of $CO_2$ production (~0.035 mmol/min.), thus the said "$CaNiO_2$" was still not completely regenerated, demonstrating that this is not a practical oxide mixture for the preparation of hydrogen by the present process.

Similarly, the nominally "$Ca_2NiO_3$" composition, a physical mixture of 2 parts calcium oxide, CaO, to one part nickel oxide, NiO, and therefore also not a ternary oxide, was also not completely regenerated by heating at 700° C. for 8 hours.

EXAMPLE 6

Hydrogen Generation Using $CaMnO_3$ and $CaMnO_{2.5}$ Complex Metal Oxides

Figure 12A:
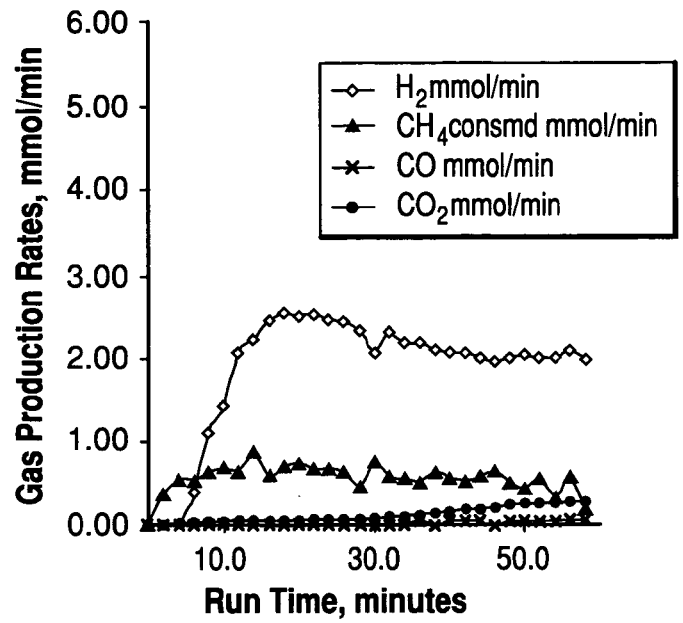
FIG. 12A is a plot of gas production vs. run time and methane consumption rates for the production of synthesis gas from a steam-methane mixture using $CaMnO_{2.5}$ ($Ca_2Mn_2O_5$) in combination with 1% Pt on $ZrO_2$ in Example 6.
Figure 12B:
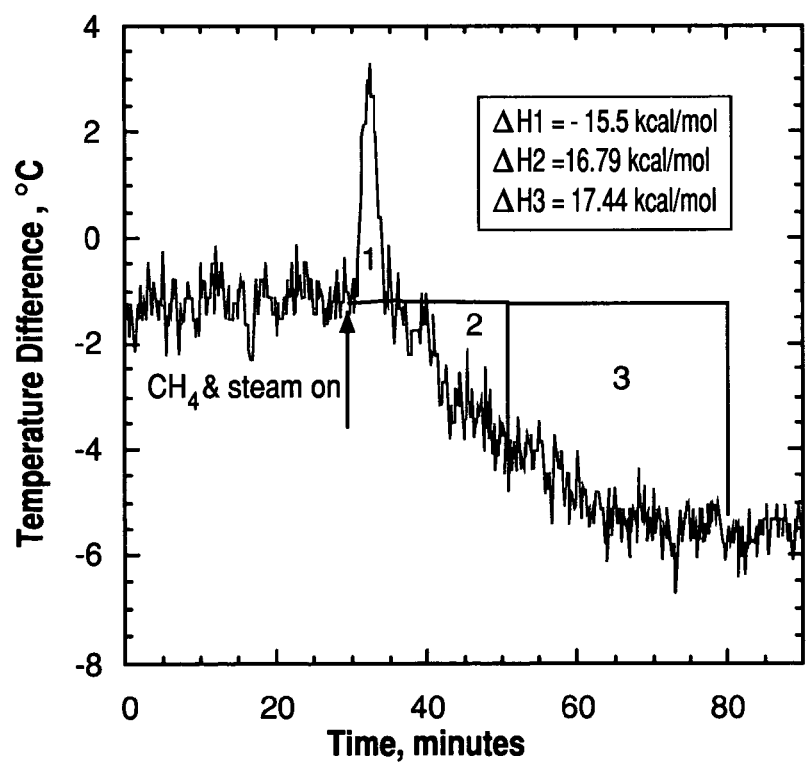
FIG. 12B is a plot of the temperature difference vs. time between equivalent locations in the active catalytic reactor tube and the reference reactor tube during gas production in FIG. 12A of Example 6.

The complex metal oxide $CaMnO_3$ was found to be reactive towards carbon dioxide generated under the steam-methane reforming conditions of Examples 2 to 5. This is in contrast with the results of thermogravimetric analysis (TGA) that showed almost no reaction between carbon dioxide and $CaMnO_3$. The complex metal oxide $CaMnO_{2.5}$ was obtained by the slow reduction of $CaMnO_3$ under a hydrogen atmosphere, and its reactivity towards carbon dioxide under steam-methane reforming reaction condition was investigated. FIG. 12A shows that substantially pure hydrogen was produced from 5 to about 35 minutes on stream. Carbon dioxide uptake with CaMnO2.5 was better than that for $CaMnO_3$. The thermal profile of the reaction, FIG. 12B, showed a moderate exothermic peak at the beginning of the reaction, calculated to be −15.5 kcal/mol per mole of $CH_4$ consumed. This exotherm is much smaller that that observed for $CaMnO_3$. No thermoneutral process regime was observed for $CaMnO_{2.5}$. Following an initial exothermic reaction, the process was observed to be a gradually increasing endothermic process.

EXAMPLE 7

Evaluation of the $CaFeO_{2.5}$ Complex Metal Oxide

The ternary metal oxide $CaFeO_{2.5}$ was synthesized and evaluated in reactions with the steam-methane reforming catalyst 1% $Pt/ZrO_2$ at 650° C. While some selective production of hydrogen was observed, this oxide was found to have little activity towards a retention of carbon dioxide as indicated by the immediate production of carbon dioxide and carbon monoxide. In addition, a purely endothermic reaction was found to dominate the entire reaction. The purely endothermic reaction is understood to be a typical thermal feature of steady state steam-methane reforming reactions.

EXAMPLE 8

Evaluation of the $Ca_2MnFeO_5$ Complex Metal Oxide

Figure 13A:
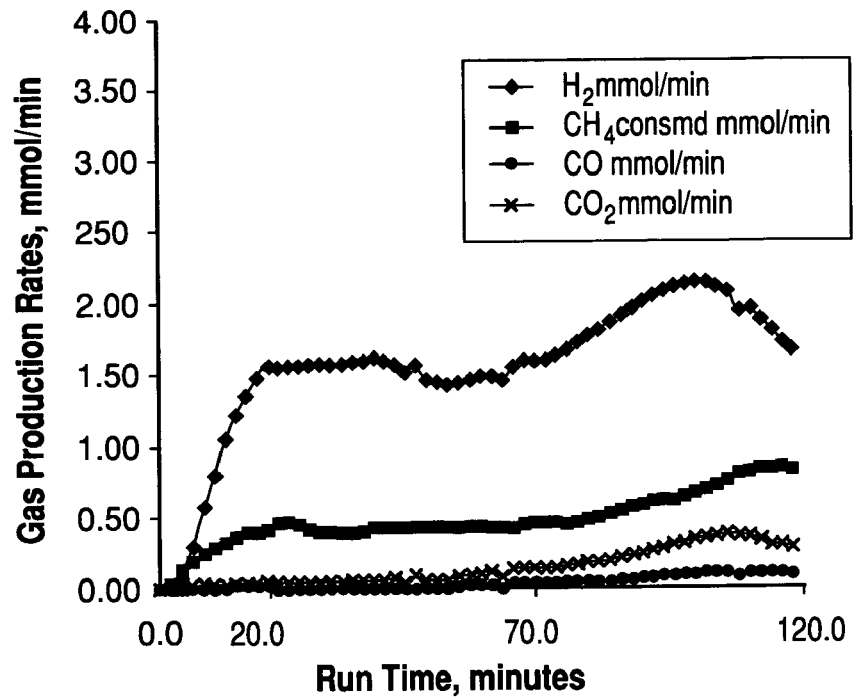
FIG. 13A is a plot of gas production vs. run time and methane consumption rates for the production of synthesis gas from a steam-methane mixture using $Ca_2MnFeO_5$ in combination with 1% Pt on $ZrO_2$ in Example 8.
Figure 13B:
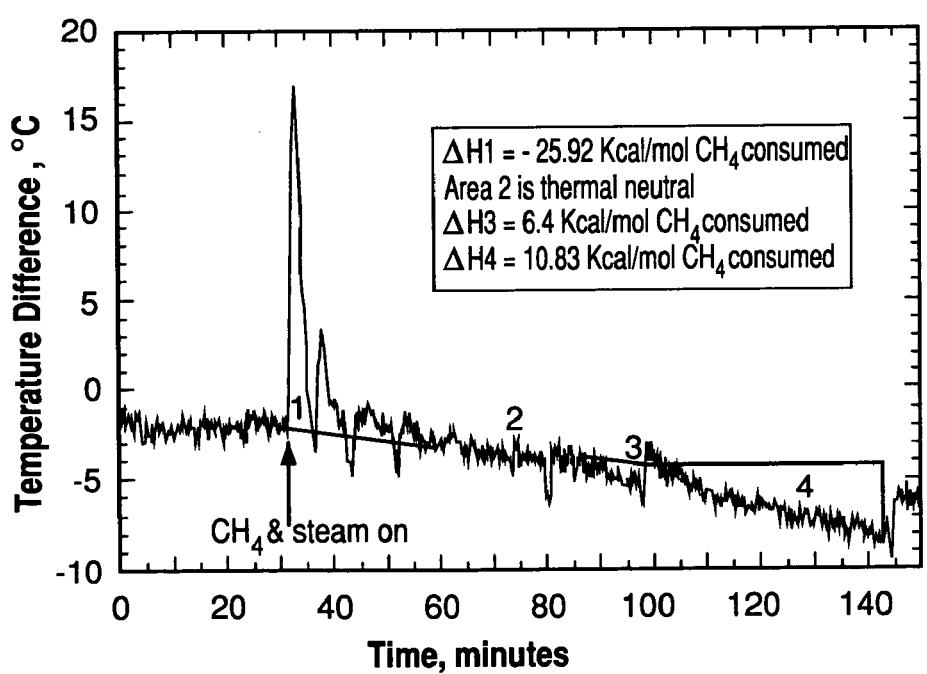
FIG. 13B is a plot of the temperature difference vs. time between equivalent locations in the active catalytic reactor tube and the reference reactor tube during gas production in FIG. 13A of Example 8.

When the reactivity of the complex metal oxide $Ca_2MnFeO_5$ with carbon dioxide was initially investigated by TGA-DTA (Example 1), the analyses suggested that the complex metal oxide was unreactive towards carbon dioxide alone at high temperatures However, under steam-methane reforming reaction conditions, the complex metal oxide became reactive towards carbon dioxide. This is shown in FIG. 13A, which shows that for the initial 40 minutes on stream hydrogen is produced with only very low levels of carbon dioxide and carbon monoxide by-products. FIG. 13B shows the thermal profile of the reaction, and includes calculations which indicate that −25.9 kcal of heat was generated per mole of methane within the first 25 minutes of the reaction (i.e. from the time that the methane and steam were turned on). The initial exothermic reaction was followed by a process which was effected under approximately thermoneutral conditions. During this approximately thermoneutral process the rate of production of hydrogen increased, and became stabilized at about 1.5 mmol/min. The rate of conversion of methane was relatively low at 24%, but the hydrogen produced was 96% pure excluding $CH_4$ content. The carbon dioxide and carbon monoxide production rates began to rapidly increase once the complex metal oxide became spent, and the reaction then as expected became an endothermic reaction.

Figure 14A:
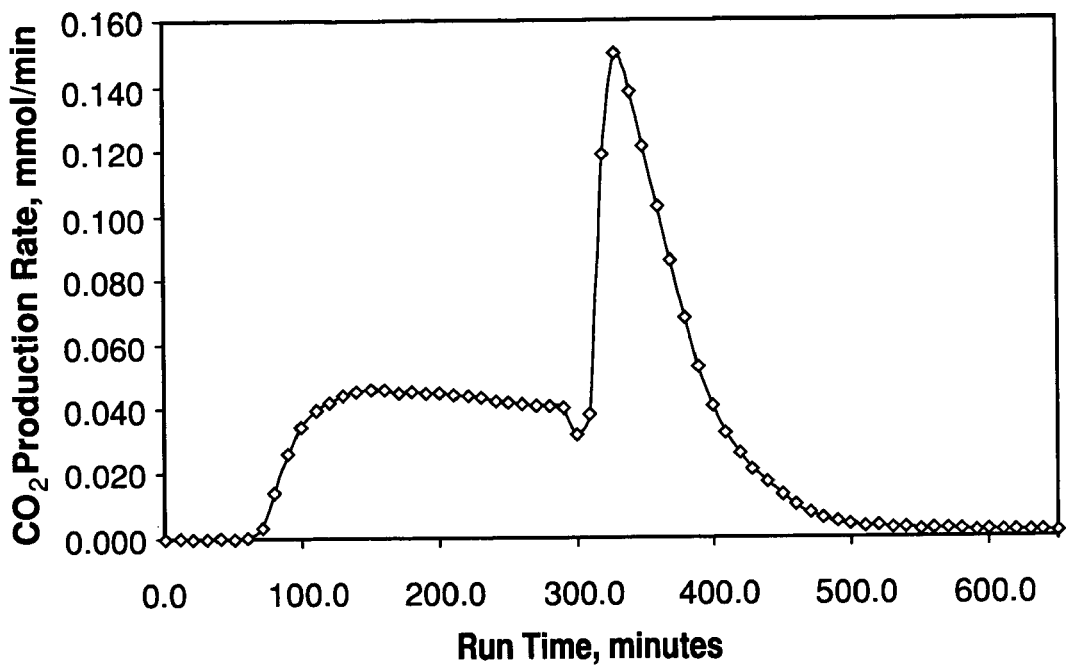
FIG. 14A is a plot of $CO_2$ production rate vs. run time during regeneration of spent $Ca_2MnFeO_5$ generated during gas production in Example 8.
Figure 14B:
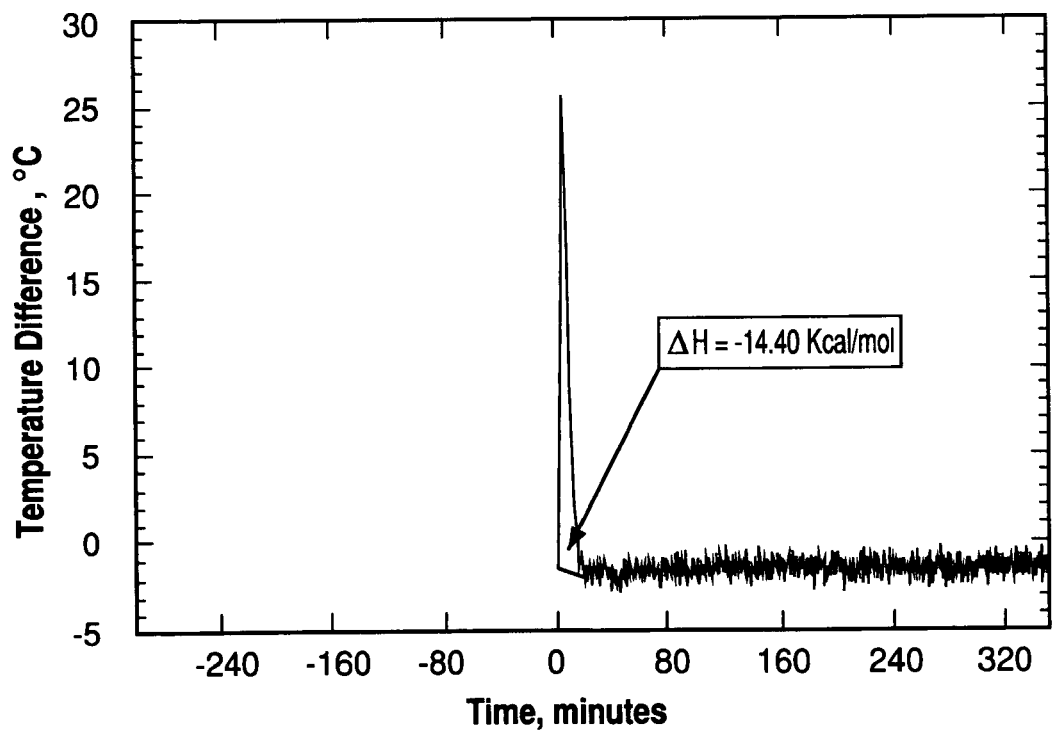
FIG. 14B is a plot of the temperature difference vs. time between equivalent locations in the active catalytic reactor tube and the reference reactor tube during the regeneration of spent $Ca_2MnFeO_5$ generated during gas production in FIG. 14A of Example 8.

The regeneration of $Ca_2FeMnO_5$ was carried out at 700° C. under a stream of 20% oxygen/argon (essentially "artificial air"). The results of the regeneration step are shown in FIGS. 14A and 14B. The initial exothermic process was similar to that observed in the reactions described in the examples above. However, the heat released was much smaller. A total heat of only −14.4 kcal per mole of complex metal oxide was released during the first 30 minutes of reaction. The carbon dioxide production rate, however, also significantly increased during this period. As shown in FIG. 14B, the exothermic reaction was followed by an approximately thermoneutral process until the end of the reaction. It took about 200 minutes to completely regenerate the metal oxide. In this experiment, the temperature difference data recording was only begun at the point at which the $O_2$/Ar was introduced.

EXAMPLE 9

Evaluation of Pt and NiO Impregnated Complex Metal Oxides

In order to increase the methane conversion rate, platinum or nickel (as nickel oxide, NiO) were impregnated into the complex metal oxide during its synthesis. The steam-methane reforming reaction was run at 650° C. under the conditions used in Example 8.

The methane conversion rates at steady state hydrogen production were 76% for $Ca_2Co_2O_5(Pt)_{0.01}$/1% Pt/$ZrO_2$; and 71% for $Ca_2Co_2O_5(NiO)_{0.4}$/1% Pt/$ZrO_2$, respectively. In comparison, the complex metal oxide ($Ca_2Co_2O_5$) alone produced a methane conversion of 36%. The impregnation doping of the oxide with a steam-methane reforming active metal or precursor metal oxide catalyst greatly improved the steam-methane reforming activity of the system.

EXAMPLE 10

Evaluation of a NiO-Doped $Ca_2FeMnO_5$ Complex Metal Oxide Admixed with a 1% Pt/γ-$Al_2O_3$ Catalyst The data produced in Example 3 demonstrated that the 1% PT/$ZrO_2$ catalyst degraded upon repeated cycling. This catalyst degradation problem was subsequently addressed by the use of a commercial 1% platinum on y-alumina catalyst. The catalyst used was manufactured by Alfa Aesar, 26 Parkridge Road, Ward Hill, Mass. 01835-6904. Also, modifications to the analysis system resulted in a lower dead volume in the analytical section of the equipment following the reactor. This led to an analysis system capable of a more rapid response to gas composition changes in the reactor.

Figure 15A:
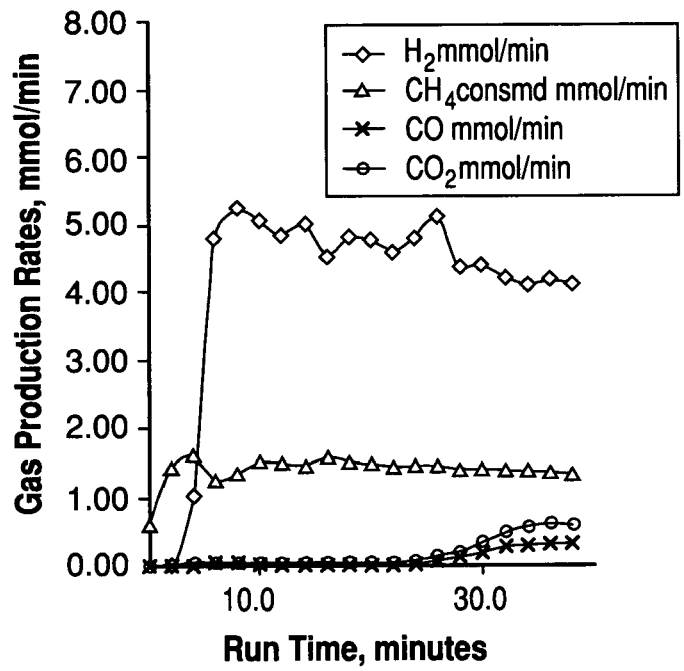
FIG. 15A is a plot of gas production vs. run time and methane consumption rates for the production of synthesis gas from a steam-methane mixture using $Ca_2MnFeO_5(NiO)_{0.4}$ in combination with 1% Pt on $\gamma\text{-}Al_2O_3$ in Example 10.

The steam-methane reforming test reaction was carried out in the presence of $Ca_2FeMnO_5(NiO)_{0.4}$ with an admixed 1% platinum on γ-$Al_2O_3$ catalyst. FIG. 15A shows the rates of production of hydrogen, methane, carbon monoxide, and carbon dioxide production versus time.

Figure 15B:
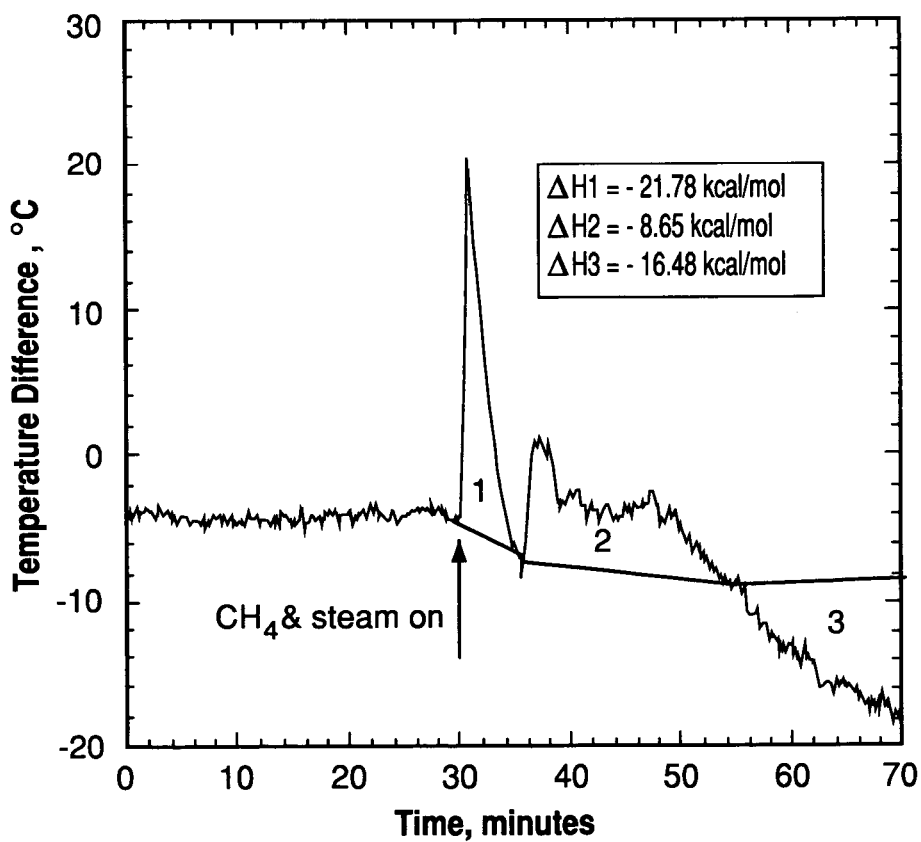
FIG. 15B is a plot of the temperature difference vs. time between equivalent locations in the active catalytic reactor tube and the reference reactor tube during gas production in FIG. 15A of Example 10.

Following an initial exothermic stage (1), the hydrogen production rate rapidly increased to more than 5.0 mmol/min with a methane conversion rate of 84%. The hydrogen to methane ratio remained relatively stable at around 3.36. Limited amounts of carbon dioxide and carbon monoxide were observed in this region, and excluding methane, 98% pure hydrogen was obtained. During this second stage (2) a slightly exothermic reaction, producing about −8.7 kcal per mole of methane consumed, was observed in the recorded temperature profile of the reaction as shown in FIG. 15B. This exothermic stage lasted for about 20 minutes and was followed by a third stage wherein an endothermic reaction took place, the reaction corresponding to the complex metal oxide becoming spent and the reaction gradually moving towards a steady state steam-methane reforming process. In the third stage (3), 16.5 kcal of heat was consumed per mole of methane. In this stage the carbon dioxide and carbon monoxide production rates began to increase toward their maximum steady state values. Also during this stage the hydrogen production rate decreased slightly, yielding a lower purity hydrogen product (94% excluding $CH_4$), along with a decreased methane conversion rate of 76%. At this point, the reaction was stopped. Based upon methane consumption, approximately 2 moles of carbon dioxide were absorbed for each mole of complex metal oxide present.

Figure 16A:
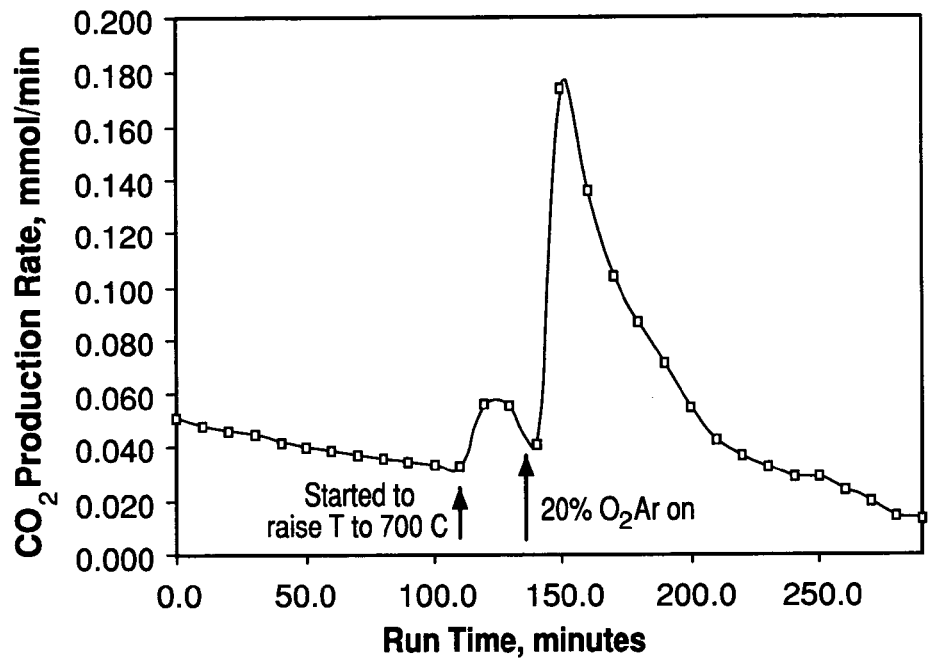
FIG. 16A is a plot of $CO_2$ production rate vs. run time during regeneration of spent $Ca_2MnFeO_5(NiO)_{0.4}$ generated during gas production in Example 10.
Figure 16B:
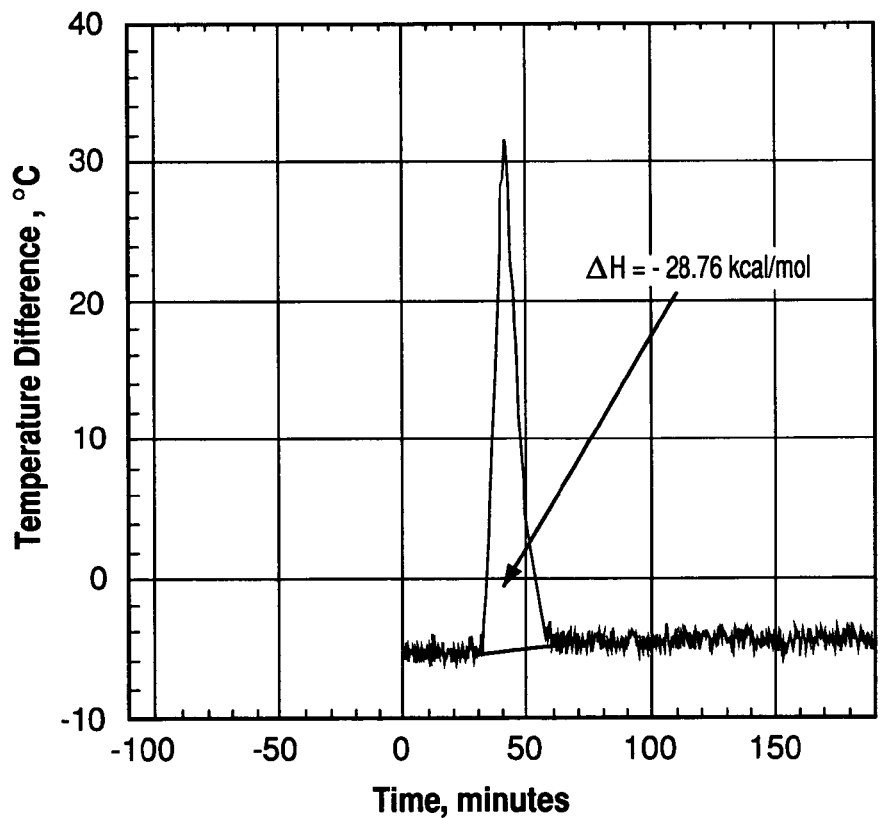
FIG. 16B is a plot of the temperature difference vs. time between equivalent locations in the active catalytic reactor tube and the reference reactor tube during the regeneration of spent $Ca_2MnFeO_5(NiO)_{0.4}$ in FIG. 16A of Example 10.

The regeneration of the spent $Ca_2FeMnO_5(NiO)_{0.4}$ was carried out in the presence of the Pt catalyst at 700° C. under 20% oxygen/argon at a flow rate of 80 sccm. FIG. 16A shows the rate of carbon dioxide released from the metal oxide against time on stream. In the region preceding the first arrow shown in the figure (approximately 110 minutes on stream), the system had been purged with argon at 650° C. for 2 hours to remove any residual hydrogen. The temperature was then raised to 700° C. and the carbon dioxide production rate increased from 0.04 mmol/min to 0.06 mmol/min. The second arrow indicates the point where the 20% oxygen/argon flow was started. An exothermic process began immediately after the gas was switched from argon to 20% oxygen/argon, and continued for about 30 minutes as seen in FIG. 16B. The process yielded −28.7 kcal/mole of complex metal oxide.

This exotherm was greater than that found for the regeneration of $Ca_2FeMnO_5$ with the platinum catalyst described in Example 8, which had an exotherm of −14.4 kcal/mole. The difference in the exotherms is believed to be due to the oxidation of nickel to nickel oxide. Because of this exothermic reaction, the carbon dioxide production rate increased from an initial rate of 0.06 mmol/min to a rate of 0.18 mmol/min, after which the rate gradually diminished. After the first 30 minutes of the regeneration process where the exothermic process dominated, an approximately thermoneutral process followed until the end of the regeneration reaction. On average it took about 5 hours to completely regenerate the spent metal oxide at 700° C.

EXAMPLE 11

Figure 17A:
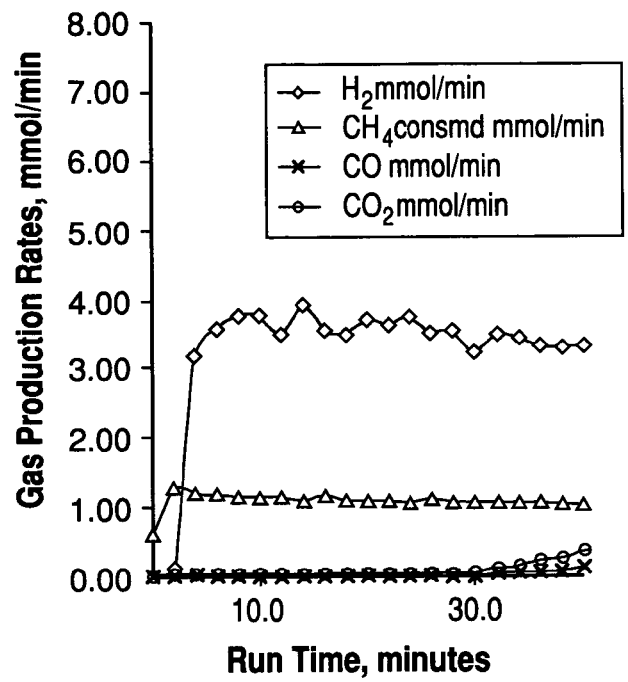
FIG. 17A is a plot of gas production vs. run time and methane consumption rates for the production of synthesis gas from a steam-methane mixture using $Ca_2MnFeO_5(NiO)_{0.4}$ in combination with 1% Pt on $\gamma\text{-}Al_2O_3$ in Example 11.
Figure 17B:
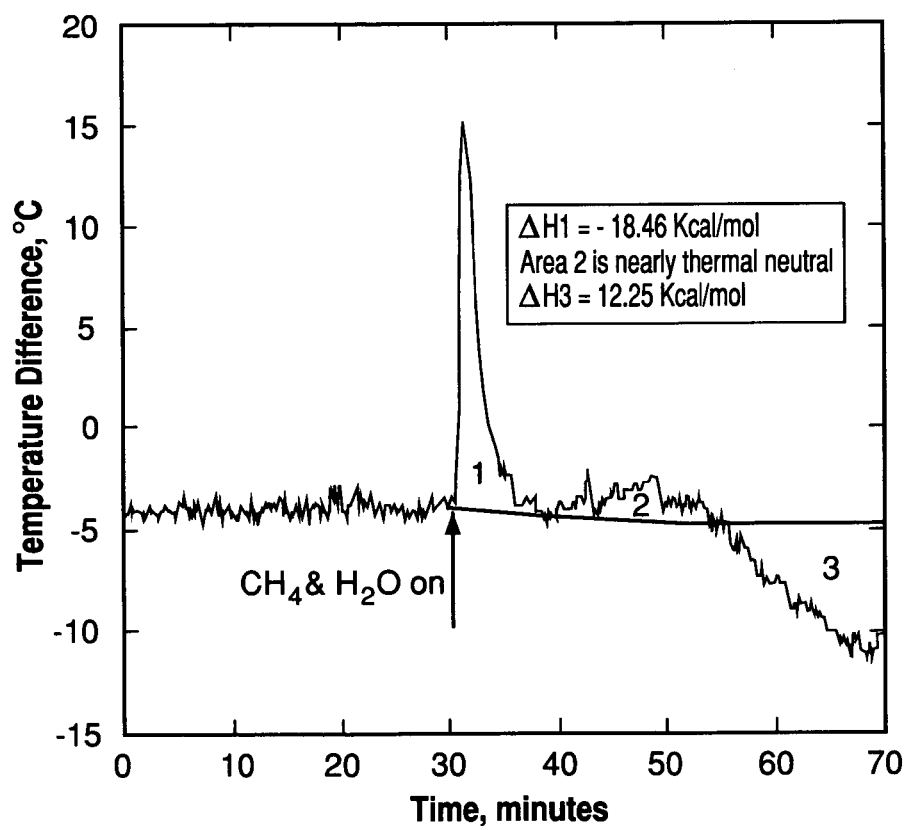
FIG. 17B is a plot of the temperature difference vs. time between equivalent locations in the active catalytic reactor tube and the reference reactor tube during $H_2$ gas production in FIG. 17A of Example 11.

Evaluation of NiO-doped $Ca_2FeMnO_5$/1% Pt/γ-$Al_2O_3$ with Repeated Cycling and at Higher Feed Pressures The complex metal oxide and catalyst of Example 10 were tested at steam-methane reforming conditions over several reaction cycles and varying reaction and regeneration conditions. FIG. 17A shows the gas production rates and FIG. 17B shows the temperature changes with time on stream for the seventh feed cycle and the thermal profile of the reaction. A rapid onset of hydrogen production was observed, the production being sustained for about 30 minutes and having a rate of about 3.5 sccm. The ratio of hydrogen to methane was 3.20, with a methane conversion of 66%. Hydrogen, excluding unreacted methane, was the major product with levels of less than 2% carbon monoxide and carbon dioxide being produced. The second stage of the reaction lasted for from about 35 minutes to about 55 minutes after initiation, and was approximately thermoneutral.

Figure 18A:
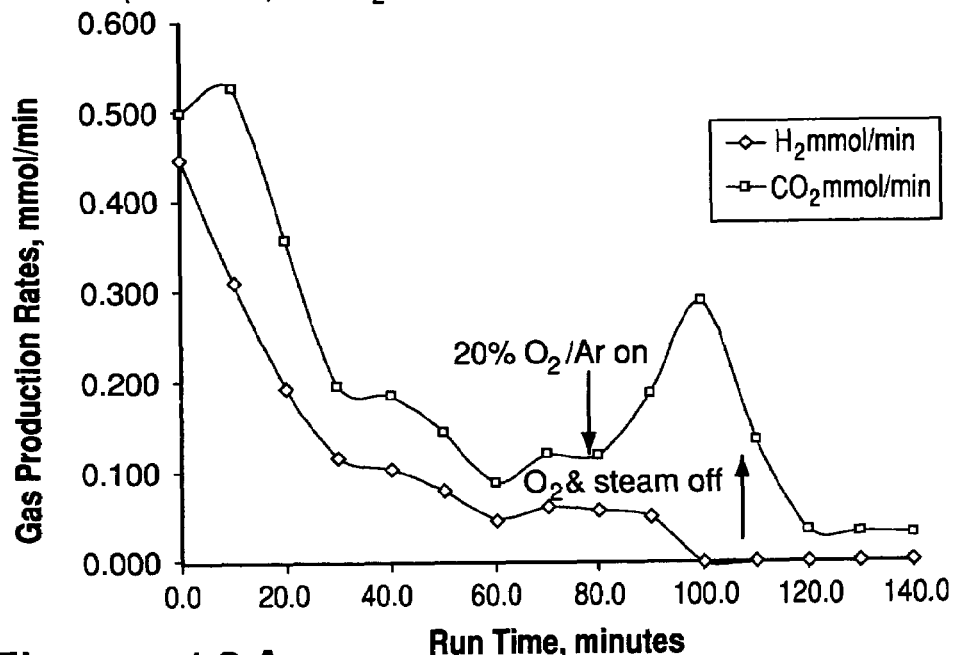
FIG. 18A is a plot of hydrogen and carbon dioxide production vs. run time for the regeneration of spent $Ca_2MnFeO_5(NiO)_{0.4}$ in Example 11.
Figure 18B:
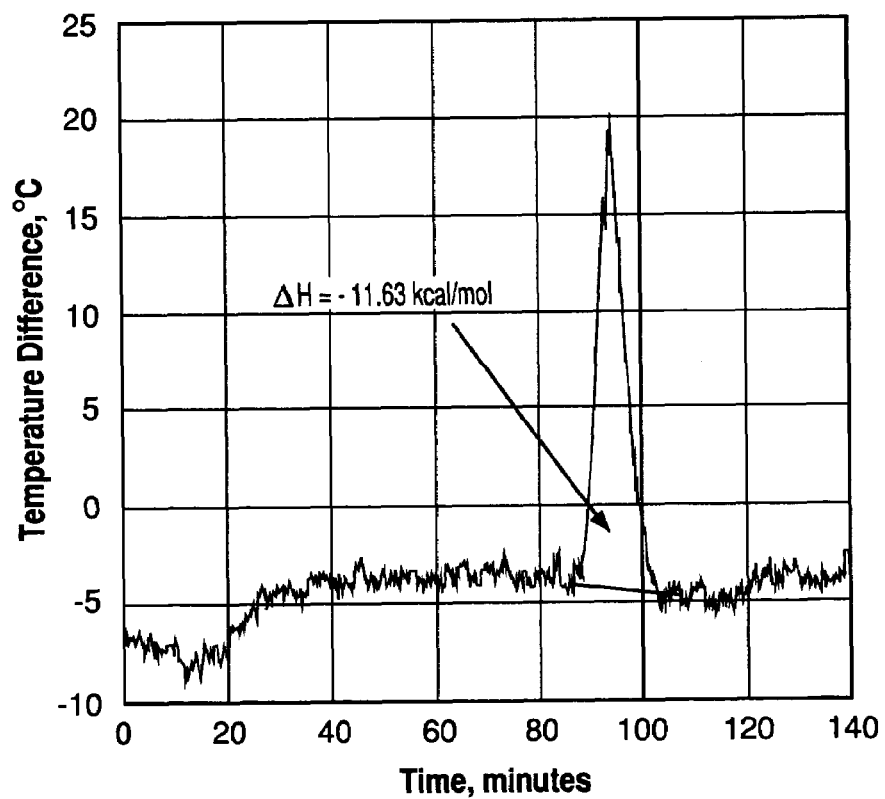
FIG. 18B is a plot of the temperature difference vs. time between equivalent locations in the active catalytic reactor tube and the reference reactor tube during the regeneration of spent $Ca_2MnFeO_5(NiO)_{0.4}$ in Example 11.

After 70 minutes on stream the methane flow was turned off while the flow of steam and 80 sccm of argon was maintained. This was the starting point for this regeneration process, corresponding to time=0 minutes in FIG. 18A. At 80 minutes past this point, an 80 sccm flow of 20% oxygen/argon was mixed with the steam flow. The carbon dioxide production rate and the thermal changes from this regeneration sequence are shown in this FIGS. 18A and 18B. It was noted that an amount of carbon dioxide was evolved from the system even before the oxygen flow was added. In the period from 0 to 80 minutes a significant quantity of hydrogen was produced. This hydrogen production may be related to the endotherm which lasted from 0 to 30 minutes, as seen in FIG. 18B. Since the level of methane dropped sharply (over a period of about 5 minutes) from the time that its flow is turned off, this hydrogen is believed to have been generated from chemistry other than steam-methane reforming, and is likely produced from a reduction of steam by a reduced form of the oxide.

Figure 19A:
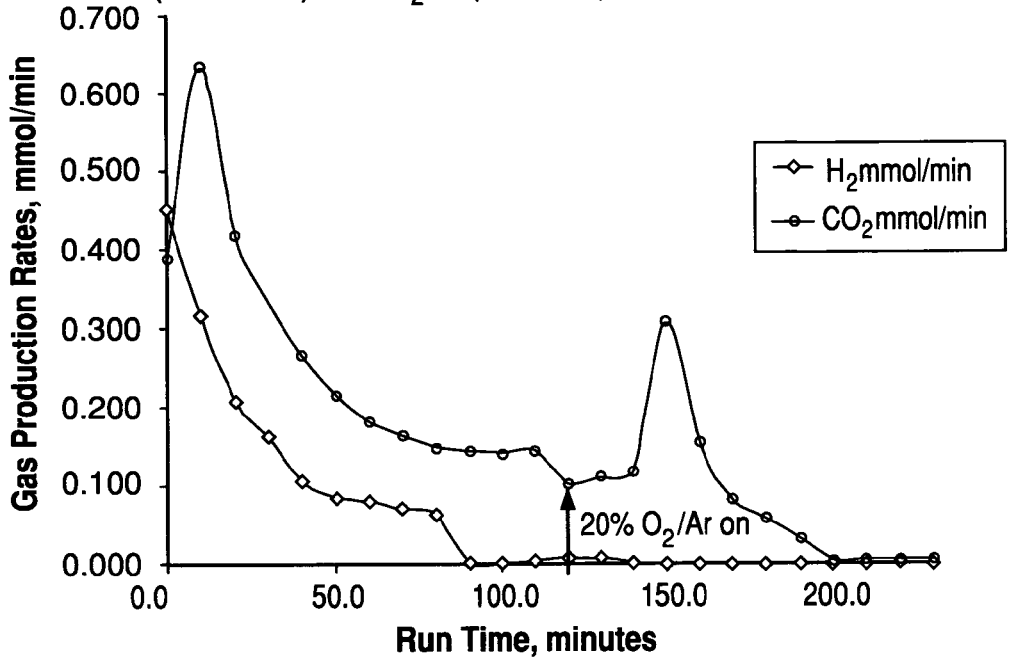
FIG. 19A is a plot of hydrogen and carbon dioxide production vs. run time during the regeneration of another batch of spent $Ca_2MnFeO_5(NiO)_{0.4}$ in Example 11.
Figure 19B:
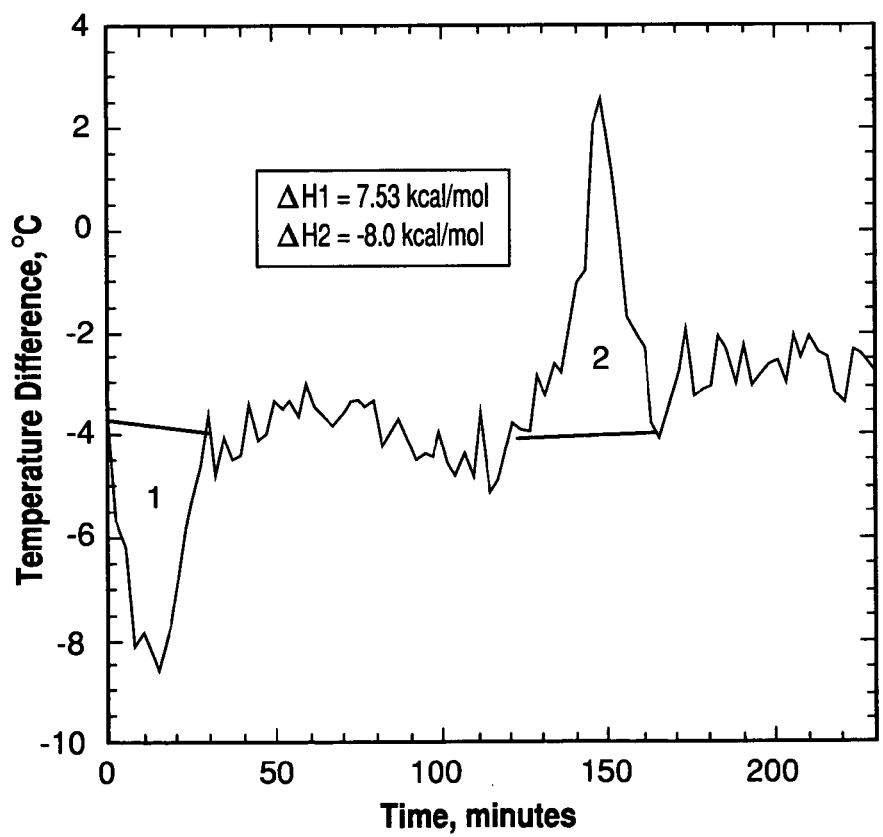
FIG. 19B is a plot of the temperature difference vs. time between equivalent locations in the active catalytic reactor tube and the reference reactor tube during the regeneration of the spent $Ca_2MnFeO_5(NiO)_{0.4}$ of FIG. 19B in Example 11.

A regeneration by this sequence of steam followed by oxygen/argon/steam resulted in a lower exotherm, −11.6 kcal/mole (FIG. 18B), as compared to the −28.7 kcal/mole for the regeneration conditions of Example 10. By lowering the oxygen/argon flow rate from 80 sccm to 20 sccm (FIG. 19A), it was possible to further reduce the regeneration exotherm to −8.0 kcal/mole (FIG. 19B).

Figure 20A:
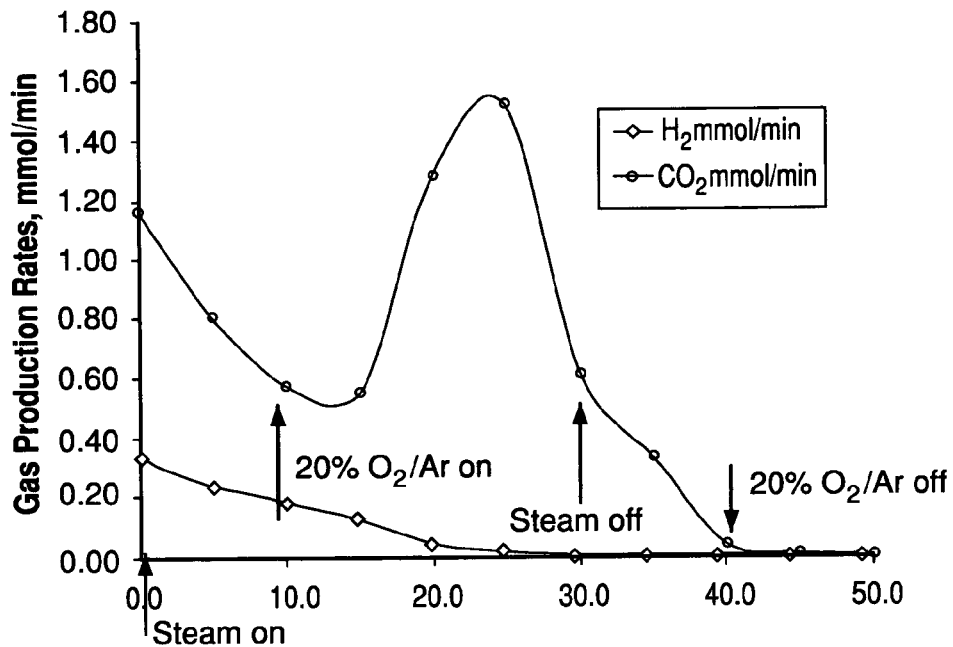
FIG. 20A is a plot of hydrogen and carbon dioxide production vs. run time for the regeneration of a spent $Ca_2MnFeO_5(NiO)_{0.4}$/4% Rh/Li Aluminate material (Example 11)
Figure 20B:
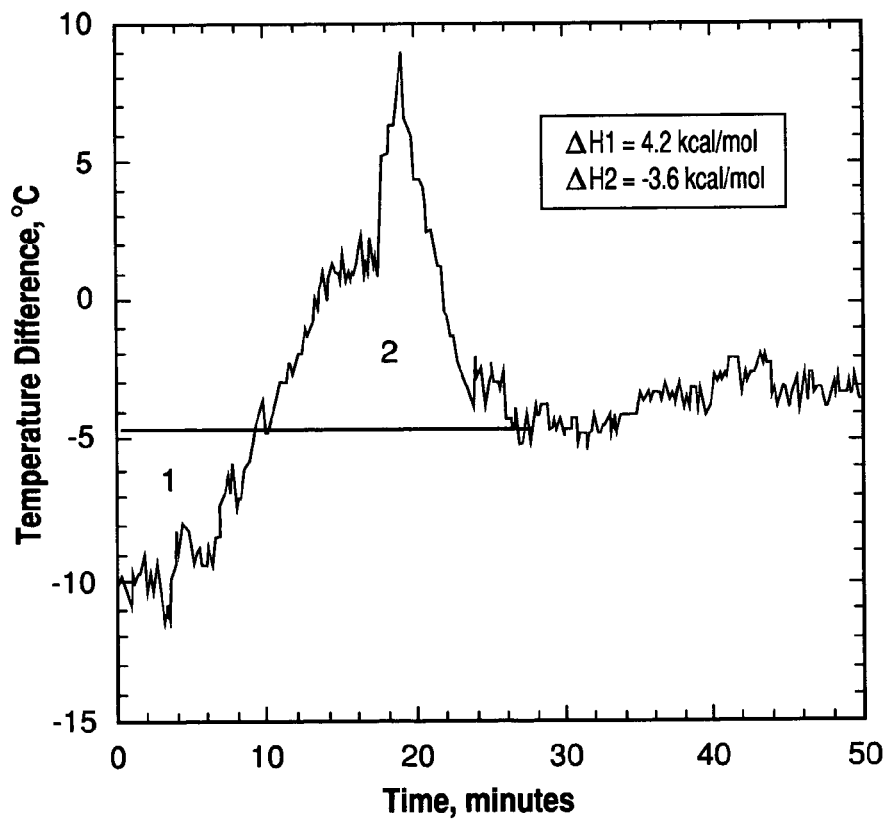
FIG. 20B is a plot of the temperature difference vs. time between equivalent locations in the active catalytic reactor tube and the reference reactor tube during the regeneration of the spent $Ca_2MnFeO_5(NiO)_{0.4}$/4% Rh/Li Aluminate material. Relates to FIG. 20A in Example 11.

It is believed that by using selected combinations of steam and oxygen/argon, not only can the heats of reaction of the regeneration and subsequent synthesis reaction be reduced, but also the regeneration time can be lowered. When only oxygen/argon was used at 80 sccm, without including the time for purging, the regeneration process required at least 300 minutes (FIGS. 16A and 16B). On mixing steam and oxygen/argon feed, a full regeneration including the purging time for the system took 140 min (FIGS. 18A and 18B), which is about three time that for the synthesis step. However, at a regeneration temperature of 750° C., as exemplified in FIGS. 20A and 20B for the $Ca_2FeMnO_5(NiO)_{0.4}$/4% Rh on Li Aluminate System of Example 12, the regeneration time could be significantly shortened to 40 to 50 minutes which is close to the time required for synthesis. In the regeneration shown in FIGS. 20A and 20B, steam flow was maintained for 30 minutes after synthesis was ended by stopping methane flow. In the first 10 minutes, steam flow alone was maintained, and the reaction was slightly endothermic, requiring 4.2 kcal/mol. Subsequently 20% oxygen/argon flow was added and the reaction became slightly exothermic, producing −3.6 kcal/mole.

A comparative reaction was carried out using $Ca_2FeMnO_5$ $(Pt)_{0.01}$ without the admixed steam-methane reforming catalyst. No significant reaction was observed. It is believed that this was due to there being insufficient hydrogen to activate the oxide-entrained platinum catalyst. This situation could be mitigated by the use of a methane feed gas that contains up to about 3 mole percent hydrogen, as is commonly used in industrially practiced steam-methane reforming, and is illustrated for another complex metal oxide and steam-methane reforming catalyst combination in Example 14.

In all of the examples, the total feed pressure of steam, methane and diluent argon was about 30-35 psia. Since large scale $H_2$-production systems usually operate at high pressures (such as about 300 psia), the performance of the systems of the examples was investigated at 100 psia.

Figure 21A:
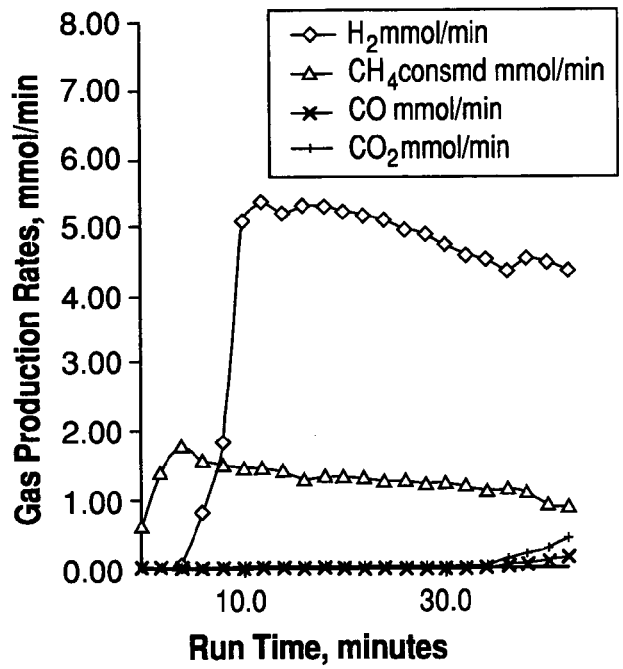
FIG. 21A is a plot of gas production vs. run time and methane consumption rates for the production of synthesis gas from a steam-methane mixture at higher feed pressures using another batch of regenerated $Ca_2MnFeO_5(NiO)_{0.4}$ with 1% Pt on $\gamma\text{-}Al_2O_3$ as described in Example 11.
Figure 21B:
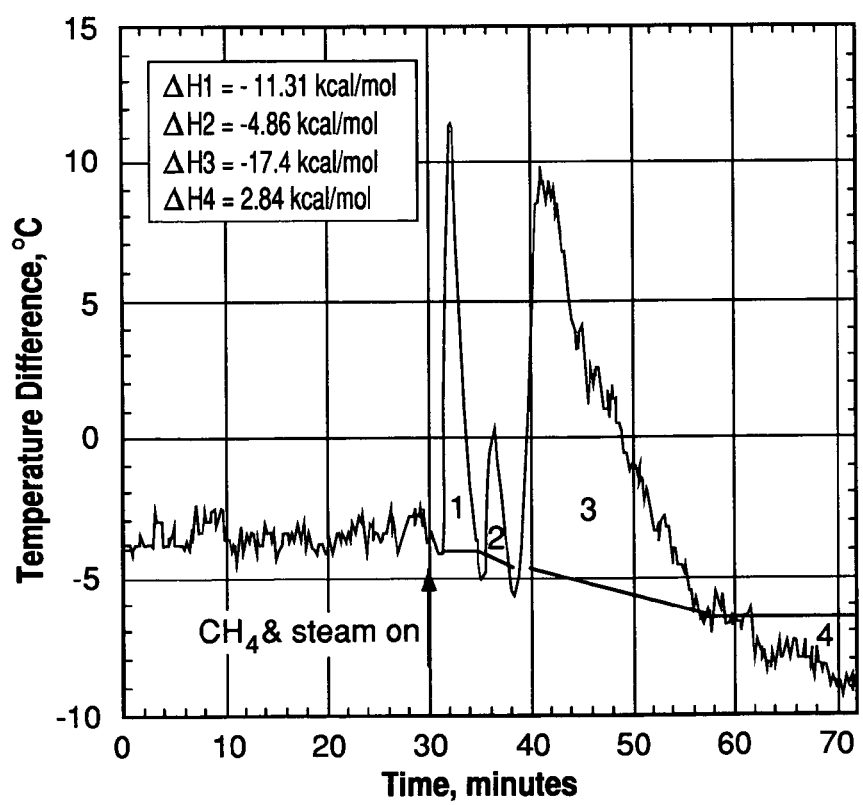
FIG. 21B is a plot of the temperature difference vs. time between equivalent locations in the active catalytic reactor tube and the reference reactor tube during gas production according to FIG. 21A of Example 11.

The $Ca_2FeMnO_5(NiO)_{0.4}$, 1% $Pt/Al_2O_3$ system was reacted with 40 sccm methane/120 sccm steam/80 sccm argon at 650° C., at a total pressure of 104 psi, maintained by an appropriately set back-pressure controller. FIGS. 21A and 21B show the results of this reaction. Hydrogen was selectively produced at a rate of about 4.5 mmoles/min with no carbon monoxide produced until near the end of the reaction, while carbon dioxide content was less than 1%. The hydrogen purity, excluding methane, was higher than that for synthesis conducted at lower pressures.

EXAMPLE 12

Hydrogen Synthesis Using $Ca_2FeMnO_5$ with a 4% Rh/Li Aluminate Catalyst

Figure 22A:
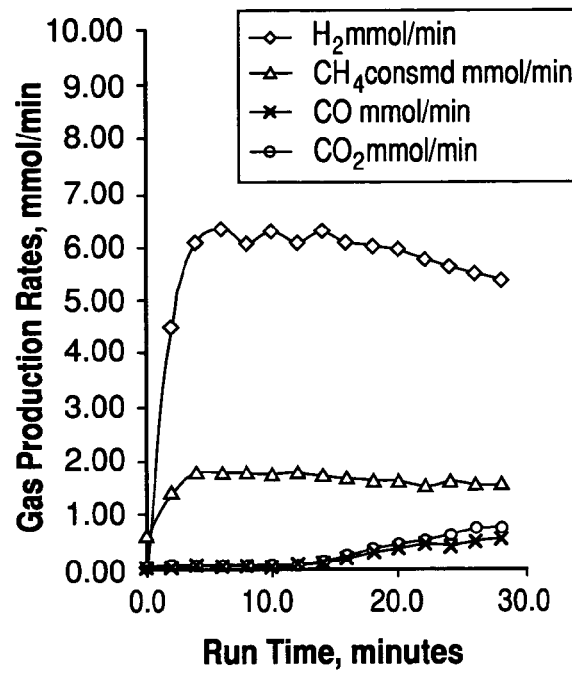
FIG. 22A is a plot of gas production vs. run time and methane consumption rates for the production of synthesis gas from a steam-methane mixture using $Ca_2MnFeO_5(Pt)_{0.01}$ along with 4% rhodium on lithium aluminate in Example 12.
Figure 22B:
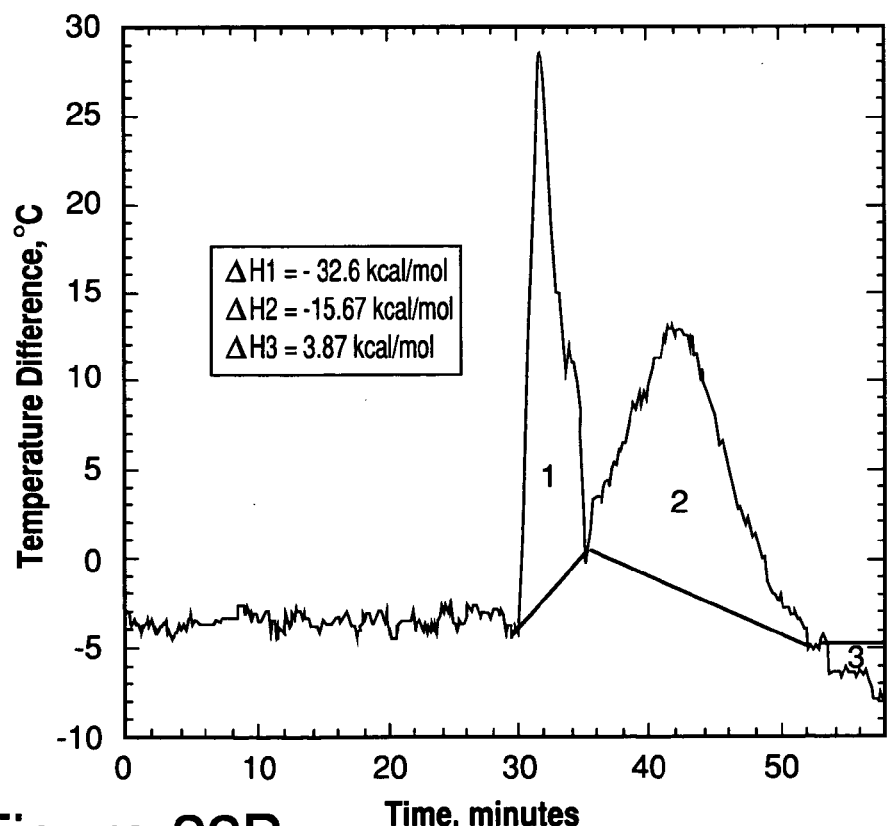
FIG. 22B is a plot of the temperature difference vs. time between equivalent locations in the active catalytic reactor tube and the reference reactor tube during gas production according to FIG. 22A of Example 12.

The steam-methane reforming reaction was carried out using $Ca_2FeMnO_5(Pt)_{0.01}$ with 4% rhodium on lithium aluminate, commercially available from Air Products and Chemicals, Inc., Allentown, Pa., as the admixed steam-methane reforming catalyst. The results are shown in FIGS. 22A and 22B. A methane conversion rate higher than 98% was achieved for the first 12 minutes of the reaction. This conversion rate is well above the predicted 90% equilibrium conversion calculated value for steam-methane reforming at the same reaction conditions, even in the presence of calcium oxide alone as a carbon dioxide scavenger, i.e. no complex metal oxide. The rate was achieved within 4 minutes after initiation of the reaction. The hydrogen purity remained as high as 98%, and carbon dioxide and carbon monoxide began to appear after about 12 minutes of the reaction, at which time the methane conversion decreased to 87%. The data recorded for temperature changes indicated that the reaction proceeded with two exotherms, one of −32.6 kcal/mol and the other of −15.6 kcal/mol.

Figure 23A:
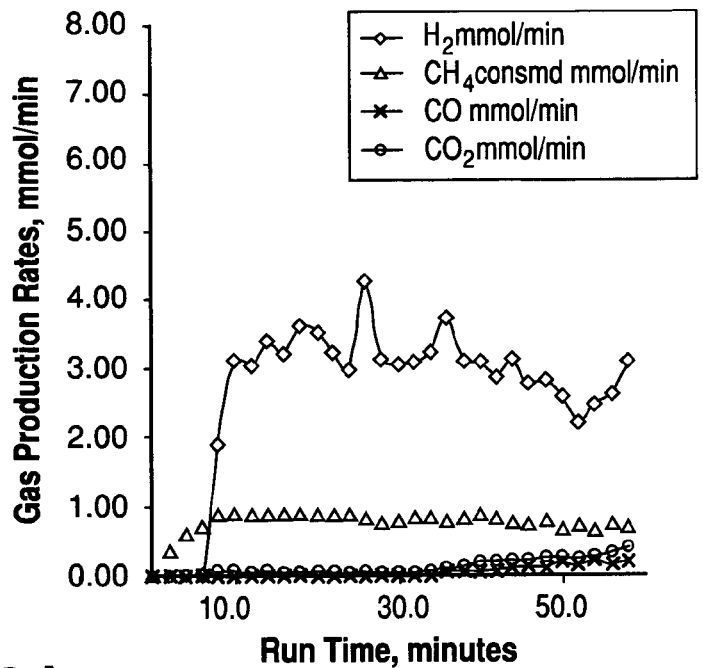
FIG. 23A is a plot of gas production vs. run time and methane consumption rates for the production of synthesis gas from a steam-methane mixture at a reduced flow rate using $Ca_2MnFeO_5(Pt)_{0.01}$ along with 4% rhodium on lithium aluminate in Example 12.
Figure 23B:
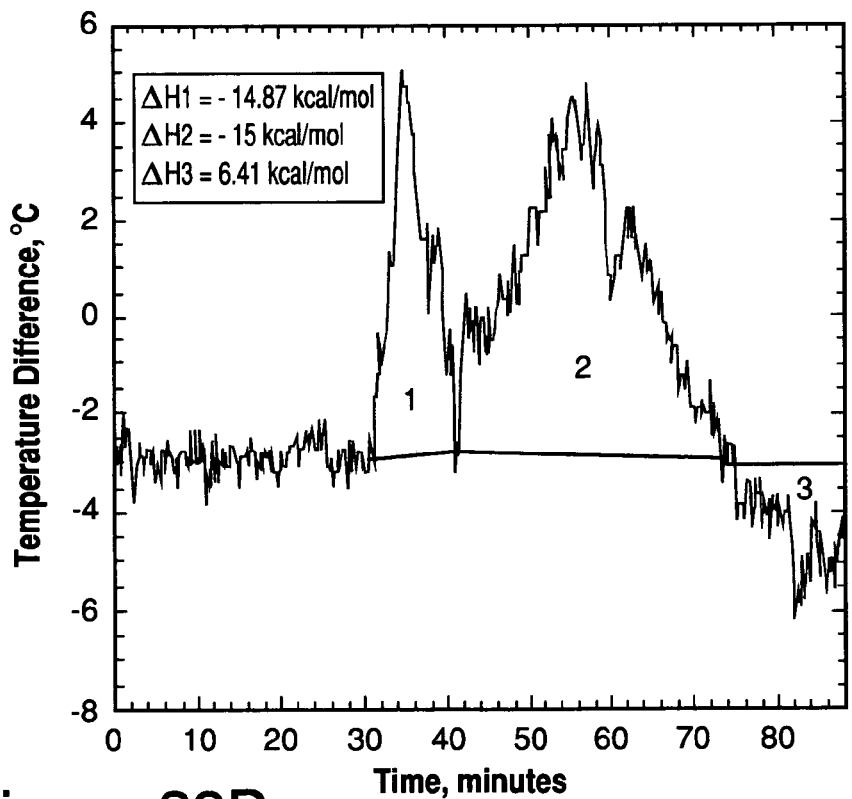
FIG. 23B is a plot of the temperature difference vs. time between equivalent locations in the active catalytic reactor tube and the reference reactor tube during gas production according to FIG. 23A of Example 12.

Subsequently, second and later reaction cycles were carried out with only half the usual flow rates of feed gases. The same high methane conversion rate was achieved but the reaction proceeded for a longer time. The two exotherms observed during the first feed cycle become slightly smaller in subsequent cycles. FIGS. 23A and 23B show the results obtained for the fourth reaction cycle in this sequence of experiments.

EXAMPLE 13

Synthesis with 2:1 Steam to Methane Feed

The above examples contain steam-methane reforming reactions carried out with a steam/methane ratio of 3:1. The reaction was subsequently effected at a steam/methane ratio of 2:1. Energy can be saved in the process by the use of less steam in the feed.

Figure 24A:
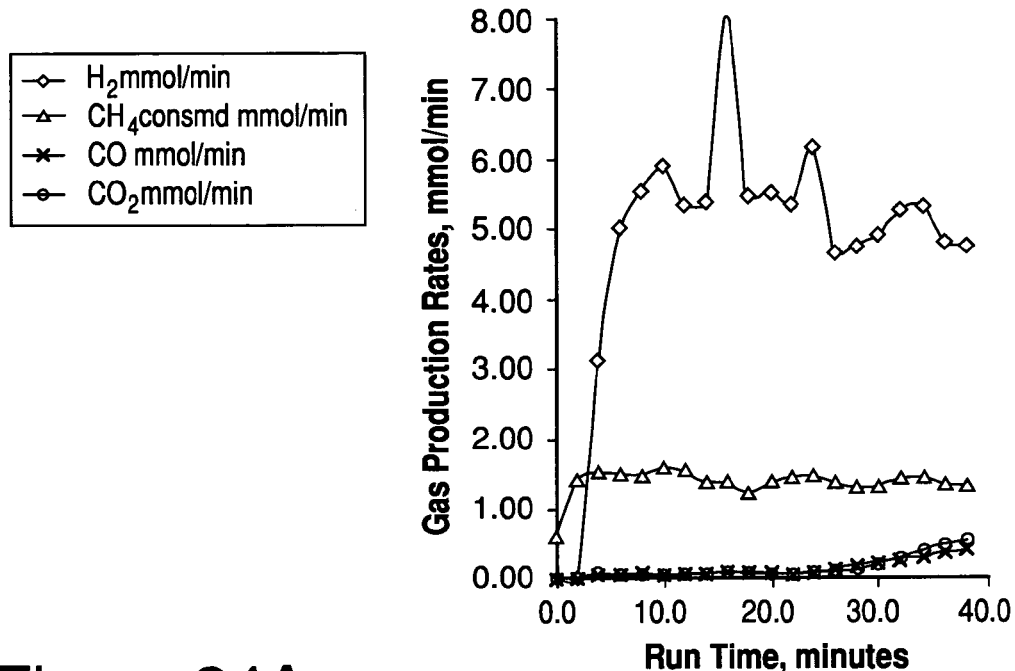
FIG. 24A is a plot of gas production vs. run time and methane consumption rates for the production of synthesis gas from a steam-methane mixture at a steam-methane molar ratio of 2:1 using $Ca_2MnFeO_5$ along with 4% rhodium on lithium aluminate in Example 13.
Figure 24B:
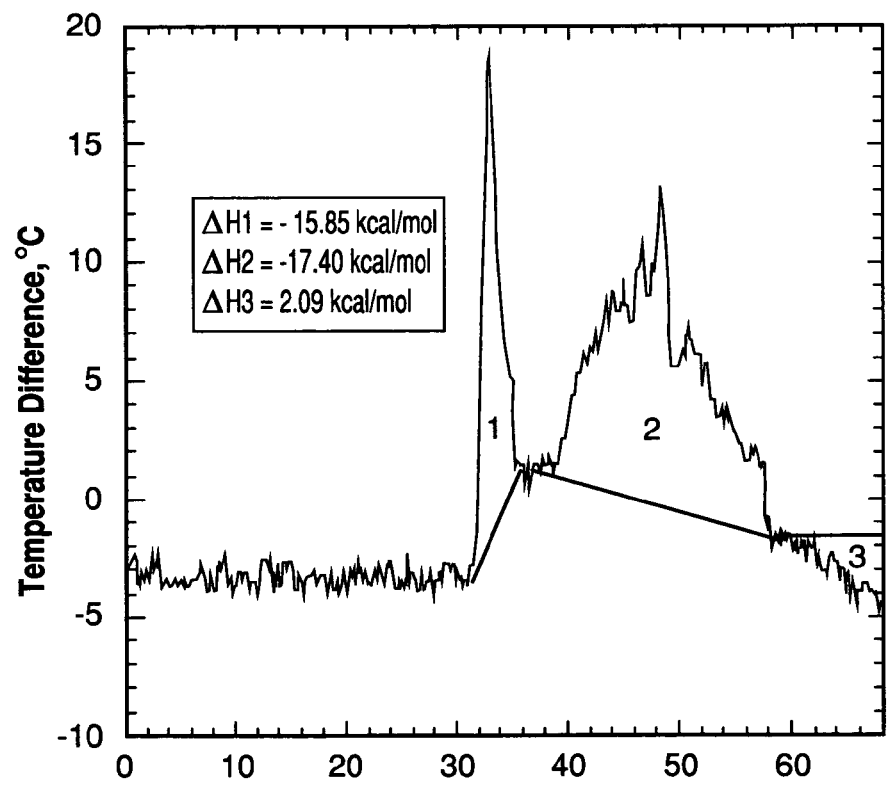
FIG. 24B is a plot of the temperature difference vs. time between equivalent locations in the active catalytic reactor tube and the reference reactor tube during gas production according to FIG. 24A of Example 13.
Figure 25A:
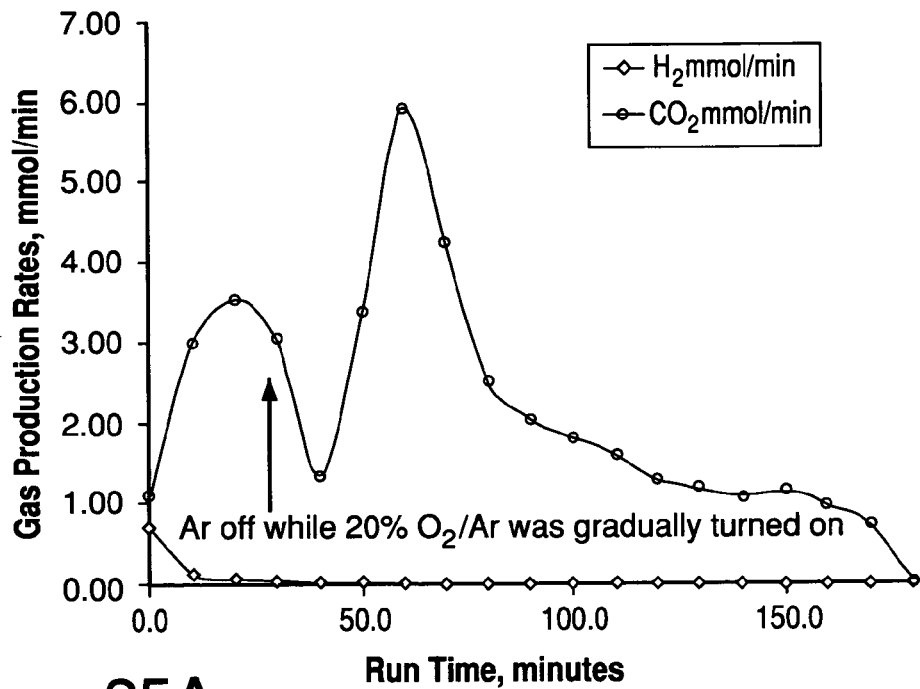
FIG. 25A is a plot of hydrogen and carbon dioxide production vs. run time for the regeneration of spent $Ca_2MnFeO_5$ with 4% rhodium on lithium aluminate in Example 13.
Figure 25B:
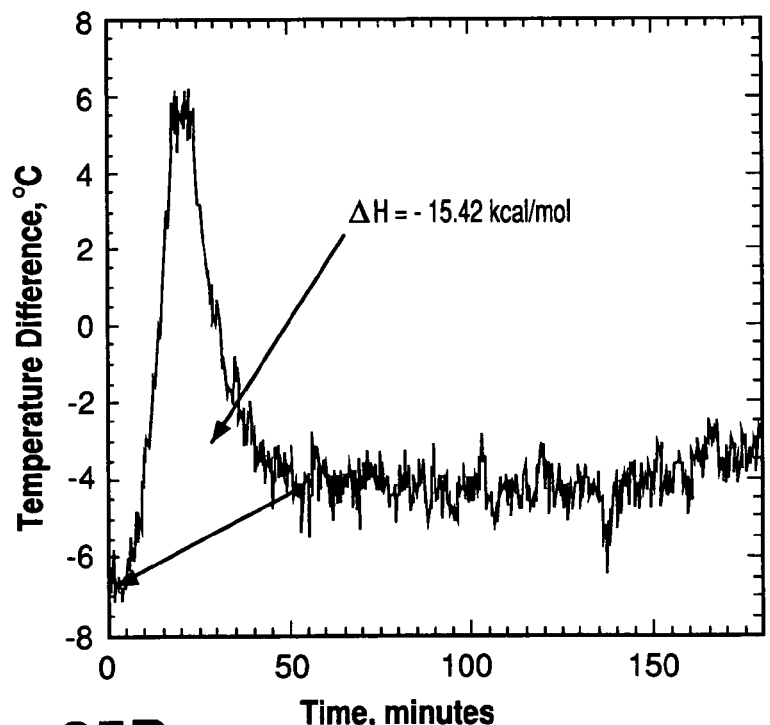
FIG. 25B is a plot of the temperature difference vs. time between equivalent locations in the active catalytic reactor tube and the reference reactor tube during the regeneration of the spent $Ca_2MnFeO_5$ according to FIG. 26A in Example 13.

FIGS. 24A and 24B show the rates of gas production and the temperature changes with time for steam-methane reforming using a $Ca_2FeMnO_5$/4% Rhodium/lithium aluminate admixed catalyst. The thermal profile for the reaction is similar to that of the above examples with a steam/methane 3:1 ratio. Prior to saturation of the complex metal oxide with carbon dioxide, the methane conversion rate varied between 82% and 89%. Slightly more carbon dioxide and carbon monoxide was observed in this stage for reaction using 2:1 steam to methane than for steam/methane ratio of 3:1. This results in a somewhat lower hydrogen purity of 92%, excluding methane content. On completion of the reaction, 2 moles of carbon dioxide were adsorbed for each mole of complex metal oxide used. This result is the same as was observed in the above examples using 3:1 steam/methane. The regeneration of the metal oxide was carried out by initially flushing the system with argon, then, at 30 minutes, introducing a gradually increasing flow of 20% oxygen/argon at 750° C. for 150 minutes. FIGS. 25A and 25B show the results (For FIG. 25B, the time started from when $O_2/Ar$ was introduced). The heat generated by first reaction of the complex metal oxide with oxygen was −15.4 kcal/mol. This stage lasted about 50 minutes, and was followed by an approximately thermoneutral process which continued until the regeneration was complete.

EXAMPLE 14

Hydrogen Synthesis Using a $CaMgFeMnO_5(NiO)_{0.4}$ Complex Metal Oxide with an Admixed Commercial 20% $NiO/Al_2O_3$ Catalyst The hydrogen synthesis reaction described in this example was conducted using the four-metal complex metal oxide, $CaMgFeMnO_5$. The complex metal oxide had been impregnated with nickel oxide, NiO, as a steam-methane reforming catalyst precursor, during its preparation, and subsequently was admixed with a commercial 20% $NiO/Al_2O_3$ steam-methane reforming catalyst commercially available from Air Products and Chemicals, Inc., Allentown, Pa. The advantage and potential economic benefit here is that neither a noble metal nor a precious metal catalyst was employed.

Figure 26A:
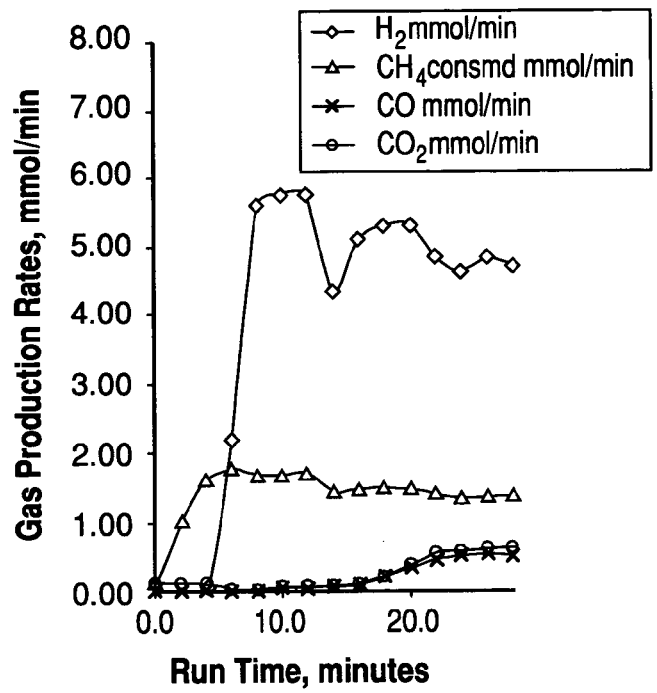
FIG. 26A is a plot of gas production vs. run time and methane consumption rates for the production of synthesis gas from a steam-methane mixture using $CaMgFeMnO_x$ $(NiO)_{0.4}$ in combination with 20% NiO on $\gamma-Al_2O_3$ in Example 14.
Figure 26B:
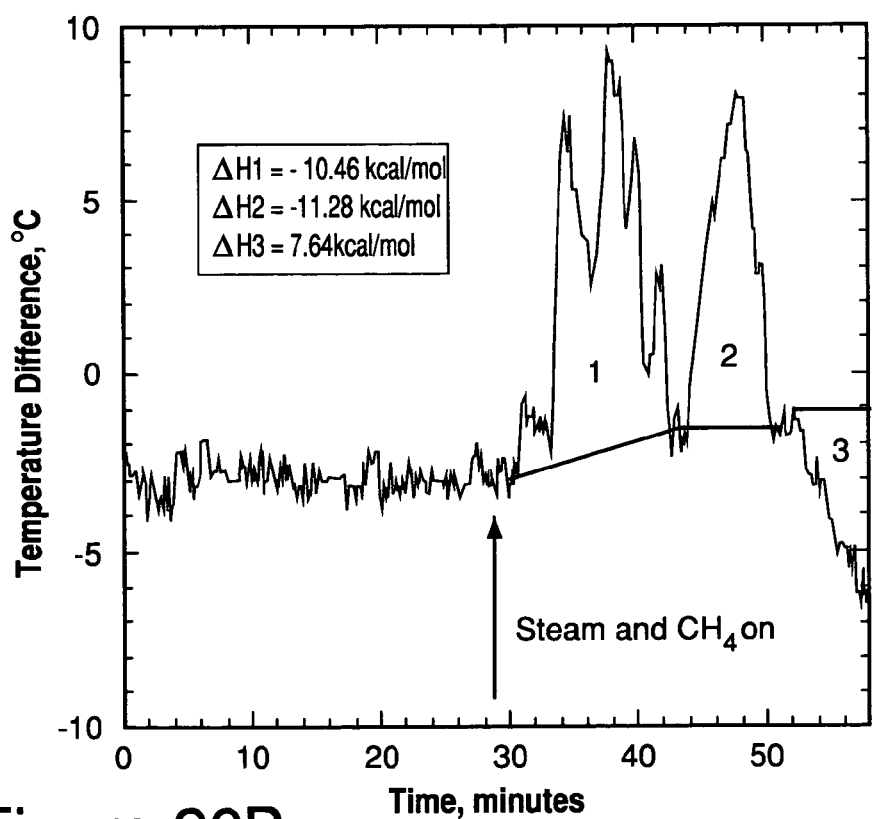
FIG. 26B is a plot of the temperature difference vs. time between equivalent locations in the active catalytic reactor tube and the reference reactor tube during gas production in FIG. 26A of Example 14.

The feed consisted of a 2:1 steam to methane stream, the methane containing 3 mole percent hydrogen. FIGS. 26A and 26B show the results. In the first 5 minutes methane was consumed with no production of hydrogen, the process being approximately thermoneutral. It is believed that during this stage the nickel oxide was reduced to nickel by both hydrogen and methane, accompanied by uptake of carbon dioxide by the complex metal oxide. Subsequently hydrogen was produced, its rate of production increased rapidly and remained approximately constant at 5-6 mmoles/minute. From 4 to 16 minutes, the methane conversion rate was 92%, with a methane to hydrogen ratio of 2.67, an exotherm of −10.5 kcal/mole methane and a product purity of 2% carbon dioxide and 0.74% carbon monoxide in hydrogen.

EXAMPLE 15

Calculation of Hydrogen Synthesis and Oxide Regeneration Thermodynamics for a Process Which Utilizes the $Ca_2MnFeO_5$ Complex Metal Oxide (Ref. to Experimental Example 8)

| Step (a): Hydrogen Synthesis Reaction | | | |
|---|---|---|---|
| Eqn. No. | Reaction | ΔH(700° C.) (kcal/mole) | ΔG (700° C.) (kcal/mole) |
| 11 | $Ca_2MnFeO_5 = 2CaO + \frac{1}{2}Mn_2O_3 + \frac{1}{2}Fe_2O_3$ | 9.79* | 13.8* |
| 12 | $\frac{1}{2}Mn_2O_3 = MnO + \frac{1}{4}O_2$ | 21.91 | 9.40 |
| 13 | $\frac{1}{2}Fe_2O_3 = FeO + \frac{1}{4}O_2$ | 33.20 | 19.63 |
| 14 | $2CaO + 2CO_2 = 2CaCO_3$ | −81.48 | −13.29 |

| -continued | | | |
|---|---|---|---|
| Step (a): Hydrogen Synthesis Reaction | | | |
| Eqn. No. | Reaction | ΔH(700° C.) (kcal/mole) | ΔG (700° C.) (kcal/mole) |
| 15 | $\frac{1}{2}O_2 + 2CH_4 + 3H_2O(g) = 2CO_2 + 7H_2$ | 31.27 | −57.75 |
| Net 16: | $Ca_2MnFeO_5 + 2CH_4 + 3H_2O(g) = 2CaCO_3 + MnO + FeO + 7H_2$ | 14.7 | −28.2 |

*The enthalpy (ΔH) and Gibbs free energy (ΔG) values for the dissociation of $Ca_2MnFeO_5$ to the component binary oxides (React 11) is assumed to be the same as that for the dissociation of the isostructural $Ca_2Fe_2O_5$ complex oxide into 2CaO and $Fe_2O_3$ for which literature data is available (L. A. Reznitskii, Russ. J. Phys. Chem, 64 (18) 1990, p. 1997-1999 and M. C. Dufour, P. Peurot, Rev. Chem. Miner. 6(2) 1969, p. 42)

The above is an illustration of the processes that are believed to occur in the reforming of methane with steam in the presence of $Ca_2MnFeO_5$ and their corresponding thermochemistry. Eqn. 11 represents the dissociation of the metal complex oxide (which is the reverse of Eqn. 10); Eqns. 12 and 13, the reductive dissociation of these (binary) oxides; steam-methane reforming with limited partial oxidation (Eqn. 15) which is an illustration of Eqn. 6 (for here a slightly different $O_2.CH_4$ ratio).

The overall reaction (Eqn. 16) represents a highly favorable (ΔG<<O) and slightly endothermic (ΔH=7.35 kcal/mole of $CH_4$) $H_2$ synthesis reaction.

| Step (b): Complex Oxide Regeneration | | | |
|---|---|---|---|
| Eqn. No. | Reaction | ΔH(700° C.) | ΔG (700° C.) |
| 17 | $\frac{1}{2}O_2 + MnO + FeO = \frac{1}{2}Mn_2O_3 + \frac{1}{2}Fe_2O_3$ | −55.11 | −29.03 |
| 18 | $\frac{1}{2}Mn_2O_3 + \frac{1}{2}Fe_2O_3 + 2CaO = Ca_2MnFeO_5$ | −9.79 | −13.8 |
| 19 | $2CaCO_3 = 2CaO + 2CO_2$ | +81.05 | +12.88 |
| Net 20 | $\frac{1}{2}O_2 + MnO + FeO + 2CaCO_3 = Ca_2MnFeO_5 + 2CO_2$ | +16.15 | −29.95 |

The complex oxide regeneration reaction is highly favorable (ΔG << O) and somewhat endothermic. Note that for the combination of only reactions 18 and 19: $2CaCO_3 + \frac{1}{2}Mn_2O_3 + \frac{1}{2}Fe_2O_3 = 2CaO + 2CO_2 + Ca_2MnFeO_5$ ΔG=−0.9 kcal/$2CaCO_3$ as compared to ΔG=12.88 kcal/$2CaCO_3$ for calcium carbonate dissociation to CaO and $CO_2$ reaction 19 above. This clearly demonstrates how formation of the complex oxide can assist in the release of $CO_2$ from calcium carbonate i.e. allow a regeneration of the spent oxide at a lower temperature and/or higher $CO_2$ partial pressure than would otherwise be possible.

Specific Teachings from Examples 2 to 11

Example 2 shows that the $Ca_2Co_2O_5$, 1% $Pt/ZrO_2$ combination reacts with a feed of 3:1 $CH_4$, steam diluted with Ar at 650° C. providing for a time substantially $H_2$, with only low levels of accompanying CO and $CO_2$. When after this period the complex metal oxide is "spent" (in terms of its oxidative and $CO_2$ reducing capacity), essentially conventional steam-methane reforming (SMR) takes place resulting in a product which is close to the expected equilibrium mixture of $H_2$, CO and $CO_2$. The spent oxide can be regenerated, at least substantially, by flowing over it a stream of $O_2/Ar$ (artificial air).

Example 3 teaches that the synthesis step in Example 2 can be conducted repeatedly using the same complex metal oxide/SMR catalyst combination, using after each such H$_2$ synthesis step the regeneration process of Example 2. It should be noted however, that while the same product "sequence" is seen after repeated cycling, the maximum of H$_2$ production diminishes somewhat (see FIG. 5) and was ascribed to a partial deactivation of this Pt/ZrO$_2$ catalyst by the oxidative regeneration process (see Example 8), not to a degradation of the complex metal oxide.

Example 4 describes a H$_2$ synthesis and Ar/O$_2$ regeneration with Ca$_2$Co$_2$O$_5$, the same oxide, catalyst combination as Examples 2 and 3 but now performed using the described reaction calorimeter. The most significant observation is the production of substantially H$_2$ at essentially thermoneutral conditions at reaction times of between 20 and 35 minutes (region 2 of FIG. 8B). While the regeneration reaction is fairly exothermic (~40 kcal/mole of oxide) it does go to completion as shown by the essentially zero flow of CO$_2$ at >400 minutes.

The most significant result in Comparative Example 5 is in the regeneration data for the spent 1:1 CaO:NiO mixture of oxides, consisting of CaCO$_3$ and Ni (FIGS. 11A and 11B), which shows that after an initial "spike", the CO$_2$ evolution rate is almost level and still significant even after 470 minutes. This contrasts markedly with regeneration data for spent Ca$_2$Co$_2$O$_5$ (FIG. 9A) for which the CO$_2$ evolution rate is much faster and levels down to almost zero after about 400 minutes. This comparative Example 5 illustrates a feature of the embodiments of the invention as described above, namely, that in order to achieve a total decomposition of the CaCO$_3$ back to the operative oxide without greatly raising the temperature it is necessary to employ a ternary or higher mixed metal oxide, in contrast with a binary oxide or mixtures of binary oxides(e.g., the mixture of NiO and CaO) employed in the prior art such as U.S. Pat. No. 6,007,699 and U.S. Pat. No. 5,827,496.) Essentially, the evolution of CO$_2$ from CaCO$_3$ is favored when the by-product is a complex oxide rather than CaO.

The earlier-cited reference Bityuskii P. N., Khitrova V,I, *Kristallografiya* 1984, 29, 450-454,(Russian Ed); Soviet Physics, Crystallography—in English describes the preparation of a calcium nickelate composition CaNi$_4$O$_8$ by an exchange of K$^+$ for Ca$^{2+}$ from potassium nickelate K$_{0.23}$NiO$_2$.nH$_2$O in aqueous solutions at room temperature. A calcium nickelate of the above formula can apparently be made by such a process at room temperature but the data in this comparative example clearly shows that a complex nickel oxide (e.g. CaNiO$_2$) is not produced from a combination of the parent oxides (NiO, CaO) at the elevated temperatures (~700° C.) of this invention.

Examples 6 and 7 describe attempts to formulate and evaluate complex metal oxides that do not contain oxides that are easily reducible to the metal like Co and Ni oxides. The CaMnO$_{3.5}$ and CaMnO$_{2.5}$ (Ca$_2$Mn$_2$O$_5$) oxides tested here do function for the H$_2$ process, but not as well as Ca$_2$Co$_2$O$_5$.

Example 8 introduces Ca$_2$MnFeO$_5$; this quaternary oxide performs well in terms of providing a relatively pure H$_2$ stream at essentially thermoneutral conditions and in being regenerable with only a low production of heat. Its main limitation is the low CH$_4$ conversion rate which was later mitigated in Examples 10-12 by the use of other more reactive SMR catalysts.

Example 9 teaches that the CH$_4$ conversion for reactions that employ Ca$_2$Co$_2$O$_5$ can be greatly enhanced—from 36% to 71-76%—by "doping" the oxide during its synthesis with Pt or NiO as a precursor to Ni, elements which are known to catalyze SMR.

In Examples 10 and 11, the best oxide found in this series of investigations, Ca$_2$MnFeO$_5$ doped with NiO, is admixed with Pt/γ-Al$_2$O$_3$ catalyst, and the systems were evaluated with the object of approaching a thermoneutral system for both the H$_2$ synthesis and complex metal oxide regeneration steps. Alternatively, Pt/ZrO$_2$ could be used as the catalyst. Example 11 cites the generation of some H$_2$ just by reaction of the nascent spent oxide with steam (no CH$_4$). Part of the complex metal oxide regeneration process can be rendered close to thermoneutral by regenerating first with steam and then with a slow flow of 20% O$_2$ in argon.

In Example 12, the same Ca$_2$MnFeO$_5$ oxide doped with 1 mole % Pt was used in conjunction with a 4% Rh/Li aluminate catalyst. The combination of these two catalysts leads to a much more rapid conversion of methane which exceeds 98%, which is greater than the calculated equilibrium CH$_4$ conversion (81%) for even the combined reactions

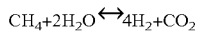

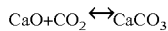

at the usual reaction conditions (650° C. etc).

All the H$_2$-generating SMR reactions above were conducted with a feed of 3:1 steam to methane. In Example 13, the reaction is satisfactorily performed with Ca$_2$FeMnO$_5$/4% Rh/Li aluminate and a 2:1 steam to CH$_4$ feed, thus potentially lowering the energy requirements of the SMR process. In Example 14 there are two variations: (1) a 4-metal oxide, CaMgFeMnO$_5$ is used and (2) a less costly non-noble (base metal) SMR catalyst precursor is employed. The CO and CO$_2$ levels in the H$_2$ are a little higher than with the Ca$_2$FeMnO$_5$ complex metal oxide, but otherwise the results are similar to those of previous Examples. Note that approximately 3 mole % H$_2$ was used as one of the components in the CH$_4$ feed gas, wherein the H$_2$ functioned as a reductant for the NiO.

Any of the various embodiments of the invention described above may be used in a multiple reactor process wherein each reactor vessel may be operated in the following exemplary sequence of steps:

(a) A production step in which a feed mixture of hydrocarbon and steam is introduced into the reaction bed at the appropriate temperature and pressure. The reactor bed may include preheat and post cool zones. The reaction bed contains a mixture of complex metal oxide and steam-hydrocarbon reforming catalyst. The feed mixture is reacted with the complex metal oxide and steam-hydrocarbon reforming catalyst in an autothermal reaction to yield hydrogen and carbon dioxide as the major products. The carbon dioxide reacts with and is retained by the complex metal oxide and the reactor effluent contains a mixture of hydrogen and steam, along with reaction products including carbon dioxide, carbon monoxide, and unreacted methane. The effluent mixture is at elevated temperatures and pressure. The reaction is carried out until the complex metal oxide in the bed is reduced, at which time the bed is saturated with carbon dioxide and depleted of oxygen. The temperatures in the reactor and the reactor effluent temperature may vary with time during the production step. The production step may be characterized by a production temperature that is defined as the time-averaged temperature of the reactor effluent during the production step. The production step may be characterized by a production pressure defined as the time-averaged pressure of the reactor effluent stream.

(b) A purge step in which the saturated or spent bed is first purged with an inert gas. Suitable inert gases include, but are not limited to, steam, nitrogen, and mixtures thereof. When steam is used as the purge gas, the process effluent consists largely of steam and hydrogen, which can be recycled to the production step. The purge gas pressure is preferably close to atmospheric pressure, however, if the purge gas is steam, it can be either low or high pressure, as high pressure steam is used as a component of the feed mixture for other beds in the production step. For purging at low pressure, the purge step is preceded by a pressure reduction or blowdown step. For purging at high pressure, the purge step precedes the depressurization step.

(c) A regeneration step in which the reaction bed is regenerated with elevated temperature oxygen-rich gas, at ambient pressure. The bed must be sufficiently purged to allow the safe introduction of oxygen-rich gas. Suitable oxygen-rich gases include hot air. Alternatively, a large excess of air may be co-fired with fuel to generate an oxygen-rich flue gas mix in a direct-firing process. The regeneration step strips the bed of carbon dioxide and recharges it with oxygen so that the bed is prepared to undergo the production step. The temperatures in the reactor and the reactor effluent temperature may vary with time during the regeneration step. The regeneration step may be characterized by a regeneration temperature that is defined as the time-averaged temperature of the reactor effluent during the regeneration step. A purge step optionally may follow the regeneration step.

(d) A repressurization step in which the regenerated bed is pressurized to the reaction pressure. Repressurization may be effected by using, for example, a high pressure steam and hydrocarbon feed mixture.

Figure 27:
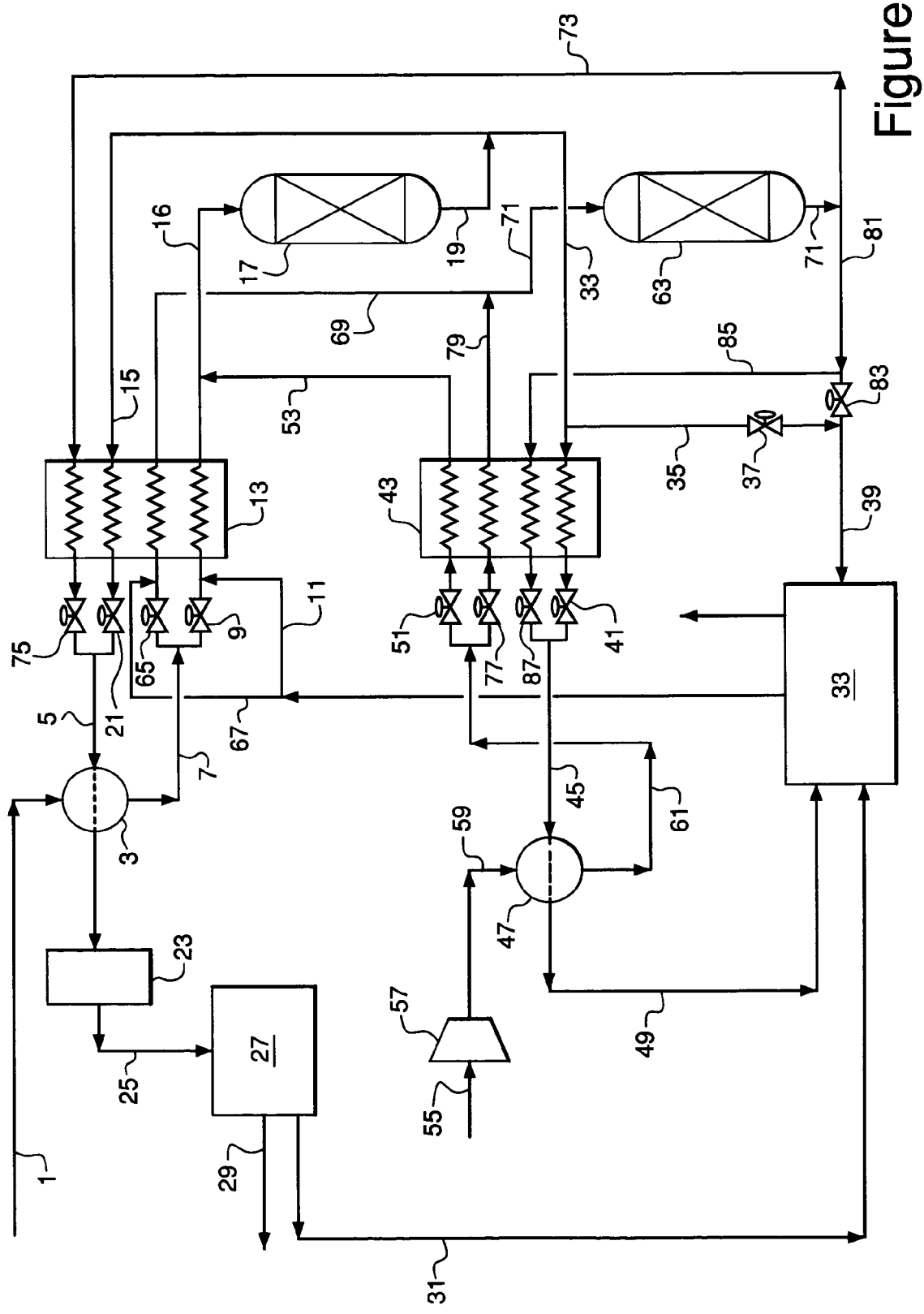
FIG. 27 is a schematic flow diagram of an exemplary process for the generation of hydrogen utilizing mixed metal oxides in combination with steam-methane reforming catalyst.

The generation of hydrogen from hydrocarbons and water according to an exemplary embodiment of the present invention is illustrated in the process flowsheet of FIG. 27. A hydrocarbon-containing feed gas, for example, methane, natural gas, or pre-reformed natural gas, flows via line 1 at a pressure in the range of 200 to 700/800 psia to preheat exchanger 3 and is heated therein to a typical temperature in the range of about 200° C. to about 250° C. by heat exchange with a hot process stream (later defined) supplied via line 5. The heated feed flows via line 7 and open valve 9 and is mixed with process steam provided via line 11 (2) to form a hydrocarbon-steam feed mixture. When the hydrocarbon is methane or pre-reformed natural gas, the molar ratio of steam to hydrocarbon may be from about 1:1 to about 4:1, and typically may be about 1.3:1. The molar steam to carbon ratio may be higher, and may range up to about 20:1 for heavier hydrocarbons.

The steam-hydrocarbon mixture is introduced into heat exchanger 13 and is further heated therein by heat exchange with a hot process stream (later defined) entering via line 15. The steam-hydrocarbon mixture may be heated to a temperature in the range of about 350° C. to about 900° C., and typically may be in the range of about 600° C. to about 750° C. The heated mixture then is introduced via line 16 into reactor 17, which contains a bed containing a mixture of complex metal oxide material and a steam-hydrocarbon reforming catalyst. The feed mixture reacts in the bed to form primarily hydrogen and carbon dioxide, and, in much smaller amounts, carbon monoxide. The carbon dioxide is retained by chemisorption on the complex metal oxide in the bed.

The inventory of chemically bound oxygen available as reactants, i.e., the oxygen associated with the complex metal oxide and steam reactants, may be adjusted in the reactor design so that the reaction product effluent stream leaves reactor 17 via line 19 at a time-averaged temperature between about 400° C. and about 750° C. The reaction product effluent stream flows via line 15 to heat exchanger 13, where it is cooled to a temperature in the range of about 250° C. to about 350° C. by indirect heat exchange with incoming reactants as earlier described. The cooled reaction product effluent stream exits heat exchanger 13 via open valve 21 and is further cooled in heat exchanger 3 and boiler 23 to yield a further cooled reaction product effluent stream in line 25 at a typical temperature of 40° C.

The cooled reaction product stream is introduced into pressure swing adsorption (PSA) system 27 and is separated therein to yield a high-purity hydrogen product containing at least 99 vol % hydrogen that is withdrawn via line 29. Components removed from the hydrogen by the PSA system typically include carbon dioxide, water, methane and other unreacted hydrocarbons, and carbon monoxide, and these are withdrawn as waste gas via line 31 during the blowdown and purge steps typically used in PSA process cycles. Any of the PSA cycles and systems known in the art may be used in the process described in this and other embodiments of the invention. The waste gas in line 31 typically contains combustible components and may be used as fuel in boiler 33.

The mixture of complex metal oxide material and steam-hydrocarbon reforming catalyst in reactor 17 has a finite inventory of chemically bound oxygen and a finite chemisorption capacity for carbon dioxide. Once either of these is exhausted, the purity and yield of hydrogen in the reaction product effluent stream leaving reactor 17 via line 19 will begin to decrease. The time at which this occurs can be determined by real-time analysis of the stream by any known analytical means, such as, for example, in-line gas chromatography. At this point, reactor 17 is switched to regeneration mode by closing valve 9 and depressurizing the reactor via lines 19, line 33, open valve 37, and line 39, wherein the hydrocarbon-containing blowdown gas is introduced into boiler 33. At this point, valve 41 remains closed.

Valve 41 is then opened and reactor 17 is purged with a suitable purge gas such as steam or nitrogen to remove residual hydrocarbons from the reactor void volume. In this embodiment, steam for purge is provided via line 11 and flows through heat exchanger 13 and line 16 into the reactor. Purge effluent gas leaves the reactor via lines 19 and 33, flows through heat exchanger 43, valve 41, line 45, heat exchanger 47, and line 49 into boiler 33.

Regeneration of reactor 17 then is initiated by closing valve 41 and opening previously-closed valve 51. Air is provided via intake line 55 to compressor 57 and is compressed therein to about 15 to 50 psia and the compressed air inline 59 is preheated in heat exchanger 47 to about 250° C. to about 350° C., and introduced via line 61 and valve 51 into the heat exchanger 43. The air is further heated in heat exchanger 43 against hot process gas from line 33 (later described) to a temperature between about 500° C. and about 900° C., typically from about 700° C. to about 800° C. The heated air flows via lines 53 and 16 into reactor 17, and the oxygen in the air regenerates the complex metal oxide material by desorbing the previously chemisorbed carbon dioxide and adsorbing on the complex metal oxide material. The carbon dioxide-rich, oxygen-depleted regeneration offgas leaves the reactor via line 33 at a temperature in the range of about 600° C. to about 900° C. and typically from about 650° C. to about 750° C. The hot regeneration offgas in line 33*s* introduced into heat exchanger 43 to heat the air entering via valve 51 as earlier described, whereby the offgas is cooled to a temperature in the range of about 350° C. to about 450° C. The cooled regeneration offgas flows via valve 41, is further cooled to a temperature in the range of about 200° C. to about 300° C. in heat exchanger 47, thereby heating compressed air stream 59 as earlier described. The cooled regeneration offgas stream in line 49 still contains some residual oxygen, and may be introduces into boiler 33 for additional heat recovery.

Following the substantial regeneration of reactor 17 by removal of chemisorbed carbon dioxide and the absorption of oxygen, the reactor may be purged with an inert gas and repressurized with steam, feed gas, or product gas. Following repressurization, the reactor proceeds to the reaction step and the cycle is repeated as described earlier.

Reactor 63 is operated through the same cycle steps described above for reactor 17, but the cycle of reactor 63 is staggered so that it operates in the regeneration mode when reactor 17 operates in the reaction or hydrogen generation mode. Hydrocarbon-containing feed gas flows via valve 65, steam is added via line 67, the feed-steam mixture is heated in heat exchanger 13, and the heated feed flows via lines 69 and 71 to reactor 63. Reaction product gas leaves the reactor via lines 71 and 73, is cooled in heat exchanger 13, and flows via valve 75, line 5, heat exchanger 3, boiler 23, and line 25 to PSA system 27. Regeneration air is provided to reactor 63 via valve 77, heat exchanger 43, and line 71, and blowdown or depressurization gas exits via line 81, valve 83, and line 39 into boiler 33. Regeneration offgas leaves reactor 63 via line 85, heat exchanger 43, and valve 87, and then flows via line 45, heat exchanger 47, and line 49 to boiler 33.

Reactors 17 and 63 thus are operated in a staggered sequence between the hydrogen production and regeneration modes by the proper operation of switch valves 9, 21, 37, 41, 51, 65, 75, 77, 83, and 87 as described above. Operation with two parallel reactors with constant hydrogen product flow is possible when the elapsed time of the hydrogen production mode is equal to or greater than that of the regeneration mode. However, any suitable number of reactors in parallel may be used in staggered operation to achieve continuous hydrogen production. In practice, the duration of the hydrogen production step using a particular complex metal oxide may be different than the duration of the regeneration step. For example, if the regeneration step is twice as long as the production step, a configuration employing three parallel beds may be advantageously used wherein two beds are being regenerated while the third bed is used for hydrogen production.

The invention claimed is:

1. A process for producing hydrogen in a reactor comprising:
   reacting at least one hydrocarbon and steam in the presence of a complex metal oxide and a steam-hydrocarbon reforming catalyst in a production step under reaction conditions sufficient to form hydrogen and a spent complex metal oxide comprising a metal carbonate, and
   reacting the spent complex metal oxide with an oxygen source gas in a regeneration step under reaction conditions sufficient to regenerate the complex metal oxide and to yield carbon dioxide,
   wherein the complex metal oxide is represented by the formula $(A'_{x_1}Ca_{x_2}Mg_{x_3})_x(B'_{y_1}Mn_{y_2}Fe_{y_3})_yO_n$ where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;
   $0 \leq x_1 \leq 1$, $0 \leq x_2 \leq 1$, $0 \leq x_3 \leq 1$ wherein $x_1+x_2+x_3=x$;
   $0 \leq y_1 \leq 1$, $0 \leq y_2 \leq 1$, $0 \leq y_3 \leq 1$ wherein $y_1+y_2+y_3=y$;
   $1 \leq x \leq 10$; and
   $1 \leq y \leq 10$;
   and n represents a value such that the complex metal oxide is rendered electrically neutral.

2. The process of claim 1 wherein $x_1=0$, $y_1=0$, $1 \leq x \leq 5$, and $1 \leq y \leq 5$.

3. The process of claim 1 further comprising purging the reactor with a purge gas to displace combustible components from the reactor and withdrawing a purge gas effluent therefrom prior to the regeneration step.

4. The process of claim 1 wherein the production step is characterized by a production temperature ranging from 400° C. to 900° C. and a production pressure ranging from 1 to 100 atmospheres.

5. The process of claim 1 wherein the molar ratio of steam to the at least one hydrocarbon ranges from 1:1 to 20:1.

6. The process of claim 5 wherein the molar ratio of steam to the at least one hydrocarbon is less than 150% of the theoretical amount.

7. The process of claim 1 wherein the oxygen source gas is selected from the group consisting of air, oxygen, oxygen-depleted air, and mixtures thereof.

8. The process of claim 1 wherein the regeneration step is characterized by a regeneration temperature ranging from 450° C. to 900° C.

9. The process of claim 1 wherein the reaction conditions of the regeneration step include a temperature ranging from less than or equal to 100° C. higher than a reaction temperature of the production step.

10. The process of claim 1 wherein the steam-hydrocarbon reforming catalyst comprises one or more components selected from the group consisting of nickel, cobalt, ruthenium, osmium, rhodium, palladium, platinum, iridium, and oxides of these metals.

11. The process of claim 1 wherein the at least one hydrocarbon is selected from aliphatic hydrocarbons having from 1 to 20 carbon atoms.

12. The process of claim 11 wherein the at least one hydrocarbon is methane obtained as a component of natural gas.

13. The process of claim 1 wherein the complex metal oxide comprises $CaMn_{y_2}Fe_{y_3}O_n$ wherein $y_2+y_3=1$.

14. The process of claim 13 wherein the complex metal oxide comprises $CaMn_{0.5}Fe_{0.5}O_{2.5}$.

15. The process of claim 13 wherein the complex metal oxide comprises $CaMn_{0.5}Fe_{0.5}O_2$.

16. The process of claim 1 wherein the complex metal oxide comprises $CaCoO_{2.5}$.

17. The process of claim 13 wherein the complex metal oxide comprises $CaMnO_{2.5}$.

18. The process of claim 1 wherein the complex metal oxide Comprises $Ca_{1-x_3}Mg_{x_3}Mn_{y_2}Fe_{y_3}O_n$ where $0.1<x_3<0.9$; and wherein $y_2+y_3=1$.

19. The process of claim 18 wherein the complex metal oxide comprises $Mg_{0.5}Ca_{0.5}Mn_{0.5}Fe_{0.5}O_{2.5}$.

20. The process of claim 1 wherein the complex metal oxide is impregnated with at least one steam-methane reforming catalyst.

21. The process of claim 20 wherein the at least one steam-methane reforming catalyst comprises a metal selected from the group consisting of platinum and nickel.

22. The process of claim 20 wherein the at least one steam-methane reforming catalyst comprises a compound selected from the group consisting of nickel oxide and cobalt oxide.

23. The process of claim 1 wherein the complex metal oxide is mixed with at least one steam-methane reforming catalyst prior to use in the process.

24. The process of claim 12 wherein the molar ratio of steam to methane ranges from 1.3:3 to 4:1, inclusive.

25. The process of claim 12 wherein the at least one hydrocarbon is provided as a component in pre-reformed natural gas.

26. A process for producing hydrogen comprising
(a) providing a reactor containing a complex metal oxide and a steam-hydrocarbon reforming catalyst, wherein the complex metal oxide is represented by the formula $$(A'_{x_1}Ca_{x_2}Mg_{x_3})_x(B'_{y_1}Mn_{y_2}Fe_{y_3})_yO_n$$

where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;
$0 \leq x_1 \leq 1$, $0 \leq x_2 \leq 1$, $0 \leq x_3 \leq 1$ wherein $x_1+x_2+x_3=x$;
$0 \leq y_1 \leq 1$, $0 \leq y_2 \leq 1$, $0 \leq y_3 \leq 1$ wherein $y_1+y_2+y_3=y$;
$1 \leq x \leq 10$;
$1 \leq y \leq 10$;
and n represents a value such that the complex metal oxide is rendered electrically neutral;
(b) introducing a feed gas containing at least one hydrocarbon and steam into the reactor in a production step, reacting the at least one hydrocarbon and the steam in the presence of the complex metal oxide and the steam-hydrocarbon reforming catalyst under reaction conditions sufficient to form hydrogen and a spent complex metal oxide comprising a metal carbonate, and withdrawing from the reactor a product gas comprising hydrogen;
(c) terminating the introduction of the at least one hydrocarbon and purging the reactor with a purge gas to displace combustible components from the reactor and withdrawing a purge gas effluent therefrom;
(d) regenerating the reactor in a regeneration step by reacting the spent complex metal oxide and an oxygen source gas under reaction conditions sufficient to regenerate the complex metal oxide and to yield carbon dioxide;
(e) optionally purging the reactor with a purge gas;
(f) pressurizing the reactor by introducing the feed gas containing least one hydrocarbon and steam; and
(g) repeating (b) through (f) in a cyclic manner.

27. The process of claim 26 that further comprises, prior to purging the reactor, depressurizing the reactor by withdrawing a depressurization gas therefrom.

28. The process of claim 26 wherein the feed gas contains up to 20 vol % hydrogen.

29. The process of claim 28 wherein the feed gas is pre-reformed natural gas.

30. The process of claim 1 wherein the complex metal oxide comprises $CaMn_{0.5}Fe_{0.5}O_{2.5}$ and the steam-hydrocarbon reforming catalyst comprises nickel on alumina.

* * * * *